US010490181B2

United States Patent
Matsubara et al.

(10) Patent No.: US 10,490,181 B2
(45) Date of Patent: Nov. 26, 2019

(54) TECHNOLOGY FOR RESPONDING TO REMARKS USING SPEECH SYNTHESIS

(71) Applicant: YAMAHA CORPORATION, Hamamatsu-shi (JP)

(72) Inventors: Hiroaki Matsubara, Hamamatsu (JP); Junya Ura, Hamamatsu (JP); Takehiko Kawahara, Hamamatsu (JP); Yuji Hisaminato, Hamamatsu (JP); Katsuji Yoshimura, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 221 days.

(21) Appl. No.: 15/375,984

(22) Filed: Dec. 12, 2016

(65) Prior Publication Data
US 2017/0110111 A1 Apr. 20, 2017

Related U.S. Application Data

(63) Continuation of application No. 14/892,624, filed as application No. PCT/JP2014/064631 on Jun. 2, 2014, now Pat. No. 9,685,152.

(30) Foreign Application Priority Data

May 31, 2013 (JP) ................................. 2013-115111
Sep. 25, 2013 (JP) ................................. 2013-198217
(Continued)

(51) Int. Cl.
*G10L 13/033* (2013.01)
*G10L 13/027* (2013.01)
(Continued)

(52) U.S. Cl.
CPC ........ *G10L 13/0335* (2013.01); *G10L 13/027* (2013.01); *G10L 15/18* (2013.01);
(Continued)

(58) Field of Classification Search
CPC ....... G10L 13/00; G10L 13/06; G10L 13/027; G10L 13/033; G10L 13/0335
See application file for complete search history.

(56) References Cited

U.S. PATENT DOCUMENTS 2,339,465 A * 1/1944 Dudley ................... G10L 21/00
704/203
5,577,165 A * 11/1996 Takebayashi ............. G06F 3/16
704/251
(Continued)

FOREIGN PATENT DOCUMENTS

CN 1173086 A 2/1998
CN 1592330 A 3/2005
(Continued)

OTHER PUBLICATIONS

Extended European Search Report issued in European Appln. No. 18178496.8 dated Aug. 3, 2018.
(Continued)

*Primary Examiner* — Matthew H Baker
(74) *Attorney, Agent, or Firm* — Rossi, Kimms & McDowell LLP

(57) ABSTRACT

The present invention is provided with: a voice input section that receives a remark (a question) via a voice signal; a reply creation section that creates a voice sequence of a reply (response) to the remark; a pitch analysis section that analyzes the pitch of a first segment (e.g., word ending) of the remark; and a voice generation section (a voice synthesis section, etc.) that generates a reply, in the form of voice, represented by the voice sequence. The voice generation section controls the pitch of the entire reply in such a manner that the pitch of a second segment (e.g., word ending) of the reply assumes a predetermined pitch (e.g., five degrees down) with respect to the pitch of the first segment of the
(Continued)

remark. Such arrangements can realize synthesis of replying voice capable of giving a natural feel to the user.

17 Claims, 41 Drawing Sheets

(30) Foreign Application Priority Data

| | | |
|---|---|---|
| Sep. 25, 2013 | (JP) | 2013-198218 |
| Sep. 25, 2013 | (JP) | 2013-198219 |
| Sep. 30, 2013 | (JP) | 2013-203839 |
| Sep. 30, 2013 | (JP) | 2013-203840 |
| Sep. 30, 2013 | (JP) | 2013-205260 |
| Sep. 30, 2013 | (JP) | 2013-205261 |
| Mar. 12, 2014 | (JP) | 2014-048636 |

(51) Int. Cl.
 *G10L 15/18* (2013.01)
 *G10L 25/90* (2013.01)
 *G10L 13/06* (2013.01)
 *G10L 13/10* (2013.01)

(52) U.S. Cl.
 CPC ............ *G10L 25/90* (2013.01); *G10L 13/033* (2013.01); *G10L 13/06* (2013.01); *G10L 13/10* (2013.01); *H04M 2201/39* (2013.01)

(56) References Cited

U.S. PATENT DOCUMENTS

| | | | |
|---|---|---|---|
| 5,761,637 A | 6/1998 | Chino | |
| 6,097,305 A | 8/2000 | Im et al. | |
| 6,175,821 B1* | 1/2001 | Page | G10L 13/00 704/258 |
| 6,353,810 B1* | 3/2002 | Petrushin | G10L 17/26 704/236 |
| 7,092,874 B2 | 8/2006 | Clavbo | |
| 7,222,074 B2* | 5/2007 | Zhou | G10L 15/22 704/257 |
| 7,280,641 B2 | 10/2007 | Kogure | |
| 7,805,306 B2 | 9/2010 | Mitsui | |
| 7,921,014 B2 | 4/2011 | Kurata et al. | |
| 8,983,841 B2* | 3/2015 | Pulz | G10L 13/10 379/265.12 |
| 9,135,740 B2 | 9/2015 | Russell et al. | |
| 9,147,393 B1 | 9/2015 | Fridman-Mintz | |
| 9,189,879 B2* | 11/2015 | Filev | B60W 50/10 |
| 2001/0021906 A1* | 9/2001 | Chihara | G10L 13/10 704/258 |
| 2002/0198707 A1 | 12/2002 | Zhou | |
| 2004/0148172 A1 | 7/2004 | Cohen et al. | |
| 2004/0193421 A1* | 9/2004 | Blass | G06F 17/278 704/258 |
| 2005/0209856 A1 | 9/2005 | Kii | |
| 2006/0177802 A1 | 8/2006 | Hiroe et al. | |
| 2006/0247921 A1* | 11/2006 | Ma | G10L 13/033 704/207 |
| 2008/0294443 A1* | 11/2008 | Eide | G10L 13/10 704/260 |
| 2009/0055190 A1* | 2/2009 | Filev | B60W 50/10 704/270 |
| 2011/0022390 A1 | 1/2011 | Otani et al. | |
| 2012/0065961 A1 | 3/2012 | Latorre et al. | |
| 2012/0243705 A1 | 9/2012 | Bradley et al. | |
| 2013/0085760 A1* | 4/2013 | Stephens, Jr. | G10L 13/10 704/260 |
| 2014/0067396 A1 | 3/2014 | Kato | |
| 2017/0221470 A1* | 8/2017 | Kayama | G10L 25/90 |
| 2018/0166064 A1* | 6/2018 | Saino | G10L 13/00 |

FOREIGN PATENT DOCUMENTS

| | | |
|---|---|---|
| CN | 1672178 A | 9/2005 |
| CN | 1725792 A | 1/2006 |
| CN | 1781140 A | 5/2006 |
| CN | 101981613 A | 2/2011 |
| JP | S60247697 A | 12/1985 |
| JP | 62115199 A | 5/1987 |
| JP | S62145322 A | 6/1987 |
| JP | H05289691 A | 11/1993 |
| JP | 08106298 A | 4/1996 |
| JP | 1165597 A | 3/1999 |
| JP | 11175082 A | 7/1999 |
| JP | H11231885 A | 8/1999 |
| JP | 2001134283 A | 5/2001 |
| JP | 2001242881 A | 9/2001 |
| JP | 2001272991 A | 10/2001 |
| JP | 2003271194 A | 9/2003 |
| JP | 2005196134 A | 7/2005 |
| JP | 2006038929 A | 2/2006 |
| JP | 2007183421 A | 7/2007 |
| JP | 2007206888 A | 8/2007 |
| JP | 2008046538 A | 2/2008 |
| JP | 2008216735 A | 9/2008 |
| JP | 4495907 B2 | 7/2010 |
| JP | 2010262147 A | 11/2010 |
| JP | 4832097 B2 | 12/2011 |
| JP | 2012128440 A | 7/2012 |
| WO | 0241300 A1 | 5/2002 |
| WO | 2004092967 A1 | 10/2004 |
| WO | 2010116549 A1 | 10/2010 |

OTHER PUBLICATIONS

Extended European Search Report issued in European Appln. No. 14803435.8 dated Jan. 3, 2017.
Office Action issued in Japanese Appln. No. 2013-203839 dated Sep. 26, 2017. English machine translation provided.
Office Action issued in Japanese Appln. No. 2013-203840 dated Sep. 26, 2017. English machine translation provided.
Office Action issued in Japanese Appln. No. 2013-205261 dated Sep. 26, 2017. English machine translation provided.
Office Action issued in Japanese Appln. No. 2013-198219 dated Sep. 26, 2017. English machine translation provided.
Partial English translation of Japanese Publication No. S60-247697, cited in IDS filed on Nov. 15, 2017.
Shoji et al. "Spoken Dialog System Considered Rhythm and Synchronized Tendency of Conversation." Information Processing Society of Japan SIG Technical Report. May 11, 2006: 43-48. English abstract provided.
Nakagawa et al. "Adaptive Number-Giving for Directory Assistance." Human Interface Society. Aug. 26, 2003: 391-396. vol. 5, No. 3. English abstract provided.
Hayamizu et al. "A Synchrony Control Method Based on Switching Pauses and Prosodic Information in Conversation and Implementation of a Conversational Agent for Gathering Information." Aug. 15, 2013: 2109-2118. vol. 54, No. 8. English abstract provided.
Office Action issued in Japanese Application No. 2013-198218 dated Aug. 29, 2017. English translation provided.
Itoh et al., "Analysis of tilled pauses in dialogue speech and application of the generation to a dialogue system", Japanese Society for Artificial Intelligence National Conference, 1998, pp. 499-502. English abstract provided. Cited in NPL 1.
Office Action issued in Japanese Application No. 2013-203839 dated Apr. 24, 2018. English translation provided.
Notice of Allowance issued in U.S. Appl. No. 14/892,624 dated Mar. 30, 2017.
International Search Report issued in Intl. Appln. No. PCT/JP2014/064631, dated Sep. 2, 2014.
Heldner et al. "Pitch Similarity in the Vicinity of Backchannels." Proc. Interspeech 2010 Japan, ISCA. Sep. 26, 2010:3054-3057.
Office Action issued in Japanese Application No. JP2014-048636, dated Mar. 29, 2016.

(56) References Cited

OTHER PUBLICATIONS

Office Action issued in U.S. Appl. No. 14/892,624, dated Sep. 19, 2016.
Office Action issued in Chinese Appln. No. 201480031099.X dated May 3, 2018. English translation provided.
Office Action issued in Japanese Application No. 2013-198218 dated Jan. 9, 2018. English translation provided.
Office Action issued in Japanese Application No. 2013-198219 dated Jan. 9, 2018. English translation provided.

* cited by examiner

FIG. 3

⟨ RELATIONSHIP BETWEEN PITCH NAMES & FREQUENCIES ⟩

| OCTAVE | | 3 | | | 4 | | | | | | | 5 | |
|---|---|---|---|---|---|---|---|---|---|---|---|---|---|
| PITCH NAME (SYLLABLE NAME) | ... | G (SO) | A (LA) | B (SI) | C (DO) | D (RE) | E (MI) | F (FA) | G (SO) | A (LA) | B (SI) | C (DO) | ... |
| FREQUENCY (Hz) | ... | 198.0 | 220.0 | 247.5 | 264.0 | 297.0 | 330.0 | 352.0 | 396.0 | 440.0 | 495.0 | 528.0 | ... |
| REFERENCE (C MAJOR) | ... | 3/4 | 5/6 | 15/16 | 1/1 | 9/8 | 5/4 | 4/3 | 3/2 | 5/3 | 15/8 | 2 | ... |
| REFERENCE (A MINOR) | ... | 9/10 | 1/1 | 9/8 | 6/5 | 4/3 | 3/2 | 8/5 | 9/5 | 2 | 9/4 | 12/5 | ... |

FIG. 6(a) < VOICE SEQUENCE (FUNDAMENTAL VOICE) >
(JAPANESE)
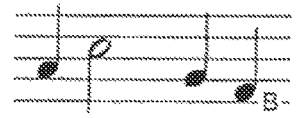
HA RE   DE SU
FIG. 6(b) < AFTER PITCH SHIFT >
(JAPANESE)
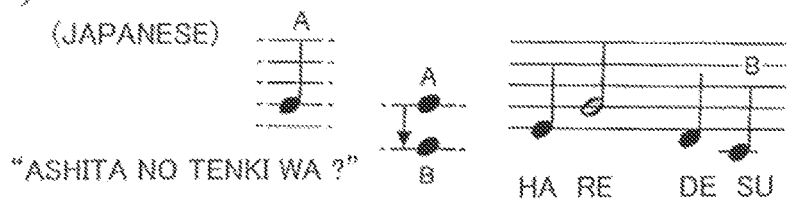
"ASHITA NO TENKI WA ?"     HA RE   DE SU
FIG. 6(c) < VOICE SEQUENCE (FUNDAMENTAL VOICE) >
(JAPANESE)
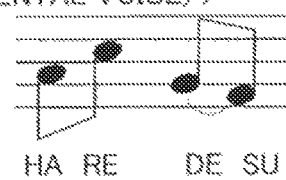
HA RE   DE SU
FIG. 6(d) < AFTER PITCH SHIFT >
(JAPANESE)
HA RE   DE SU
FIG. 6(e) < AFTER PITCH SHIFT >
(ENGLISH)
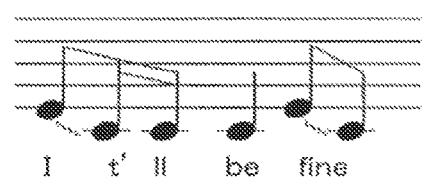
I  t' ll   be  fine
FIG. 6(f) < AFTER PITCH SHIFT >
(CHINESE)
Shi  qing  tian
是   晴   天

FIG. 7(a) QUESTION
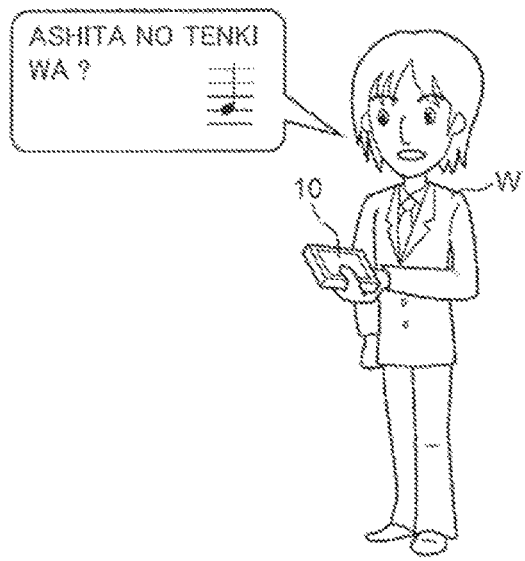
FIG. 7(b) REPLY
(GOOD IMPRESSION)
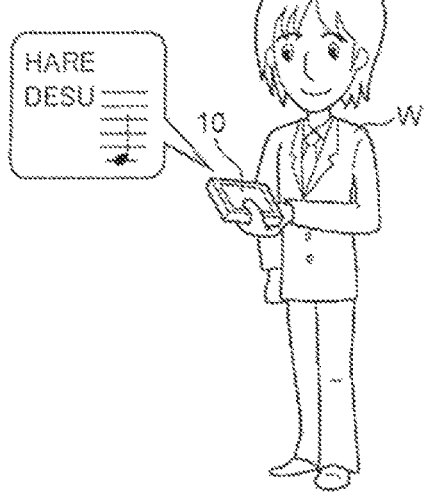
FIG. 7(c) REPLY
(BAD IMPRESSION)
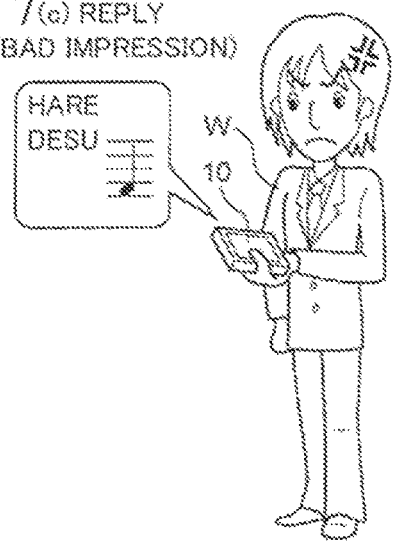

FIG. 9(a) <VOICE WAVEFORM DATA>
FIG. 9(b) <PITCH CONVERSION>
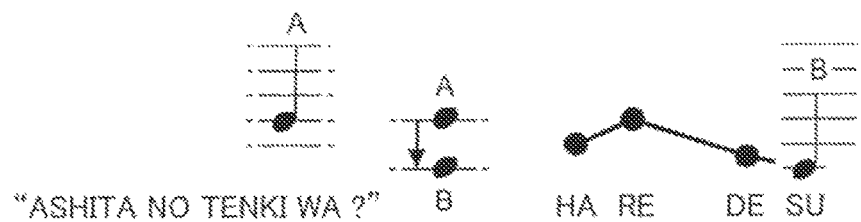
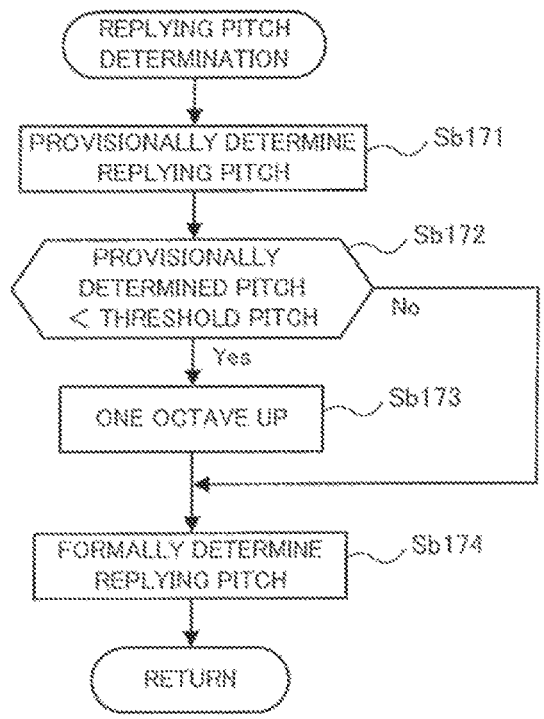
FIG. 10

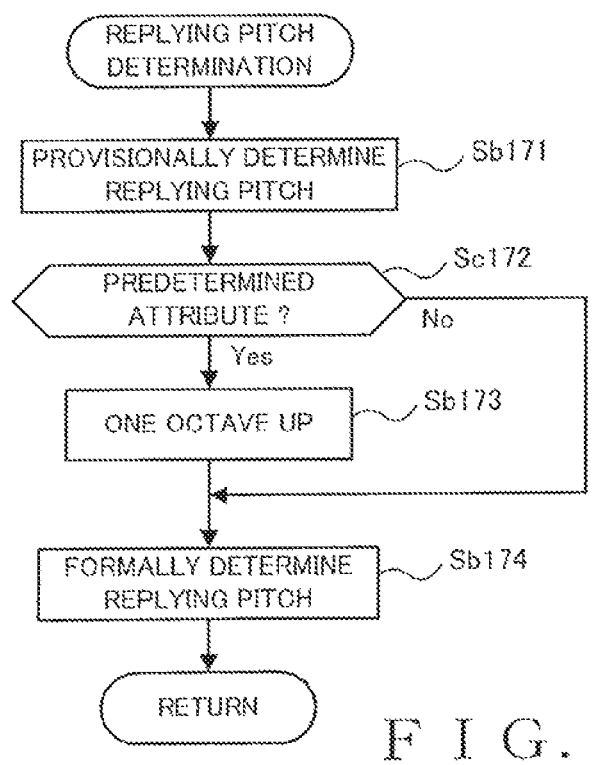
F I G. 11
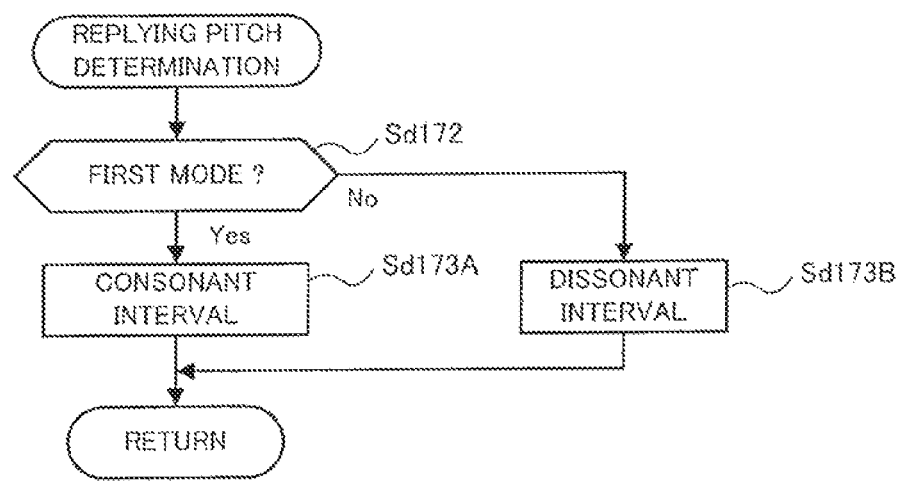
F I G. 12

FIG. 13(a) QUESTION
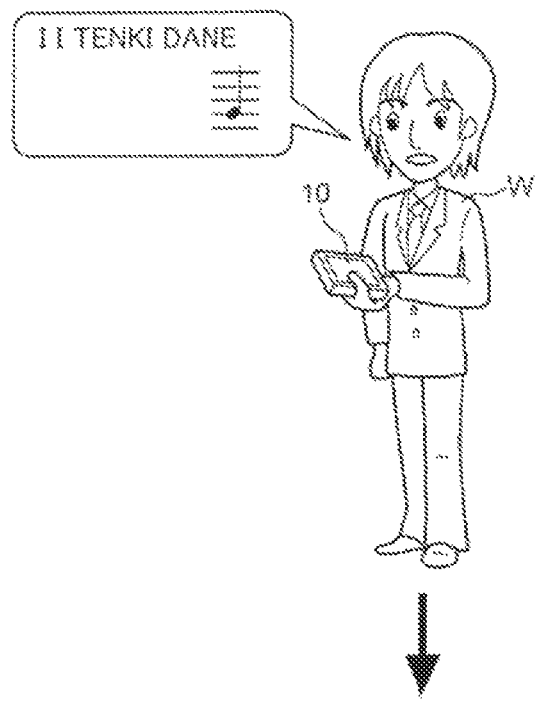
FIG. 13(b) REPLY
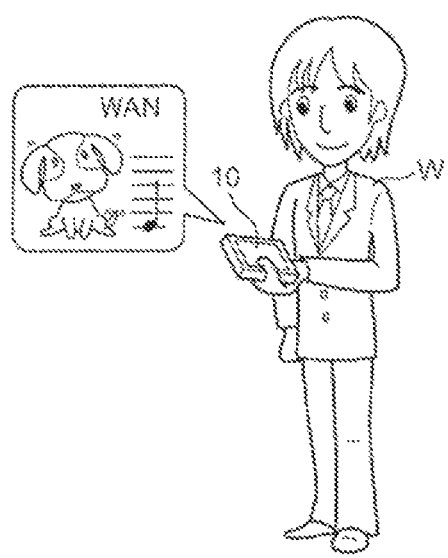

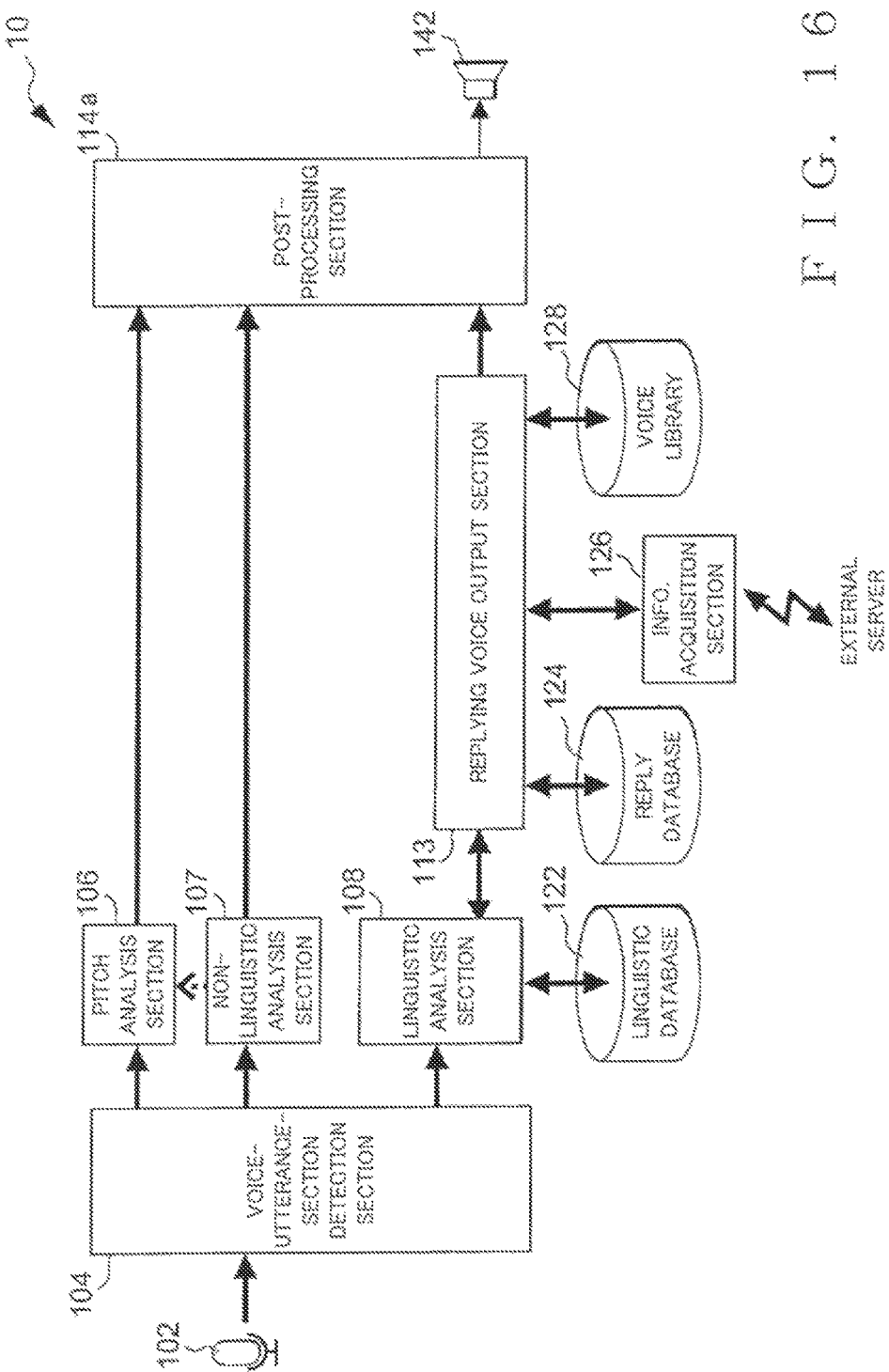

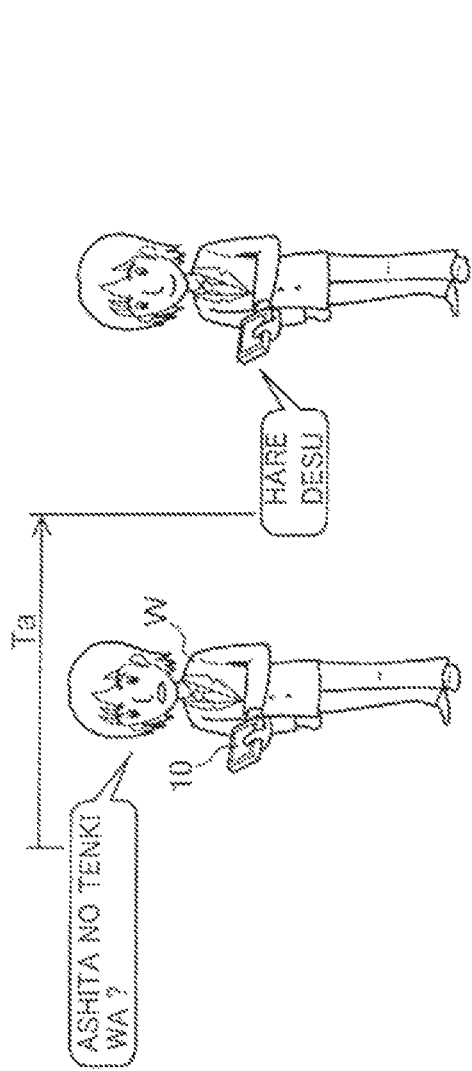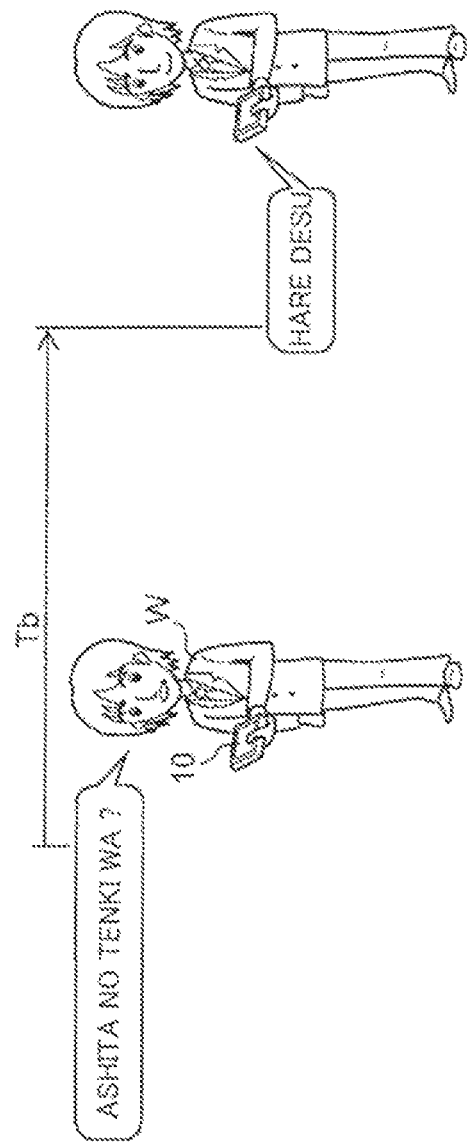
FIG. 17(a)
FIG. 17(b)

FIG. 22(a) VOICE SEQUENCE
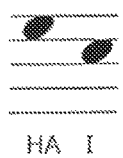
HA I
FIG. 22(b) PITCH SHIFT : AFFIRMATION/AGREEMENT
FIG. 23(a) VOICE SEQUENCE
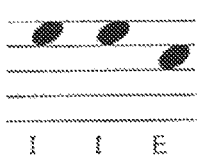
I I E
FIG. 23(b) PITCH SHIFT : NEGATION/DISAGREEMENT
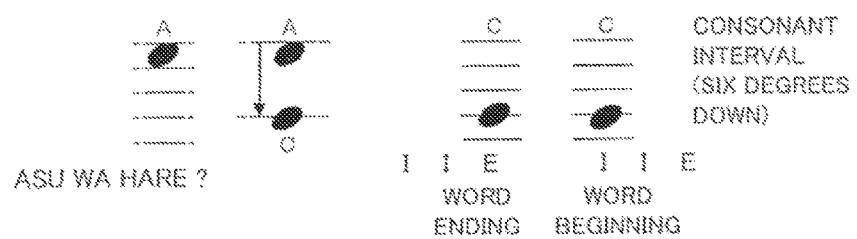

FIG. 24(a) VOICE SEQUENCE
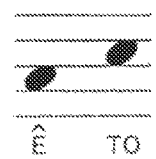
FIG. 24(b) PITCH SHIFT : SYMPATHETIC BACK-CHANNEL FEEDBACK
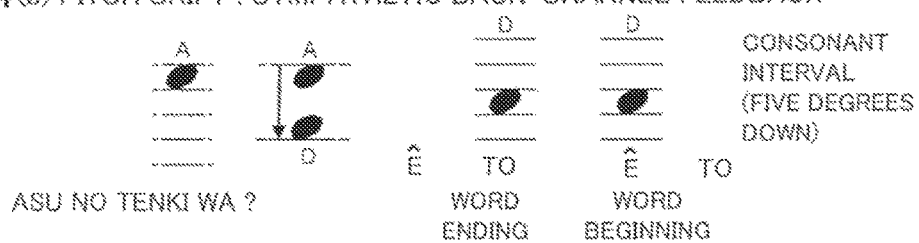

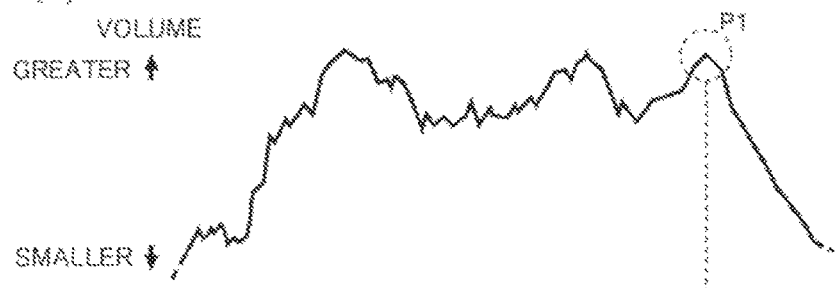
FIG. 29(a)
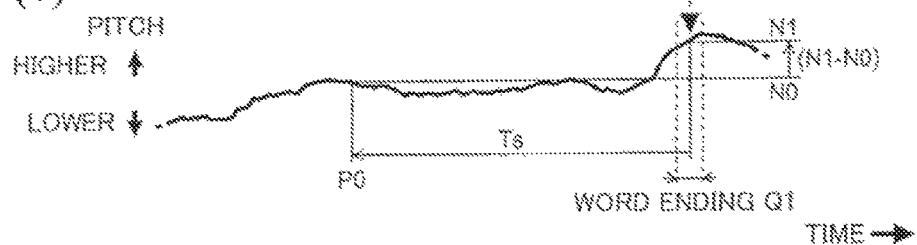
FIG. 29(b)
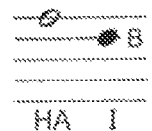
FIG. 30(a)
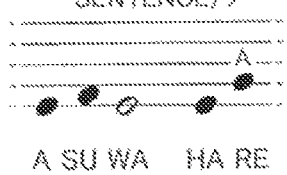
FIG. 30(b)

FIG. 31(a) <VOICE SEQUENCE (BEFORE CHANGE)>
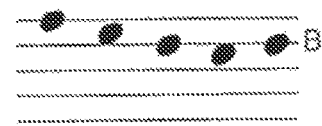
SO U DE SU NE
FIG. 31(b) <REMARK (MONOLOGUE)>
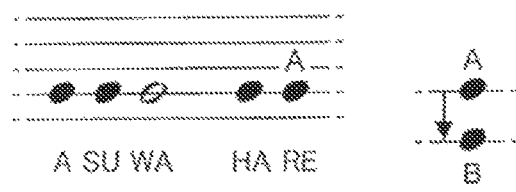
A SU WA    HA RE
<VOICE SEQUENCE (AFTER CHANGE)>
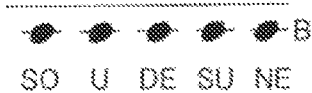
SO U DE SU NE

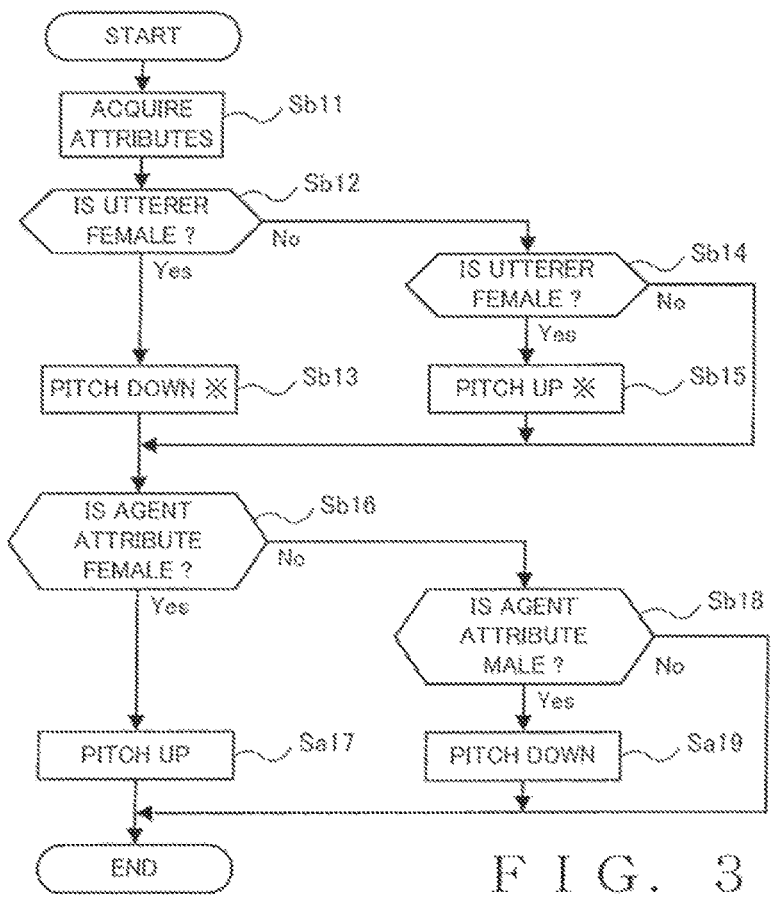
FIG. 35
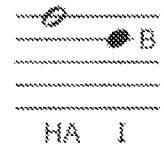
FIG. 36(a) < VOICE SEQUENCE (BEFORE CHANGE) >
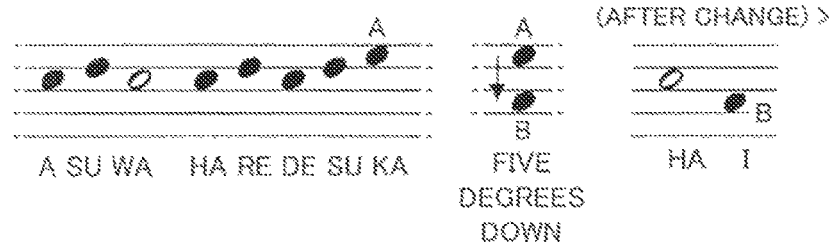
FIG. 36(b) < REMARK >   < VOICE SEQUENCE (AFTER CHANGE) >
A SU WA  HA RE DE SU KA    FIVE DEGREES DOWN    HA I

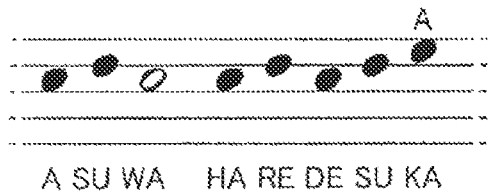 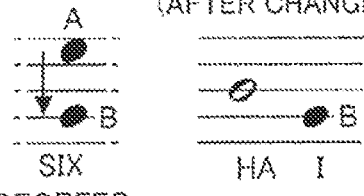
FIG. 37
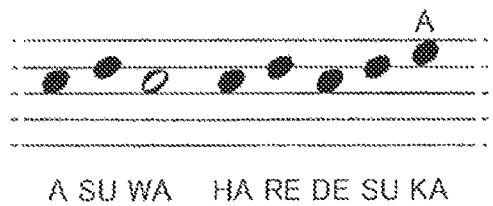 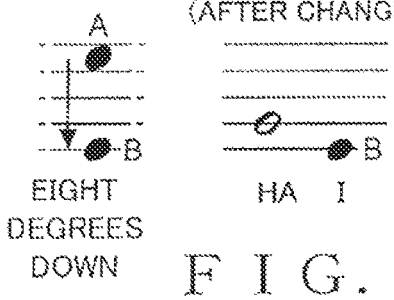
FIG. 38
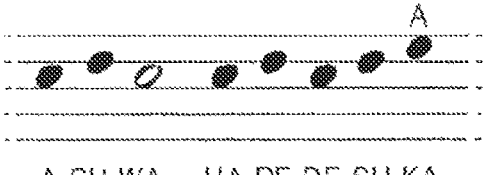 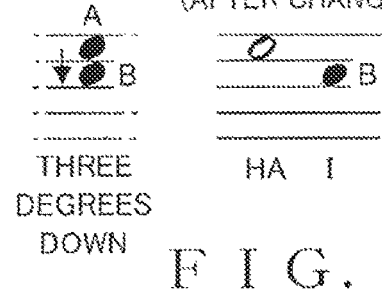
FIG. 39
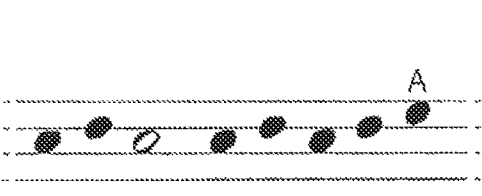 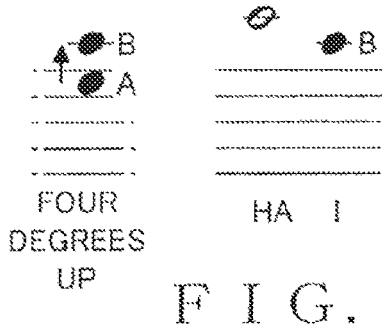
FIG. 40

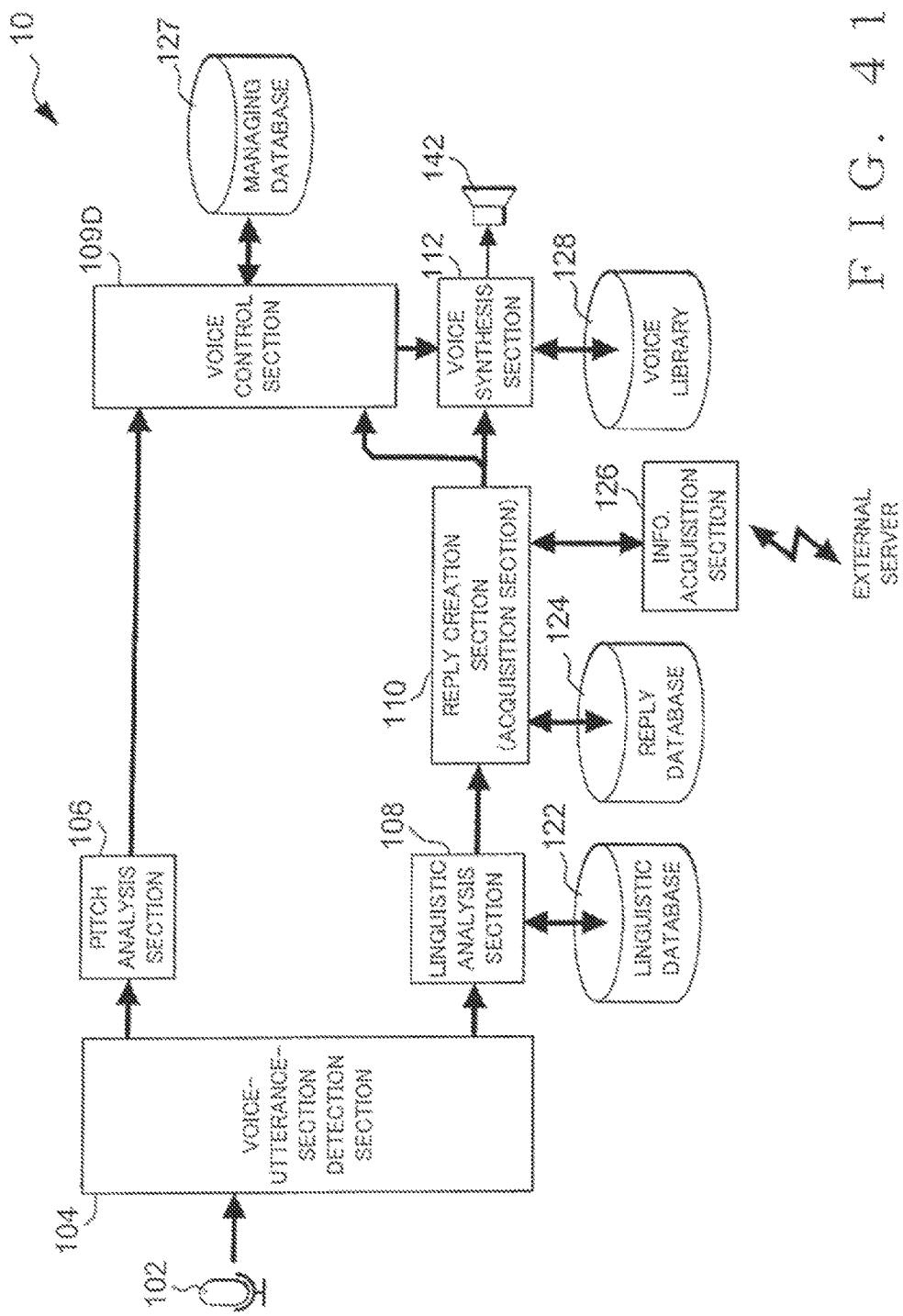
F I G. 41

< INDEX TABLE (PITCH RULE) >
| PITCH RULE | NUMBER OF REMARKS | NUMBER OF APPLICATIONS |
|---|---|---|
| FOUR DEGREES UP | ... | ... |
| ▶ THREE DEGREES DOWN | 1 5 | 1 8 |
| ▷ FIVE DEGREES DOWN | 1 2 | 1 8 |
| SIX DEGREES DOWN | 8 | 1 7 |
| EIGHT DEGREES DOWN | ... | ... |
F I G. 4 2
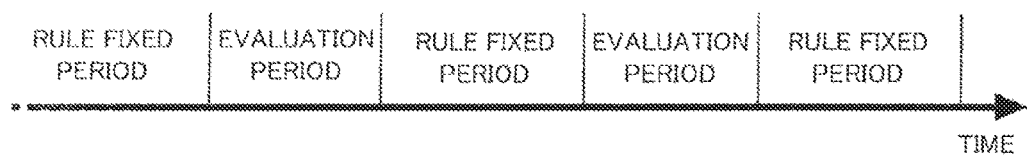
TIME
F I G. 4 3

FIG. 47(a) < INDEX TABLE (PITCH RULE) >
UTTERER (SPEAKER): FEMALE,
REPLY (APPARATUS): FEMALE

| PITCH RULE | NUMBER OF REMARKS | NUMBER OF APPLICATIONS |
|---|---|---|
| FOUR DEGREES UP | ... | ... |
| THREE DEGREES DOWN | 15 | 18 |
| FIVE DEGREES DOWN | 12 | 18 |
| SIX DEGREES DOWN | 8 | 17 |
| EIGHT DEGREES DOWN | ... | ... |

FIG. 47(b) UTTERER: FEMALE  REPLY: MALE

| PITCH RULE | NUMBER OF REMARKS | NUMBER OF APPLICATIONS |
|---|---|---|
| FOUR DEGREES UP | ... | ... |
| THREE DEGREES DOWN | ... | ... |
| FIVE DEGREES DOWN | 13 | 18 |
| SIX DEGREES DOWN | 15 | 18 |
| EIGHT DEGREES DOWN | 10 | 18 |

FIG. 47(c) UTTERER: MALE  REPLY: FEMALE

| PITCH RULE | NUMBER OF REMARKS | NUMBER OF APPLICATIONS |
|---|---|---|
| FOUR DEGREES UP | ... | ... |
| ⋮ | ⋮ | ⋮ |
| EIGHT DEGREES DOWN | ... | ... |

FIG. 47(d) UTTERER: MALE  REPLY: MALE

| PITCH RULE | NUMBER OF REMARKS | NUMBER OF APPLICATIONS |
|---|---|---|
| FOUR DEGREES UP | ... | ... |
| ⋮ | ⋮ | ⋮ |
| EIGHT DEGREES DOWN | ... | ... |

TECHNOLOGY FOR RESPONDING TO REMARKS USING SPEECH SYNTHESIS

TECHNICAL FIELD

The present invention relates to a speech or voice synthesis apparatus and system which, in response to a remark, question or utterance made by voice input, provide replying output, as well as a coding/decoding device related to the voice synthesis.

BACKGROUND ART

In recent years, the following voice synthesis techniques have been proposed. Examples of such proposed voice synthesis techniques include a technique that synthesizes and outputs voice corresponding to a speaking tone and voice quality of a user and thereby generates voice in a more human-like manner (see, for example, Patent Literature 1), and a technique that analyzes voice of a user to diagnose psychological and health states etc. of the user (see, for example, Patent Literature 2).

Also proposed in recent years is a voice interaction or dialogue system which implements voice interaction with a user by outputting, in synthesized voice, content designated by a scenario while recognizing voice input by the user (see, for example, Patent Literature 3).

PRIOR ART LITERATURE

Patent Literature 1: Japanese Patent Application Laid-open Publication No. 2003-271194
Patent Literature 2: Japanese Patent NO. 4495907
Patent Literature 3: Japanese Patent NO. 4832097

Let's assume a dialogue system which combines the aforementioned voice synthesis technique and the voice interaction or dialogue system, and which searches for data in response to a question given by voice of a user (spoken question by the user) and outputs an answer or reply in synthesized voice. In such a case, however, there would occur a problem that the voice output by the voice synthesis gives the user an unnatural feeling, more specifically a feeling as if a machine were speaking.

SUMMARY OF INVENTION

In view of the foregoing, it is an object of the present invention to realize, in a technique for responding to a question or remark by use of voice synthesis, synthesis of responsive or replying voice capable of giving a natural feeling to a user. More specifically, the present invention seeks to provide a technique which can easily and controllably realize replying voice that gives a good impression to the user, replying voice that gives a bad impression, etc.

In studying a man-machine system which synthesizes voice of a reply to a question (or remark) given by a user, the inventors of the present invention etc. first considered what kinds of dialogues are actually conducted between persons, focusing on non-linguistic information (i.e., non-verbal information other than verbal or linguistic information) and particularly pitches (frequencies) characterizing dialogues.

Here, consider a dialogue between persons where one of the persons (hereinafter "person b") returns a reply to a question given by the other person (hereinafter "person a"). Often, in such a case, when person a has uttered the question, not only person a but also person b, who is going to reply the question, keeps in mind a pitch of a given segment of the question with a strong impression. In returning a reply to the question with a meaning of agreement, approval, affirmation or the like, person b utters replying voice in such a manner that a pitch of a portion characterizing the reply, such as the word ending or word beginning, of the reply assumes a predetermined relationship, more specifically a consonant interval relationship, with (with respect to) the pitch of the question having impressed the person. The inventors etc. thought that, because the pitch which left an impression in the mind of person a about his or her question and the pitch of the portion charactering the reply of person b are in the above-mentioned relationship, person a would have a comfortable and easing good impression about the reply of person b.

Further, people have communicated with one another for a long time from the ancient times when there was no language. It is presumed that pitch and volume of human voice has played a very important role in human communications under such environment. It is also presumed that, although voice-pitch-based communications are forgotten in these modern times when languages have developed, "predetermined pitch relationship" used from the ancient times can give a "somehow comfortable" feel because such a predetermined pitch relationship has been inscribed in the human DNA and handed down to the present times.

The following describe a specific example of a dialogue between persons. When person a has uttered a question "sou de sho?" in Japanese (meaning "Isn't that right?"), person a and person b generally retain in their memories the pitch of "sho" at the word ending of the question where a sense of reminder, confirmation or the like is strongly indicated. In such a condition, if person b wants to reply affirmatively to the question, he or she returns a reply "a, hai" (romanized Japanese meaning "Oh, yes") in such a manner that the pitch of a portion characterizing the reply, e.g. the portion "i" (romanized Japanese), assumes the above-mentioned relationship with the pitch of "sho" (romanized Japanese) retained in the memories of person a and person b.

FIG. 2 is a diagram showing formants in such an actual dialogue, where the horizontal axis represents the time while the vertical axis represents the frequency. More specifically, spectra in FIG. 2 indicate a greater intensity as a level of white color increases.

As shown in FIG. 2, the spectra obtained through frequency analyses of human voice appear as a plurality of peaks moving over time, i.e. as formants. More specifically, formants corresponding to "sou de sho?" (romanized Japanese) and formants corresponding to "a, hai" (romanized Japanese) each appear as three peak zones (i.e., white band-shaped portions moving along the time axis).

Referring now to the first formant of the lowest frequency of the three peak zones, a frequency depicted at reference character A (i.e., frequency of a central part in a portion depicted at reference character A) which corresponds to "sho" in "sou de sho?" (romanized Japanese) is about 400 Hz, and a frequency of a portion depicted at reference character B which corresponds to "i" in "a, hai" (romanized Japanese) is about 260 Hz. Thus, it can be seen that the frequency depicted at reference character A is about 3/2 of the frequency depicted at reference character B.

In terms of a musical pitch interval, the relationship where the frequency ratio is 3/2 refers to an interval from pitch "G" to pitch "C" of the same octave, an interval from pitch "E" to pitch "A" one octave down from (lower than) the pitch "E" or the like, which is, in other words, the relationship of "perfect fifth" as noted later. Such a frequency ratio (i.e., predetermined relationship between pitches) is just one preferable example, and various other examples of the frequency ratio are also usable in the present invention.

FIG. 3 is a diagram showing relationship between pitch names (syllable names) and frequencies of human voice, which also shows frequency ratios with "C" in the fourth octave used as a reference pitch. The frequency ratio of "G" to the reference pitch "C" is 3/2 as noted above. FIG. 3 also shows frequency ratios with "A" in the second octave used as a reference pitch.

Namely, it can be considered that, in a dialogue between persons, the pitch of a question and the question of a reply are in the aforementioned predetermined relationship instead of being unrelated to each other. Further, the inventors of the present invention etc. confirmed that the above observation is generally correct, by analyzing many dialogues and statistically aggregating evaluations performed by many persons. In studying a dialogue system which outputs a reply to a question, uttered by a user, in synthesized voice in the light of the above observation and confirmation, the inventors of the present invention have arranged the voice synthesis in the following manner in order to achieve the aforementioned objects of the present invention.

Namely, in order to achieve the aforementioned objects, one aspect of the present invention provides a voice synthesis apparatus comprising: a voice input section configured to receive a voice signal of a remark; a pitch analysis section configured to analyze a pitch of a first segment of the remark; an acquisition section configured to acquire a reply to the remark; and a voice generation section configured to generate voice of the reply acquired by the acquisition section, the voice generation section controlling a pitch of the voice of the reply in such a manner that a second segment of the reply has a pitch associated with the pitch of the first segment analyzed by the pitch analysis section.

According to such an embodiment of the invention, it is possible to prevent the voice of the reply, synthesized in response to the input voice signal of a question (remark), from being accompanied by an unnatural feel. Note that the reply to the question (remark) is not limited to a specific or concrete reply and may sometimes be in the form of back-channel feedback (interjection), such as "ee" (romanized Japanese meaning "Yah."), "naruhodo" ("I see.") or "sou desune" ("I agree.") Further, the reply is not limited to one in human voice and may sometimes be in the form of voice of an animal, such as "wan" ("bowwow") or "Nyâ" ("meow"). Namely, the terms "reply" and "voice" are used herein to refer to concepts embracing not only voice uttered by a person but also voice of an animal.

In an embodiment of the present invention, the first segment is preferably a word ending of the remark (i.e., question), and the second segment is preferably a word beginning or word ending of the reply. Because, in many cases, a portion charactering an impression of the question is the word ending of the reply, and a portion charactering an impression of the reply is the word beginning or the word ending of the reply.

In an embodiment of the present invention, the voice generation section may be configured to control the pitch of the voice of the reply in such a manner that an interval of the pitch of the second segment relative to the pitch of the first segment becomes a consonant interval except for a perfect unison. Here. "consonant" means a relationship where a plurality of tones having been simultaneously generated mix with one another to harmonize well with each other, and such interval relationships are called consonant intervals. The simpler the frequency ratio between two notes, the higher becomes a degree of consonance. The simplest frequency ratio of 1/1 (perfect unison) and a frequency ratio of 2/1 (perfect octave) are called absolute consonant intervals, and a frequency ratio of 3/2 (perfect fifth) and a frequency ratio of 4/3 (perfect fourth) plus the above-mentioned frequency ratios of 1/1 (perfect unison) and 2/1 (perfect octave) are called perfect consonant intervals. Further, frequency ratios of 5/4 (major third), 6/5 (minor third), 5/3 (major sixth) and 8/5 (minor sixth) are called imperfect consonant intervals. Further, all the other frequency ratios than the above, such as major and minor second and seventh and various augmented and diminished intervals) are called dissonant intervals.

Because it is conceivable that an unnatural feel as a dialogue is involved if the word beginning or ending of the reply has the same pitch as the word ending of the question, the perfect prime or unison is excluded from the relationship between the pitch of the question and the pitch of the reply.

In an embodiment of the present invention, the interval between the pitch of the reply and the pitch of the reply is not limited to a consonant interval except for a perfect unison and may be any one of intervals within a predetermined range as below. Namely, the voice generation section may be configured to control the pitch of the voice of the reply in such a manner that an interval of the pitch of the second segment relative to the pitch of the first segment becomes any one of intervals within a predetermined range, except for a perfect unison, that is one octave up and down from the pitch of the first segment. If the pitch of the reply is displaced one octave up or down from the pitch of the question, not only the consonant interval relationship cannot be established, but also the dialogue would become unnatural. In this embodiment too, the perfect unison is excluded from the pitch relationship within the range one octave up and down from the pitch of the question, because, as noted above, the dialogue may become unnatural if the pitch of the reply and the pitch of the question are the same.

In an embodiment of the present invention, the voice generation section may be configured to control the pitch of the voice of the reply in such a manner that the interval of the pitch of the second segment relative to the pitch of the first segment becomes a consonant interval of five degrees down from the pitch of the first segment. This arrangement allows the user, having uttered the question, to have a good impression about the reply returned to the question.

Further, in an embodiment of the present invention, the voice generation section may be configured to provisionally set the pitch of the second segment of the voice of the reply at the pitch associated with the pitch of the first segment, and the voice generation section may be further configured to perform at least one of: an operation of, if the provisionally-set pitch of the second segment is lower than a predetermined first threshold value, changing the provisionally-set pitch to a pitch shifted one octave up; and an operation of, if the provisionally-set pitch of the second segment is higher than a predetermined second threshold value, changing the provisionally-set pitch to a pitch one octave down. Because, if the provisionally-set pitch of the second segment is lower than the predetermined first threshold value (or higher than the predetermined second threshold value), the voice generation section shifts the provisionally-set pitch of the second segment to the pitch one octave up (or down), this embodiment can prevent voice of the reply from being synthesized at unnaturally too low pitch (or unnaturally too high pitch).

In an embodiment of the present invention, the voice generation section may be configured to provisionally set the pitch of the second segment of the voice of the reply at the pitch associated with the pitch of the first segment, and the voice generation section may be further configured to change the provisionally-set pitch to a pitch shifted one octave up or down in accordance with a designated attribute. Here, the "attribute" is, for example, an attribute of voice to be synthesized, and examples of the attribute include attributes of a female, a child, an adult male, etc. In this case too, the voice generation section shifts the provisionally-set pitch of the second segment to the pitch one octave up (or down), and thus, this embodiment can prevent voice of the reply from being synthesized at unnaturally too low pitch (or unnaturally too high pitch) in view of the designated attribute.

Further, in an embodiment of the present invention, any one of a first mode and a second mode is settable as an operation mode of the voice generation section. In the first mode, the voice generation section may be configured to control the pitch of the voice of the reply in such a manner that the interval of the pitch of the second segment relative to the pitch of the first segment becomes a consonant interval, except for a perfect unison, from the pitch of the first segment. In the second mode, the voice generation section may be configured to control the pitch of the voice of the reply in such a manner that the interval of the pitch of the second segment relative to the pitch of the first segment becomes a dissonant interval from the pitch of the first segment. In the second mode, voice in the dissonant interval relationship with the question (remark) is synthesized, and thus, the embodiment can give an uncomfortable feeling to the user having uttered the question. Stated conversely, by setting the operation mode of the voice generation section in the second mode, the embodiment can call user's attention or intentionally give a threatening feel to the user. On the other hand, by setting the operation mode of the voice generation section in the first mode, the embodiment permits a consonant interval relationship between the question (remark) and the reply (response) and can thereby give a preferable feeling to the user. Thus, by allowing any one of the first and second modes to be used properly depending on the case, the embodiment can significantly enhance the usability of the voice synthesis apparatus.

When the operation mode of the voice generation section is the first mode, control may be performed in such a manner that the reply in the consonant interval relationship except for the perfect unison is output with a "pause" (or time interval) within a predetermined time range, in which case it is possible to prevent an uncomfortable feeling from being given to the user having uttered the question (remark). Here, a pause within the time range of 0.5 sec to 2.0 is considered to be proper.

Generally, in dialogues between persons, a pitch of a question is a factor that characterizes an impression of the question, but the impression of the question is also greatly influenced by non-linguistic information other than the pitch. When a question is uttered by a person with small voice as in a whisper, an impression that it is requested implicitly that a reply to the question be uttered with small voice is given to the other party. Further, even when a person remarks "I'm not sad" with a sad expression on his or her face (sad facial expression), the person is considered to be sad non-verbally although the person may sound sad verbally, and thus, an impression that a reply must be made in accordance with the non-verbal (unspoken) meaning of the remark. Therefore, in studying a dialogue system which outputs a reply to a question, uttered by a user, in synthesized voice, not only the pitch of the question but also non-verbal information other than the pitch can become an important factor in synthesizing the voice of the reply.

Thus, in an embodiment the voice synthesis apparatus of the invention may further comprise: a non-linguistic analysis section that analyzes non-linguistic information, other than pitch, related to the remark; and a control section that controls voice generation, in the voice generation section, of the reply in accordance with the analyzed non-linguistic information. Because the voice of the reply (replying voice) is controlled by the control section in accordance with the non-linguistic information, other than pitch, related to the remark (e.g., non-linguistic information, other than pitch, included in the remark, such as volume and speed, or facial expression of the user having uttered the remark, it is possible to synthesize replying voice harmonious with the non-linguistic information, other than pitch, related to the remark. Thus, the present invention can synthesize replying voice with an unnatural feel.

Note that the reply to be synthesized or generated in accordance with the present invention may be back-channel feedback (interjection), such as "ee", "naruhodo" or "sou desune", rather than being limited to a specific reply to the question (remark). Further, examples of the non-linguistic (non-verbal) information, other than pitch, in a question include facial expression, gesture, clothes, etc. of the user having uttered the question in addition to information related to the voice of the question like volume, voice quality and speed (speaking speed).

By the way, whereas a pitch of a question in a dialogue between persons is a factor that characterizes an impression of the question as noted above, it has been recognized empirically that a way of replying (responding) differs depending on the verbal or linguistic content of the question and the reply (response). For example, if a reply "Yes (hai)" is to be returned, the reply is returned to the question relatively quickly, but, if a reply "No (iie)" is to be returned, the reply is returned to the question with a little pause (time interval) in consideration of an impression that will be given to the other party in the dialogue. Therefore, in studying a dialogue system which outputs a reply to a question (remark), uttered by a user, in synthesized voice, the verbal or linguistic meaning of the question (remark) and the reply (response) too can become an important factor in synthesizing the voice of the reply.

In view of the foregoing, an embodiment of the present invention may further comprise: a linguistic analysis section that analyzes linguistic information included in the remark and the reply; and a control section that controls voice generation, in the voice generation section, of the reply in accordance with the analyzed linguistic information. Because the synthesis of the replying voice is controlled in accordance with the linguistic information included in the remark (question) and the reply (response), an impression as if a dialogue were being conducted with a person, although the replying voice is machine-synthesized voice. Note that one example form of controlling the synthesis of the voice of the reply (response) itself in accordance with the linguistic information include in the reply (response) as above may comprise controlling the voice of the reply (response) in accordance with whether the reply (response) has an affirmative meaning or a negative meaning.

By the way, it has been recognized empirically that the way of replying (responding) differs depending, for example, on a manner of pitch variation over time, rather than the pitch itself alone, in the remark. For example, even where a voiced remark ends with a noun like "asu wa hare" (romanized Japanese meaning "Will it be fine tomorrow?"), it can become a question (interrogative sentence) meaning "asu wa hare desuka?" ("Will it be fine tomorrow?") if the pitch rises toward the word ending. If the pitch is substantially constant in the remark "asu wa hare", this remark should be a kind of mere monologue or mutter. Thus, a reply (back-channel feedback) like "so desune" responsive to the remark will also be substantially constant in pitch. Therefore, in studying a dialogue system which returns a reply to a remark, uttered by a user, in synthesized voice, not only the pitch of the remark but also the non-verbal or non-linguistic information indicative of a manner of pitch variation of the remark can become an important factor in synthesizing the voice of the reply.

In view of the foregoing, one embodiment of the present invention may further comprise: a non-linguistic analysis section that analyzes pitch variation in the remark; and a control section that controls a pitch of voice of the reply, generated in the voice generation section, to vary in accordance with the pitch variation in the remark. Because the pitch variation in the reply is controlled in accordance with the pitch variation over time in the remark, an impression as if a dialogue were being conducted with a person can be given to the user, although the voice of the reply (replying voice) is machine-synthesized voice. Note that one example form of controlling the pitch of the voice of the reply in accordance with the manner of pitch variation in the remark as above may comprise making flat the reply as back-channel feedback if there is almost no pitch variation over time in the remark (i.e., if the pitch in the remark is flat). Further, if the remark is an interrogative sentence where the pitch rises toward the word ending, one example form of controlling the pitch of the voice of the reply in accordance with the manner of pitch variation in the remark may comprise lowering the pitch of the reply toward the word ending.

By the way, in studying a dialogue system which returns a reply to a remark, uttered by a user, in synthesized voice, it is conceivable that persons of various attributes, irrespective of sex and age, become users of the dialogue system. Further, there are typical models in data, such as voice fragments, that are to be used in voice synthesis. Stated conversely, voice of replies can be synthesized with various voice quality as long as a plurality of models are prepared in advance for use in voice synthesis. Thus, where replies are to be output through voice synthesis (i.e., in synthesized voice), the replies can be output with various attributes (agent attributes). Therefore, in the dialogue system, it must be taken into consideration that there are a variety of combinations of attributes of users (utterers' or speakers' attributes) and agent attributes. More specifically, in a case where an utterer or speaker of a remark is a female and a replier is a male, and if the male attempts to reply to the remark in such a manner that the pitch of the word ending or the like of the reply to the remark assumes a predetermined relationship with the pitch of the word ending of the female's remark, the pitch of the word ending or the like of the reply would be too high for the male, so that the reply would undesirably become unnatural. Conversely, in a case where the utterer or speaker of a remark is a male and the replier is a female, and if the female attempts to reply to the remark in such a manner that the pitch of the word ending or the like of the reply to the remark assumes a predetermined relationship with the pitch of the word ending of the male's remark, the pitch of the word ending or the like of the reply would be too low for the female.

In view of the foregoing, an embodiment of the present invention is proposed, in which the voice generation section may be configured to associate the pitch of the second segment with the pitch of the first segment in accordance with a given rule and generate voice with a characteristic based on a given agent attribute, and the embodiment may further comprise a control section that determines the rule based on at least one the agent attribute and an attribute of a speaker of the remark.

According to the embodiment, the rule for associating the pitch of the second segment with the pitch of the first segment is determined on the basis of the attribute of a speaker of the remark or the agent attribute. Thus, a pitch characteristic of the voice of the reply that is controlled in pitch in accordance with the determined rule will be variably controlled in accordance with at least one of the attribute of the speaker of the remark and the agent attribute. Thus, although the voice of the reply to the remark is machine-synthesized voice, a natural dialogue feel can be given to the user, and a kind of delight can be given to the user about conducting a dialogue using the voice synthesis apparatus of the invention.

The agent attribute is an attribute of a model to be used for synthesizing voice, such as a sex or age. As an example, one or a plurality of agent attributes are preset in the voice synthesis apparatus, so that any one of the agent attributes can be selected or set for use in synthesis of voice as appropriate. Further, the attribute of the speaker of the remark is the sex of the speaker, such as male, female or neutral. Further, examples of the attribute of the speaker of the remark may include, in addition to the sex, the age, and the generation like child generation, adult generation and aged man generation. Such an attribute of the speaker may be indicated to the voice synthesis apparatus in advance as the remark is input to the voice synthesis apparatus, or may be automatically identified by the voice synthesis apparatus analyzing a voice signal of the received remark.

Even where an attempt is made to find, on the basis of statistics, pitch relationships which people can feel comfortable etc., such pitch relationships which people can feel comfortable etc. differ from one person to another, and thus, there are limitations to obtaining preferable rules only through statistical analyses. Further, in a dialogue system which returns a reply to a remark, uttered by a particular user, in synthesized voice, it is important to increase the number and frequency of remarks of the particular user, or simply put, liven up a dialogue between the particular user and the machine.

In view of the foregoing, an embodiment of the present invention is proposed, in which the voice generation section may be configured to associate the pitch of the second segment with the analyzed pitch of the first segment in accordance with a given rule and generate voice with a characteristic based on a given agent attribute, and the embodiment may further comprise a control section that updates the rule based on receiving voice of a further remark via the sound input section after sounding of the voice of the reply. The above-mentioned rule for associating the pitch of the second segment of the reply with the analyzed pitch of the first segment is updated based on receiving the voice of the further remark via the sound input section after generation or sounding of the voice of the remark. Namely, the rule to be applied to sounding or generation of voice of the next reply is updated as appropriate in consideration of the further remark uttered by the user in response to the machine-synthesized reply. This rule-updating feature can direct the dialogue in a livelier direction.

The aforementioned embodiment may be configured so that the above-mentioned rule is set in accordance with any one of a plurality of preset scenes. Here, examples of the scenes include combinations of sexes and ages of speakers and sexes and ages of voice to be synthesized, combinations of speeds (rapid utterance and slow utterance) of remarks and speeds of replies whose voice is to be synthesized, purposes of dialogues (such as voice guidance), etc.

In a typical dialogue between persons, one of the persons (person a) utters a remark, and the other person (person b) utters a remark in response to the remark of person a. However, the remark of person b responsive to the remark of person a is not always a reply in the form of a specific sentence and may sometimes be in the form of mere back-channel feedback like "a, hai", "sou desune", "sorede" or the like. Further, it is well known empirically that, in the dialogue between persons, such back-channel feedback is returned to the remark of person a promptly with a good response. Thus, in studying a dialogue system which returns a reply to a remark, uttered by a user, in synthesized voice, it is important to allow back-channel feedback to be output as a simple reply promptly with a good response.

In view of the foregoing, a coding/decoding device according to another aspect of the present invention comprises: an A/D converter that converts an input voice signal of a remark into a digital signal; a pitch analysis section that analyzes a pitch of a first segment of the remark based on the digital signal; a back-channel feedback acquisition section that, when back-channel feedback is to be returned to the remark, acquires back-channel feedback data corresponding to a meaning of the remark, a pitch control section that controls a pitch of the back-channel feedback data in such a manner that a second segment of the back-channel feedback data has a pitch associated with the analyzed pitch of the first segment; and a D/A converter configured to convert the pitch-controlled back-channel feedback data into an analogue signal. Such arrangements can provide a compact coding/decoding device which is capable of realizing a man-machine dialogue function and which is configured in such a manner that the remark input as an analogue signal is processed after being converted into a digital signal, voice data of back-channel feedback corresponding to the meaning of the remark is created digitally, and an analogue back-channel feedback voice signal is ultimately output. In this way, back-channel feedback can be created promptly with a good response, and it is possible to prevent an unnatural feeling from accompanying synthesized voice of the back-channel feedback.

According to still another aspect of the present invention, there is provided a voice synthesis system comprising a coding/decoding device and a host computer. Here, the coding/decoding device comprises: an A/D converter that converts an input voice signal of a remark into a digital signal; a pitch analysis section that analyzes a pitch of a first segment of the remark based on the digital signal; a back-channel feedback acquisition section that, when back-channel feedback is to be returned to the remark, acquires back-channel feedback data corresponding to a meaning of the remark; a pitch control section that controls a pitch of the back-channel feedback data in such a manner that a second segment of the back-channel feedback data has a pitch associated with the analyzed pitch of the first segment; and a D/A converter configured to convert the pitch-controlled back-channel feedback data into an analogue signal. The host computer is configured in such a manner that, when replying voice other than the back-channel feedback is to be returned to the remark, the host computer acquires replying voice data, responsive to the remark, in accordance with the digital signal converted by the A/D converter and returns the acquired replying voice data to the coding/decoding device, the pitch control section is further configured to control a pitch of the replying voice data in such a manner that a third segment of the received replying voice data has a pitch associated with the analyzed pitch of the first segment, and the D/A converter is further configured to convert the pitch-controlled replying voice data, into an analogue signal.

Thus, voice of back-channel feedback (simple reply) responsive to the input remark can be generated efficiently through prompt processing by the coding/decoding device, while voice of a reply having a relatively complicated linguistic meaning responsive to the input remark can be generated efficiently through large-capacity centralized processing by the host computer, so that there can be provided a voice synthesis system capable of realizing a flexible man-machine dialogue function.

The present invention may be embodied only as the voice synthesis apparatus or system or the coding/invention device discussed above but also as a method implemented by a computer or processor. Also, the present invention may be embodied as a non-transitory computer-readable storage medium storing a software program comprising a group of instructions for causing a computer or processor to function as the voice synthesis apparatus.

In the present invention, pitch (frequency) of a question is an object of analysis while pitch of a reply is an object of control, as discussed above and below. However, as apparent from the above-discussed examples of formants, human voice has certain frequency bands, and thus, human voice would unavoidably present errors within a certain frequency range in the analysis and control as well. Besides, errors inevitably occur in analyses and control. Therefore, according to the present invention, it is allowed that, for the analysis and control, human voice accompanies errors within a certain range, instead of being constant in pitch (frequency) values.

BRIEF DESCRIPTION OF DRAWINGS

FIG. 3 is a diagram showing relationship between pitch names and frequencies etc.;

FIGS. 6(*a*), 6(*b*), 6(*c*), 6(*d*), 6(*e*) and 6(*f*) are diagrams showing examples of pitch shift operations performed on a voice sequence;

FIGS. 7(*a*), 7(*b*), and 7(*c*) are diagrams showing psychological impressions which voice synthesis gives to a user's remark;

FIGS. 9(*a*) and 9(*b*) are diagrams showing an example manner in which pitch conversion is performed on voice waveform data;

FIG. 10 is a flow chart showing primary portions of a process in Application Example 1;

FIG. 11 is a flow chart showing primary portions of a process in Application Example 2;

FIG. 12 is a flow chart showing primary portions of a process in Application Example 3;

FIGS. 13(a) and 13(b) provide a flow chart showing primary portions of a process in Application Example 4;

FIG. 16 is a block diagram showing a construction of a fourth embodiment of the voice synthesis apparatus of the present invention;

FIGS. 17(a) and 17(b) are diagrams explanatory of voice synthesis in a fifth embodiment of the present invention;

FIGS. 22(a) and 22(b) are diagrams showing an example of a pitch shift operation performed on a voice sequence;

FIGS. 23(a) and 23(b) are diagrams showing an example of a pitch shift operation performed on a voice sequence;

FIGS. 24(a) and 24(b) are diagrams showing an example of a pitch shift operation performed on a voice sequence;

FIGS. 29(a) and 29(b) are diagrams showing a particular specific example manner in which a word ending and pitch variation are identified;

FIGS. 30(a) and 30(b) are diagrams showing an example of a pitch shift operation performed on a voice sequence;

FIGS. 31(a) and 31(b) are diagrams showing an example of a pitch shift operation performed on a voice sequence;

FIG. 35 is a flow chart showing details of a rule determination process in the voice synthesis processing of FIG. 34;

FIGS. 36(a) and 36(b) are diagrams showing an example of a pitch shift operation performed on a voice sequence;

FIG. 37 is a diagram showing an example of a pitch shift operation performed on a voice sequence;

FIG. 38 is a diagram showing an example of a pitch shift operation performed on a voice sequence;

FIG. 39 is a diagram showing an example of a pitch shift operation performed on a voice sequence;

FIG. 40 is a diagram showing an example of a pitch shift operation performed on a voice sequence;

FIG. 41 is a block diagram showing a construction of an eleventh embodiment of the voice synthesis apparatus of the present invention;

FIG. 42 is a diagram showing an example of an index table in the eleventh embodiment of the voice synthesis apparatus;

FIG. 43 is a diagram showing an example switching in an operation period in the eleventh embodiment of the voice synthesis apparatus.

FIGS. 47(a), 47(b), 47(c), and 47(d) are diagrams showing examples of index tables in a thirteenth embodiment of the voice synthesis apparatus;

DESCRIPTION OF EMBODIMENTS

Now, preferred embodiments of the present invention will hereinafter be described in detail with reference to the accompanying drawings.

<First Embodiment>

Figure 1:
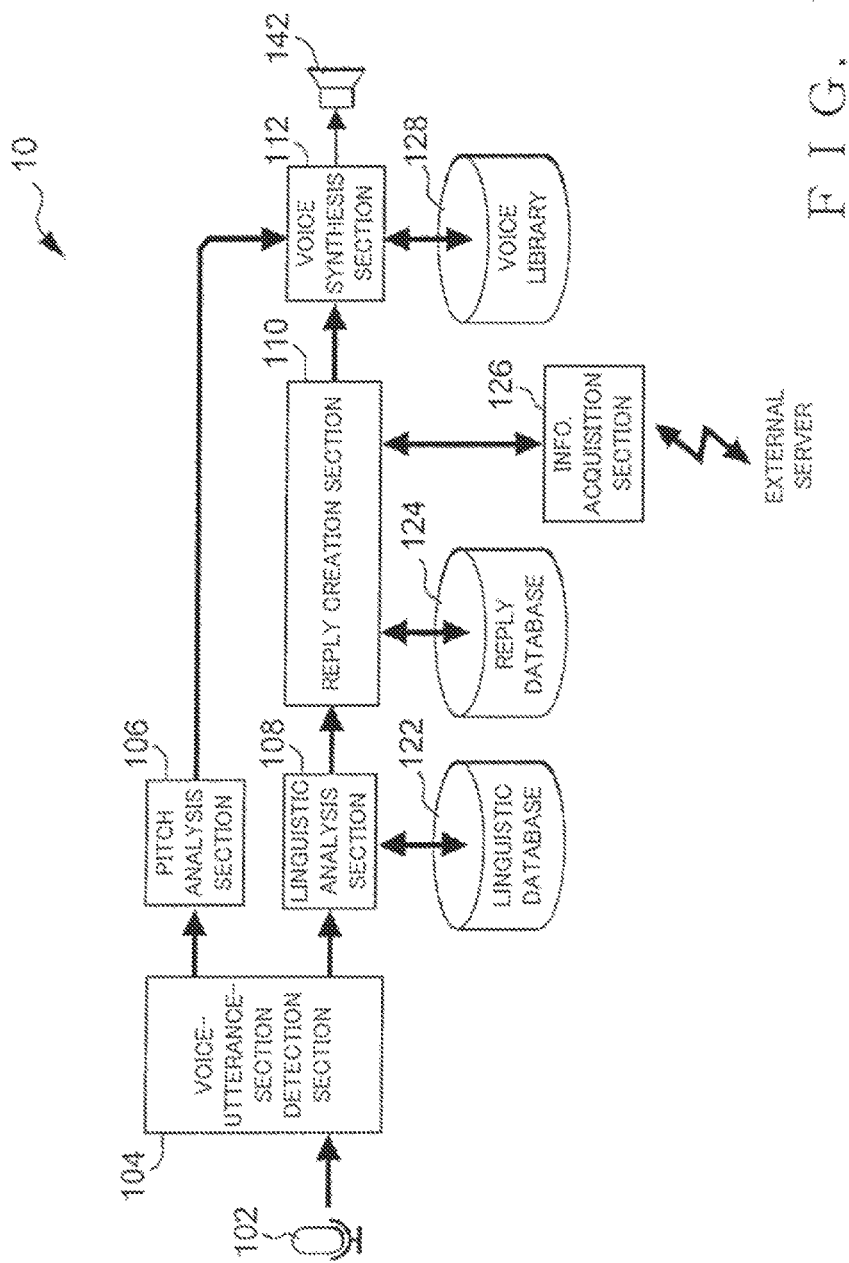
FIG. 1 is a block diagram showing a construction of a first embodiment of a voice synthesis apparatus of the present invention.

First of all, a first embodiment of a voice synthesis apparatus of the present invention will be described. FIG. 1 is a block diagram showing a construction of the first embodiment of the voice synthesis apparatus 10 of the present invention. In FIG. 1, the voice synthesis apparatus 10 is a terminal apparatus, such as a mobile or portable apparatus, including a CPU (Central Processing Unit), a voice input section 102, and a speaker 142. In the voice synthesis apparatus 10, a plurality of functional blocks are built as follows by the CPU executing a preinstalled application program.

More specifically, in the tone synthesis apparatus 10 are built a voice-utterance-section detection section 104, a pitch analysis section 106, a linguistic analysis section 108, a reply creation section 110, a voice synthesis section 112, a linguistic database 122, a reply database 124, an information acquisition section 126 and a voice library 128. Namely, each of the functional blocks in the illustrated voice synthesis section 10 is implemented through cooperation between a program module corresponding to the functional block and the CPU. However, as obvious to persons skilled in the art, at least some of the functional blocks may be implemented by a DSP (Digital Signal Processor) or by a discrete hardware circuit section.

Although not particularly shown, the tone synthesis apparatus 10 further includes a display section, an operation input section, etc. so that a user can check states of the apparatus and input various operations to the apparatus. Further, the voice synthesis apparatus 10 may be a notebook-type or tablet-type personal computer rather than a terminal apparatus, such as a portable phone.

As will be detailed later, the voice input section 102 comprises: a microphone that converts a voice input by the user into an electrical voice signal; an LPF (Low Pass Filter) that cuts off high frequency components of the converted voice signal; and an A/D converter that converts the voice signal, having the high-frequency components cut off therefrom, into a digital signal. Thus, the voice input section 102 is constructed to receive an input voice signal of a question or remark uttered by the user. The voice-utterance-section detection section 104 detects a voice utterance section by processing the voice signal converted into the digital signal.

Figure 2:
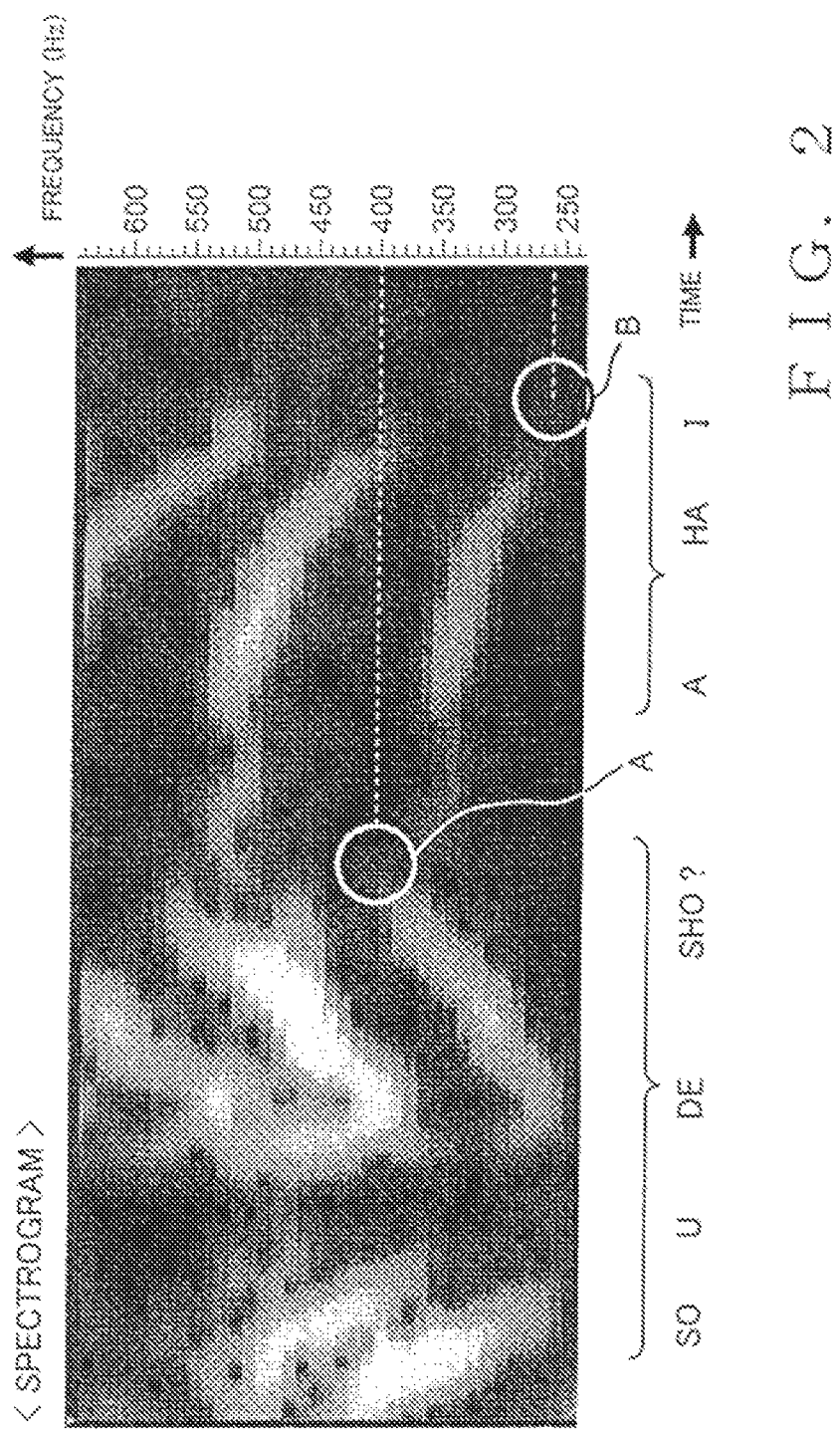
FIG. 2 is a diagram showing an example of formants of voice in a dialogue.

The pitch analysis section 106 performs frequency analysis on the voice signal detected as the voice utterance section. Of a first formant obtained through the frequency analysis, the pitch analysis section 106 obtains a pitch of a particular segment (first segment) of the voice signal and outputs pitch data indicative of the obtained pitch. Note that the first segment here is, for example, the word ending of a question (or remark), and that the first formant is one of a plurality of formants, obtained for example through the frequency analysis of the voice, which is the lowest in frequency; in the illustrated example of FIG. 2, the first formant is a peak zone whose end is indicated by reference character "A". For the frequency analysis, the FFT (Fast Fourier Transform) or any other desired conventionally-known method may be employed. A specific technique for identifying the word ending of a question (or remark) will be described in detail later.

The linguistic analysis section 108 determines, with reference to phoneme models prestored in the linguistic database 122, which phoneme the detected voice signal detected as the voice utterance section is closest to, and thereby analyzes (identifies) a meaning of words defined by the voice signal. Note that the hidden Markov models can be used as phoneme models.

The reply creation section 110 creates a reply corresponding to the meaning identified by the linguistic analysis section 108, with reference to the reply database 124 and the information acquisition section 126. For example, in response to a question (or a remark) "What time is it now?", the voice synthesis section 10 acquires time information from a built-in realtime clock (not shown) and other information than the time information from the reply database 124. In this manner, the reply creation section 110 can create a reply (response) "It is xx hours and xx minutes".

In response to a question "ashita no tenki wa" (romanized Japanese meaning "How will the weather be tomorrow?"), on the other hand, the voice synthesis section 10 is unable to create a reply unless it accesses an external server to acquire weather information. Namely, the information acquisition section 126 is constructed or configured to access the external serer via the Internet to acquire information necessary for creation of the reply if the voice synthesis apparatus 10 cannot create the reply. Namely, the reply creation section 110 is constructed or configured to acquire, from the reply database 124 or the external server, a reply (response) to the question. In the aforementioned manner, a combination of the reply creation section 110, the reply database 124, the information acquisition section 126, etc. functions as an acquisition section constructed to acquire a reply to the remark.

In the instant embodiment, the reply creation section 110 outputs a reply as a phoneme train that is a voice sequence defining pitches and generation timing of individual phonemes. By the voice synthesis section 112 synthesizing voice in accordance with such a voice sequence defining pitches and generation timing of individual phonemes, fundamental voice of the reply can be output. However, in the instant embodiment, the fundamental voice, defined by the voice sequence, is output after the voice synthesis section 112 changing the fundamental voice.

The voice synthesis section 112 performs voice synthesis by changing the pitches of the entire voice sequence in such a manner that the pitch of a particular segment (second segment) of the replying voice sequence created by the reply creation section 110 assumes a predetermined interval relationship with pitch data of the first segment supplied from the pitch analysis section 106, and then, the voice synthesis section 112 outputs the synthesized voice as a replying voice signal. Note that, whereas the second segment is described as a segment constituting the word ending of the reply, it is not limited to such a word ending of the reply as will be described later. Further, whereas the pitch having the predetermined interval relationship with the pitch data of the first segment is described as a pitch five degrees down from (lower than) the pitch represented by the pitch data, it may be a pitch having a relationship other than five degrees down from the pitch represented by the pitch data. In any case, the voice synthesis section 112 functions as a voice generation section not only constructed to generate voice of the acquired reply but also constructed to control the pitch of the replying voice to have a pitch associated with the pitch of the analyzed first segment.

In synthesizing voice, the voice synthesis section 112 uses voice fragment data registered in the voice library 128. The voice library 128 is a database having preregistered therein voice fragment data defining waveforms of various voice fragments, such as individual phonemes and phoneme-to-phoneme transition portions, that are to be used as materials of voice. More specifically, the voice synthesis section 112 generates a voice signal by combining voice fragment data of individual sounds (phonemes) of a voice sequence, modifying connection portions between the sounds (phonemes) and changing the pitch of the word ending of the reply. Note that the voice signal thus generated by the voice synthesis section 112 is converted into an analog signal by a not-shown D/A conversion section and then audibly output through the speaker 142.

Figure 4:
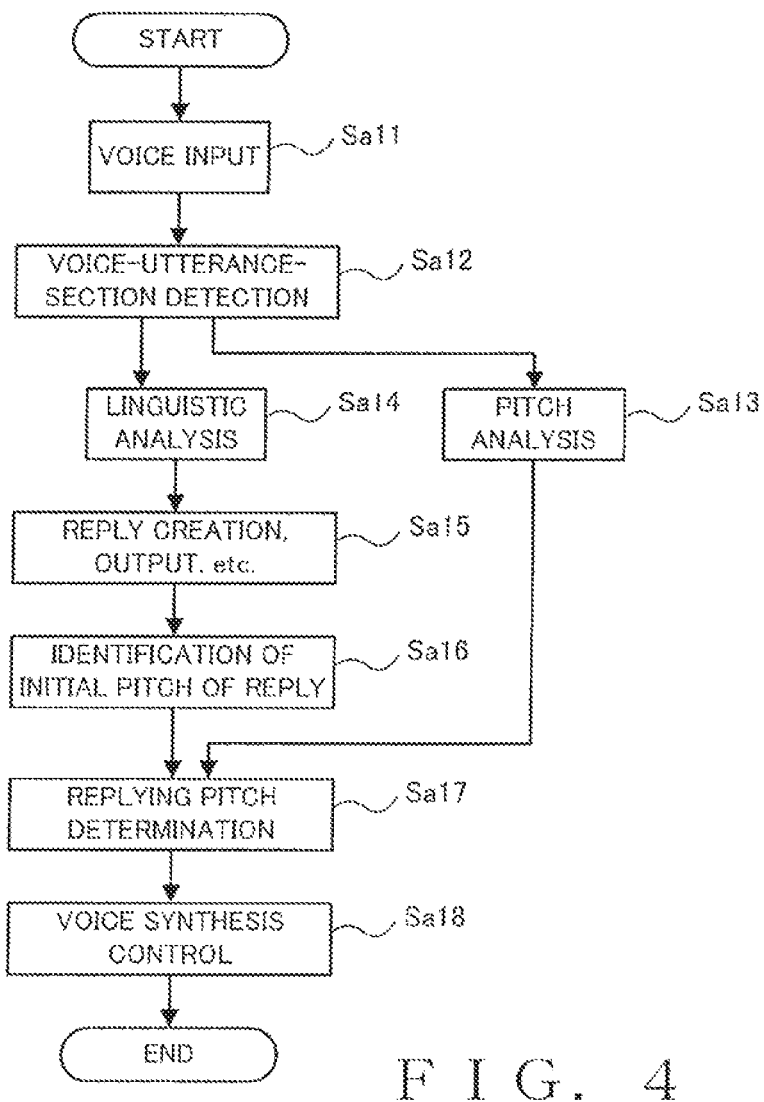
FIG. 4 is a flow chart showing processing performed by the first embodiment of the voice synthesis apparatus.

The following describe behavior of the voice synthesis apparatus 10, with reference to FIG. 4 that is a flow chart showing processing performed by the voice synthesis apparatus 10. First, once the user performs a predetermined operation, e.g. once the user selects, on a main menu, an icon or the like corresponding to a dialogue process, the CPU activates an application program corresponding to the process. By activating the application program, the CPU builds the functions of the various sections shown in the block diagram shown in FIG. 1.

First, at step Sa11, the user inputs a question or remark in vocal form to the voice input section 102, and the voice input section 102 receives the input voice signal. Then, at step Sa12, the utterance-section-detection section 104 detects, as a silent section, a section of the input voice signal where a zero intensity state, i.e. zero volume state, of the voice continues for more than a predetermined time period and detects the other section of the input voice signal as a voice utterance section, and then the voice-utterance-section detection section 104 supplies the voice signal of the voice utterance section to the pitch analysis section 106 and the linguistic analysis section 108.

Then, at step Sa13, the pitch analysis section 106 analyzes the voice signal, in the detected utterance section, of the question (or remark), identifies a pitch of the first segment (word ending) in the question (or remark), and then supplies pitch data indicative of the identified pitch to the voice synthesis section 112. The following describe an example of a specific method for identifying the word end in the question (or remark) by means of the pitch analysis section 106.

Assuming a dialogue where a person giving a question (or remark) wants a reply to the question (or remark), it is considered that a portion of the question (or renark) that constitutes to the word ending will temporarily become large in volume as compared to the other portions. Thus, a pitch of the first segment (word ending) can be identified, for example, in the following manner.

Figure 5A:
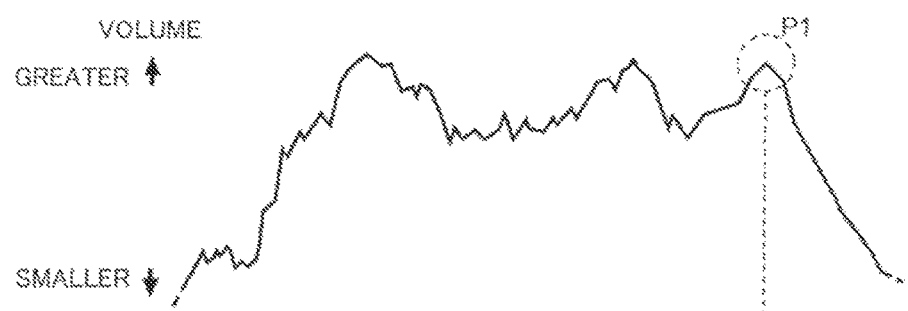
FIGS. 5(*a*) and 5(*b*) are diagrams showing an example specific manner in which a word ending is identified.
Figure 5B:

First, the pitch analysis section 106 converts a voice signal of the question (or remark), detected as an utterance section, into waveforms separately for the volume and pitch of the question (or remark). FIG. 5(*a*) shows an example of the volume waveform of the voice signal, where the vertical axis represents the volume of the voice signal while the horizontal axis represents the elapsed time. FIG. 5(*b*) shows an example of the pitch waveform of the voice signal, where the vertical axis represents the pitch of the first formant obtained through frequency analysis of the same voice signal while the horizontal axis the elapsed time. Note that the time axis is the same between the volume waveform of FIG. 5(*a*) and the pitch waveform of FIG. 5(*b*). As shown, the volume waveform has a plurality of local maximums (local peaks).

Second, the pitch analysis section 106 identifies a time of the temporally last local peak P1 of the volume waveform of FIG. 5(*a*).

Third, the pitch analysis section 106 identifies, as the word ending, a predetermined time range (e.g., 100 μsec-300 μsec) before and after the identified time of the local peak P1.

Fourth, the pitch analysis section 106 extracts and outputs, as pitch data of the first segment, an average pitch of a segment Q1 corresponding to the identified word ending of the utterance of the pitch waveform shown in FIG. 5(*b*).

It is considered that identifying the last local peak P1 of the volume waveform in the utterance section as the time corresponding to the word ending of the question (or remark) as above can reduce erroneous detection of the word ending of the question in the dialogue.

Whereas the predetermined time range before and after the temporally last local peak P1 in the volume waveform shown in FIG. 5(*a*) has been described as being the word ending, a predetermined time range having the local peak P1 as its start or end time point may be identified as the word ending. Further, a pitch at the start or end time point of the segment Q1 or at the local peak P1, rather than the average pitch of the segment Q1 corresponding to the identified word ending, may be extracted and output as the pitch data of the first segment.

Meanwhile, at step Sa14, the linguistic analysis section 108 analyzes a meaning of words in the input voice signal and supplies the reply creation section 110 with data indicative of the meaning of the words. Then, at step Sa15, the reply creation section 110 acquires a replying linguistic data train by creating appropriate replying words corresponding to the analyzed meaning of the words by use of the reply database 124 or acquiring such appropriate replying words from an external server via the information acquisition section 126 as necessary, then creates a voice sequence (replying voice sequence) on the basis of the acquired linguistic data train, and then supplies the created voice sequence to the voice synthesis section 112.

FIG. 6(*a*) is a diagram showing, in a staff notation, an example fundamental pitch variation in a replying voice sequence in Japanese created in response to a question (remark) of "ashita no tenki wa" (romanized Japanese meaning "How will the weather be tomorrow?"). In the illustrated example of FIG. 6(*a*), a note is allocated to each of sounds (syllables) in a reply "hare desu" (romanized Japanese meaning "It will be fine tomorrow."), so as to indicate pitches and generation timing of individual words (syllables or phonemes) of fundamental voice defined by the voice sequence. Although one note is allocated to each of the sounds (syllables or phonemes) in the illustrated example of FIG. 6(*a*) for simplicity of explanation, a plurality of notes may be allocated to a given one of the sounds by use of a note-connecting symbol, such as a slur or glissando, a plurality of sounds of different pitches may be interconnected transiently, etc. (see for example FIG. 6(*c*)).

Next, at step Sa16, the voice synthesis section 112 identifies a pitch (initial pitch) of a predetermined second segment (the word ending of the utterance in this case) in the replying voice sequence supplied from the reply creation section 110. For example, in FIG. 6(*a*), the note depicted by reference character "B" indicates a pitch (initial pitch) of a segment "su" (romanized Japanese) at the word ending (second segment) in a reply "hare desu"; in the illustrated example of FIG. 6(*a*), the pitch of the second segment is "F". Extraction of the second segment (word ending in the illustrated example) from the acquired replying voice sequence may be performed by any suitable scheme. For example, because the individual syllables in the replying voice sequence can be distinguished from one another, the segment of the last syllable may be extracted as the second segment (word ending).

Then, at step Sa17, the voice synthesis section 112 changes the pitches defined in the voice sequence in such a manner that the initial pitch of the word ending defined in the voice sequence assumes an interval relationship of five degrees up from (lower than) the pitch indicated by the pitch data supplied from the pitch analysis section 106.

FIG. 6(*b*) is a diagram showing, in a staff notation, an example of replying voice "hare desu" (romanized Japanese) having been pitch-shifted to be five degrees down from (lower than) the pitches shown in FIG. 6(*a*). In FIG. 6(*b*), a note depicted by reference character "A" indicates an example pitch of a segment (first segment) of "wa" (romanized Japanese) at the word ending of a question "ashita no tenki wa?" (romanized Japanese); in the illustrated example, the pitch of the word ending of the question is "G". In this case, the voice synthesis section 112 shifts the pitches in the entire voice sequence in such a manner that the pitch of the segment of "su" at the word ending, depicted by reference character "B", in the reply "hare desu" (romanized Japanese) is changed to "C" that is five degrees down from (lower than) the pitch "G".

Then, at step Sa18, the voice synthesis section 12 synthesizes the voice of the thus-changed voice sequence and outputs the synthesized voice. Although not particularly shown, once the voice of the reply (replying voice) is output, the CPU terminates the execution of the instant application program and returns to a menu screen.

The pitch variation pattern (note pattern) of the replying voice sequence is not limited to the ones shown in FIG. 6(a) and FIG. 6(b), and any other pitch variation pattern may be set as desired. FIG. 6(c) and FIG. 6(d) show examples where the same linguistic data train of "hare desu" (romanized Japanese) is sounded in a pitch variation pattern different from those shown in FIG. 6(a) and FIG. 6(b).

FIG. 6(a) to FIG. 6(d) show example replies in Japanese. Needless to say, if the type of the language used for the reply differs, the voice completely differs and hence the pitch variation pattern (note pattern) including intonations and accents differs, although the meaning of the reply is the same. Thus, an example replying voice will be discussed below for several different types of languages. FIG. 6(e) shows, in a staff notation, an example pitch variation pattern (note pattern) having been subjected to pitch shifting in a case where the reply of "hare desu" is made in English (i.e., "It'll be fine."). FIG. 6(f) shows, in a staff notation, an example pitch variation pattern (note pattern) having been subjected to pitch shifting in a case where the reply of "hare desu" is made in Chinese.

FIG. 7 is a diagram explanatory of various impressions which the embodiment of the voice synthesis apparatus 10 gives a user. As shown in FIG. 7(a), the user W inputs a question "ashita no tenki wa?" (romanized Japanese) to the voice synthesis apparatus 10 that is a terminal apparatus. If a pitch of "wa" that constitutes the word ending of the question is "G", voice of a voice sequence "hare desu" (romanized Japanese) constituting a reply to the question is synthesized in the instant embodiment with the pitches shifted so that the pitch of "su" (romanized Japanese) at the word ending of the reply becomes "C", as shown in FIG. 7(c). In this manner, the instant embodiment can give the user W a good impression as if a dialogue were being actually conducted, without giving the user an unnatural feel.

If, on the other hand, the voice of the voice sequence "hare desu" (romanized Japanese) is synthesized without the pitches being shifted (see FIG. 6(a)), then "su" (romanized Japanese) at the word ending of the reply is output with the pitch "F", as shown in FIG. 7(c). In this case, the pitch "F" is in a dissonant interval relationship with the pitch "G" of "wa" (romanized Japanese) that constitutes the word ending of the question "ashita no tenki wa?" (romanized Japanese). Namely, as seen in FIG. 3, the frequency of the pitch "G" that is 396.0 Hz is in a 9/8 relationship with the frequency of the "F" that is 352.0 Hz. Thus, a bad impression like disgust, rather than an unnatural feel, would be given to the user W. Note, however, that the voice synthesis apparatus 10 may be configured to positively give such a bad impression to the user.

<Second Embodiment>

Figure 8:
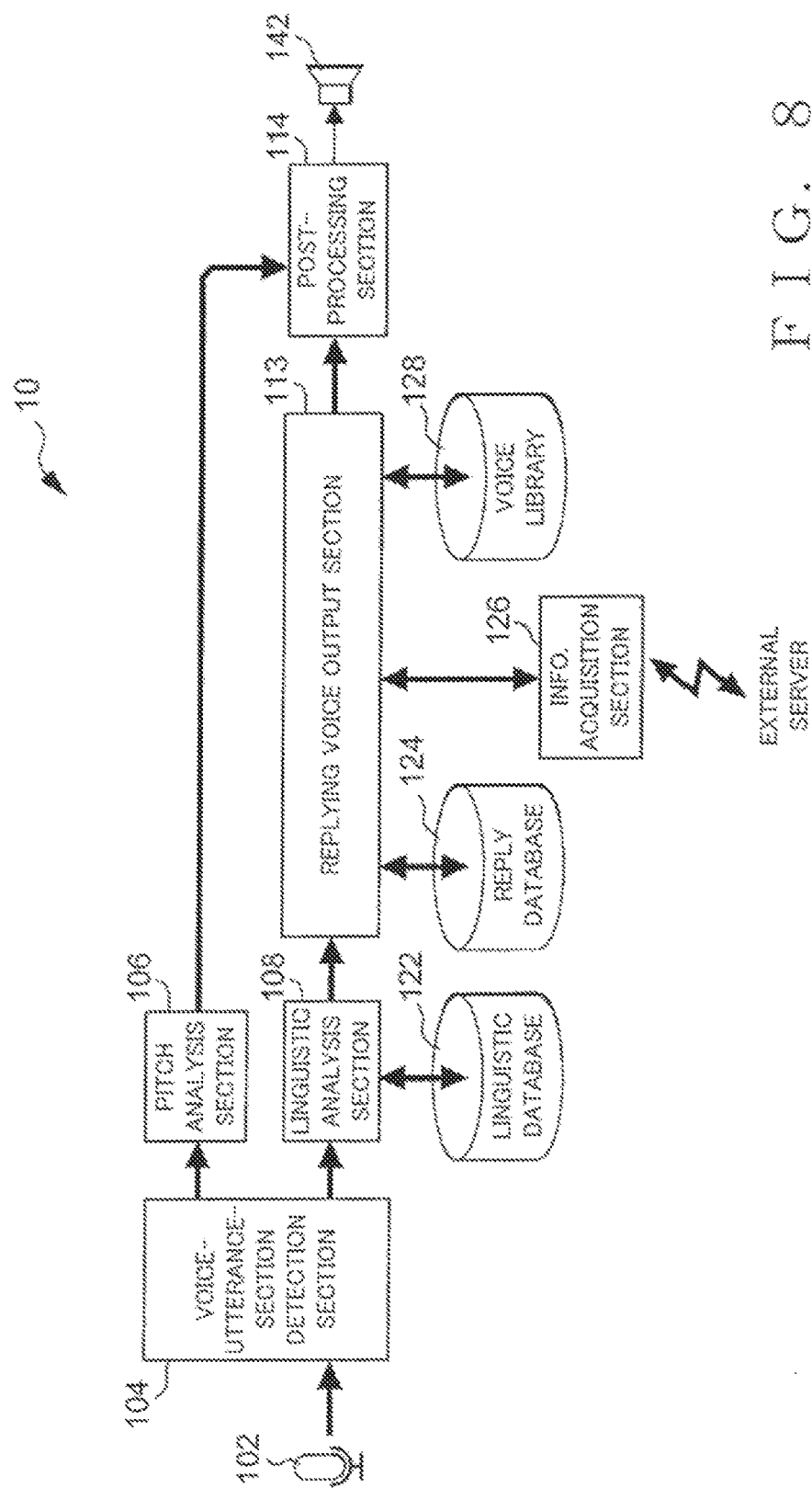
FIG. 8 is a block diagram showing a construction of a second embodiment of a voice synthesis apparatus of the present invention.

The following describe a second embodiment of the voice synthesis apparatus 10 of the present invention, which employs a modification of the replying voice generation method. FIG. 8 is a block diagram showing a construction of the second embodiment of the voice synthesis apparatus 10 of the present invention. Whereas the above-described first embodiment is constructed in such a manner that the reply creation section 110 outputs a voice sequence where a pitch is allocated per sound (syllable) of a replying language responsive to a question and that the voice synthesis section 112 synthesizes voice of a reply (replying voice) on the basis of the voice sequence, the second embodiment is constructed in such a manner that the replying voice output section 113 acquires a reply (response) to a question (remark) and generates and outputs voice waveform data of the entire reply (response).

Examples of the above-mentioned reply (response) include one created by the replying voice output section 113, one acquired from an external server, one selected from among a plurality of replies prepared in advance. Further, the above-mentioned voice waveform data is, for example, data in the WAV format, where each sound (syllable) is not divided from the other sounds (syllables) as divided in the aforementioned voice sequence; namely, no pitch is explicitly allocated per syllable. FIG. 9(a) shows an example pitch variation pattern of such replying voice waveform data, which corresponds to fundamental voice as in FIG. 6(a). Thus, if the voice waveform data comprising such fundamental voice is simply reproduced, the reproduced voice waveform data would not appropriately correspond to a pitch variation of the question (remark or utterance input) and would give a mechanical feel. In view of this, the second embodiment is constructed to control the pitches of the voice waveform data in accordance with the pitch variation of the question (remark or utterance input), as in the first embodiment. For that purpose, a post-processing section 114 is provided in the second embodiment.

The post-processing section 114 performs control to change the pitches of the entire voice waveform data of the replying voice in such a manner that the pitch of the word ending of the reply (responsive output) assumes a predetermined interval relationship (e.g., consonant interval relationship) with the pitch of the word ending of the question (utterance input). More specifically, the post-processing section 114 analyzes the pitch (initial pitch) at the word ending (second segment) in the replying voice waveform data (fundamental voice) output from the replying voice output section 113, and then the post-processing section 114 performs pitch conversion on the entire voice waveform data (fundamental voice) output from the replying voice output section 113 in such a manner that the pitch of the word ending (second segment) assumes a predetermined interval relationship with, e.g. five degrees down from (lower than), the pitch of the word ending (second segment) of the input voice supplied from the pitch analysis section 106. Namely, the post-processing section 114 changes the pitch of the word ending of the acquired reply (response) so as to be five degrees down from the pitch of the word ending of the question (remark) that is an example consonant interval relationship with the pitch of the word ending of the question (remark). As shown in FIG. 9(b), a result of the pitch conversion is substantially similar to the result of the pitch shift shown in FIG. 6(b). Note that, to analyze the pitch (initial pitch) at the word ending (second segment) in the replying voice waveform data, the post-processing section 114 may use a method similar to the method described above with reference to FIG. 5. Namely, the post-processing section 114 may analyze the volume of the replying voice waveform data to detect the last local maximum (local peak) and identify as the word ending (second segment) a suitable time range containing the last local maximum.

Because the second embodiment constructed as above does not include a mechanism for performing complicated voice syntheses like the voice synthesis section 112, it is well suited for application to cases where words of replying voice are not complicated (e.g., to a reply comprising simple back-channel feedback). Namely, where a reply to a question need not be so complicated or specific, e.g., where a reply to a question is made with a simple reply like "hai" ("Yes") or "iie" ("No") or back-channel feedback like "sou desune" ("I agree."), the replying voice output section 113 only has to select and output, from among a plurality of prestored voice waveform data, voice waveform data suitable to the question, with the result that the voice synthesis apparatus can be simplified in construction.

In the second embodiment, a combination of the replying voice output section 113 and the post-processing section 114 functions as a voice generation section that is configured to generate voice of the acquired reply, but also configured to control the pitches of the voice of the acquired reply in such a manner that the second segment of the voice has a pitch associated with the analyzed pitch of the first segment.

<Application Examples and Modifications>

It should be appreciated that the present invention is not limited to the above-described first and second embodiments and various other application examples and modifications of the present invention are also possible as follows. Further, any selected ones of the plurality of application examples and modifications may be combined as appropriate.

<Voice Input Section>

Whereas the embodiments of the invention have been described above in relation to the case where the voice input section 102 inputs user's voice (remark) via the microphone and converts the input voice (remark) into a voice signal, the present invention is not so limited, and the voice input section 102 may be configured to receive a voice signal, processed by another processing section or supplied (or forwarded) from another device, via a recording medium, a communication network or the like. Namely, the voice input section 102 may be configured in any desired manner as long as it receives an input voice signal of a question or remark.

<Word Beginning and Word Ending in Reply or the Like>

Whereas the first and second embodiments have been described as constructed to control the pitch of the word ending of a reply (response) in correspondence with the pitch of the word ending of a question, another portion of the reply (response) than the word ending, such as the word beginning, may sometimes become characteristic or distinctive depending on the language, dialect, wording, way of speaking, etc. In such a case, when a person who gave a question has received a reply (response) to the question judges an impression about the reply (response) by unconsciously comparing the pitch of the word ending of the question and the pitch of the characteristic beginning of the reply (response). Thus, in this case, arrangements may be made for controlling the pitch of the word beginning of the reply (response) in correspondence with the pitch of the word ending of the question. If the word beginning of the reply (response) is characteristic, such arrangements can give a psychological impression to the user who receives the reply (response).

The same can be said for a reply or a remark, and it is conceivable that an impression is sometimes judged based on the pitch of the beginning as well as at the word ending. For a reply or remark, it is also conceivable that an impression is judged based on an average pitch, a pitch of a portion where a word has been spoken with the greatest intensity, and/or the like. Therefore, it can be said that the first segment of a question and the second segment of a reply (response) are not necessarily limited to the word ending and the beginning.

<Interval Relationship>

Whereas the above-described embodiments of the present invention are constructed to control the voice synthesis such that the pitch of the word ending or the like of a reply (response) becomes five degrees down from the pitch of the word ending or the like of a question, the present invention may be constructed to control the pitch of the word ending or the like of a reply (response) to assume a consonant interval of other than five degrees down from the pitch of the word ending or the like of a question. For example, the consonant interval of other than five degrees down from than the word ending or the like of a question may be a perfect 8th or octave, perfect 5th, perfect 4th, major or minor 3rd, or major or minor sixth.

Further, there may be empirically recognized some interval relationships which can give a good (or bad) impression although not in a consonant interval relationship with the pitch of the word ending or the like of a question. Thus, the present invention may be constructed to control the pitch of a reply to assume any one of such interval relationships. However, in such a case too, the reply to the question tends to be unnatural if the pitch of the word ending or the like of the question and the pitch of the word ending or the like of the reply (remark) are too remote from each other, and thus, it is desirable that the pitch of the reply is within an range of one octave up and one octave down from the pitch of the question.

<Pitch Shift of Reply>

In the aforementioned construction where the pitch of the word ending or the like of a reply (response) defined by a voice sequence or voice waveform data is controlled to assume a predetermined relationship with the pitch of the word ending or the like of a question, more specifically where the pitch of the word ending or the like of a reply is changed, for example, to be five degrees down from the pitch of the word ending or the like of the reply as in the above-described embodiments, voice of the reply might be undesirably synthesized at unnaturally low pitch. The following describe application examples (Application Example 1 and Application Example 2) for avoiding such an inconvenience.

FIG. 10 is a flow chart showing primary portions of a process in Application Example 1. The primary portions of the process in Application Example 1 correspond to the operation performed in "pitch determination of reply" at step Sa17 shown in FIG. 4. Namely, in Application example 1, the process shown in FIG. 10 are performed at step Sa17 shown in FIG. 4, as will be described in detail later.

First, the voice synthesis section 112 obtains and provisionally determines a pitch of a reply (replying pitch) that is, for example, five degrees down from the pitch indicated by the pitch data supplied from the pitch analysis section 106, at step Sb171. Then, the voice synthesis section 112 determines, at step Sb172, whether or not the provisionally-determined pitch is lower than a predetermined threshold pitch (first threshold pitch). Note that the threshold pitch (first threshold pitch) is set, for example, at a pitch corresponding to a lower-limit frequency to be used in synthesis of voice, at a pitch that would give an unnatural feel if it is lower than that pitch.

If the provisionally-determined pitch, i.e. the pitch five degrees down from the pitch of the word ending of the reply, is lower than the predetermined threshold pitch (i.e., "Yes" determination at step Sb172), the voice synthesis section 112 shifts the provisionally-determined pitch to a pitch one octave up from (higher than) the provisionally-determined pitch, at step Sb173. If, on the other hand, the provisionally-determined pitch is equal to or high than the predetermined threshold pitch (i.e., "No" determination at step Sb172), the operation of step Sb173 is skipped.

Then, the voice synthesis section 112 formally determines a target pitch to which the pitch of the reply is to be shifted, as a pitch of the reply, at step Sb174. Namely, if the provisionally-determined pitch is lower than the threshold pitch, the voice synthesis section 112 formally determines, as the target pitch, the pitch to which the provisionally-determined pitch has been shifted upward by one octave. If the provisionally-determined pitch is equal to or higher than the threshold pitch, the voice synthesis section 112 formally determines the provisionally-determined pitch directly as the target pitch. Following step Sb174, the process revers to step Sa18 of FIG. 4. Thus, the voice synthesis section 112 synthesizes voice of a voice sequence including the formally-determined pitch and outputs the thus-synthesized voice.

According to such Application example 1, the pitch to be changed is shifted one octave higher if it is lower than the threshold pitch, and thus, it is possible to avoid the inconvenience that voice of the reply is synthesized at unnaturally low pitch.

Whereas Application example 1 has been described above as shifting the pitch of the word ending or the like of reply one octave higher, the present invention is not so limited. For example, if the provisionally-determined pitch is higher than another predetermined threshold pitch (second threshold pitch), the provisionally-determined pitch may be shifted one octave lower. More specifically, if the pitch of the word ending or the like of a question given by the user is too high, the pitch five degrees down from the provisionally-determined pitch too may sometimes be too high. In such a case, voice of a reply would be synthesized at unnaturally high pitch. If the pitch (provisionally-determined pitch) five degrees down from the pitch indicated by the pitch data is higher than the other predetermined threshold pitch (second threshold pitch), it just suffices to shift the pitch of the word ending or the like of the reply one octave down from the provisionally-determined pitch, in order to avoid the inconvenience. At least one of the above-described modification where the pitch of the word ending or the like of the reply is shifted one octave higher and the above-described modification where the pitch of the word ending or the like of the reply is shifted one octave lower may be carried out.

Further, in some case, the voice synthesis may output a reply with voice of a virtual character of a predetermined sex and age (child or adult). If the pitch of the word ending of a reply is shifted uniformly five degrees down from the pitch of the word ending of a question as above in the case where a female or child character is designated, voice of the reply would be synthesized at a low pitch unfit for the character, and thus, the pitch of the word ending of the reply may be shifted one octave higher.

FIG. 11 is a flow chart showing primary portions of a process in such an application example (Application Example 2). The primary portions of the process in Application example 2 correspond to the operation performed in "pitch determination of reply" at step Sa17 shown in FIG. 4. The process in Application Example 2 shown in FIG. 11 is different from the process in Application Example 1 shown in FIG. 10 in that the voice synthesis section 112 obtains and provisionally determines a pitch five degrees down from the pitch indicated by the pitch data supplied from the pitch analysis section 106 at step Sb171 and then determines at step Sc172 whether "female sex" or "child" is currently designated as an attribute defining the character in question.

If "female sex" or "child" is currently designated as the attribute ("Yes" determination at step Sc172), the voice synthesis section 112 shifts the provisionally-determined pitch one octave higher at step Sb173. If, on the other hand, "female sex" or "child" is not currently designated as the attribute, and if "male sex" or "adult" is currently designated as the attribute ("No" determination at step Sc172), the aforementioned operation of step Sb173 is skipped. A subsequent operation is the same as in Application Example 1.

According to such Application Example 2, the provisionally-determined pitch is shifted one octave higher if settings have been made to generate a reply with female or child voice, and thus, it is possible to avoid the inconvenience that the voice of the reply is synthesized at unnaturally low pitch.

Whereas Application example 2 has been described above as constructed to shift the provisionally-determined pitch one octave higher if "female sex" or "child" is currently designated as the attribute, the provisionally-determined pitch may be shifted one octave lower, for example, if "adult male" is currently designated as the attribute, in order to avoid the inconvenience that voice of the reply would be synthesized at pitch unfit for the character.

<Dissonant Interval>

Whereas the above-described embodiments are constructed to control the voice synthesis in such a manner that the pitch of the word ending or the like of a reply (response) to a question assumes a consonant interval relationship with the pitch of the word ending or the like of a question, the voice synthesis may be controlled in such a manner that the pitch of the word ending or the like of a reply (response) assumes a dissonant interval relationship with the pitch of the word ending or the like of a question. If voice of the reply is synthesized with a pitch that is in dissonant interval relationship with the pitch of the word ending or the like of the question, there may occur an undesirable likelihood that an unnatural feeling, bad impression, nasty feeling, etc. are given to the user having given the question so that a smooth dialogue cannot be established. Conversely, however, there is also an opinion that such feelings are good for stress relieving. Thus, in the present invention, an operation mode (first mode) in which a reply of good impression etc. is desired and another operation mode (second mode) in which a reply of bad impression etc. may be prepared so that the voice synthesis is controlled in accordance with any one of the first and second modes.

Further, FIG. 12 is a flow chart showing primary portions of a process in such an application example (Application Example 3). The primary portions of the process in Application example 3 correspond to the operation performed in "pitch determination of reply" at step Sa17 shown in FIG. 4. The process in Application Example 3 shown in FIG. 12 is different from the process in Application Example 1 shown in FIG. 10 as follows. Namely, the voice synthesis section 112 in Application Example 3 determines at step Sd172 whether the first mode is currently set as the operation mode.

If the first mode is currently set as the operation mode ("Yes" determination at step Sd172), the voice synthesis section 112 sets the word ending of, for example, the reply at a pitch that is in a consonant interval relationship with the pitch of, for example, the word ending of the question, at step Sd173A. If, on the other hand, the second mode is currently set as the operation mode ("No" determination at step Sd172), the voice synthesis section 112 sets the word ending of the reply at a pitch that is in a dissonant interval relationship with the pitch of the word ending of the question, at step Sd173B. A subsequent operation is the same as in Application Example 1 and in Application Example 2.

Namely, according to Application Example 3, voice of the reply (response) is synthesized at a pitch that is in a consonant interval relationship with the word ending of the question if the first mode is currently set, but voice of the reply (response) is synthesized at a pitch that is in a dissonant interval relationship with the word ending of the question if the second mode is currently set. Thus, according to Application Example 3, the user can appropriately use any one of the two modes depending on the case. Note that setting of any one of the first and second modes may be performed in any desired manner, e.g. through a selection operation by the user or through automatic selection based on, for example, an instruction generated within the apparatus during execution of the application program.

Whereas Application Example 1, Application Example 2 and Application Example 3 have been described above in relation to the case where is used a voice sequence similar to that used in the first embodiment, they may of course use a voice sequence similar to that used in the second embodiment.

<Voice of Reply>

Whereas the above-described embodiments are constructed to make voice of a reply through synthesis of human voice (i.e., generate a reply in synthesized human voice), voice of the reply may be made through synthesis of animal's voice (i.e., generated in synthesized animal voice). Namely, the term "voice" is used herein to refer to a concept embracing animal's voice as well as human voice. Thus, the following describe Application Example 4 where voice of a reply is made through synthesis of animal's voice (i.e., generated in synthesized animal voice).

FIG. 13 is a diagram outlining a process performed in Application Example 4. In the case where voice of a reply is made through synthesis of animal's voice, the process is configured to only shift the pitch of the word ending of animal's voice to a predetermined pitch in response to the pitch of the word ending of the question. Therefore, it is not necessary to perform operations for analyzing the meaning of the question, acquiring information corresponding to the analyzed meaning, creating a reply corresponding to the information, etc.

Once the user W utters and inputs a question "ii tenki dane" (romanized Japanese meaning "It is a fine weather, isn't it?") into the voice synthesis apparatus 10, the voice synthesis apparatus 10 analyzes a pitch of "ne" (romanized Japanese) constituting to the word ending of the question. If the pitch of "ne" is "G", the voice synthesis apparatus 10 post-processes voice waveform data of dog's voice "wan" (romanized Japanese) and changes the pitch of "n", constituting the word ending of "wan", into "C" that is a pitch five degrees down from, i.e. in an example of a consonant interval relationship with, the pitch of the word ending of the question, so that the voice synthesis apparatus 10 outputs the thus-changed pitch "C".

In the case where voice of the reply is made through synthesis of animal's voice, information desired by the user cannot be obtained from the reply. Namely, when the user has asked a question "asu no tenki wa?" (romanized Japanese meaning "How will the weather be tomorrow?"), the user cannot get the tomorrow's weather information. However, if, in response to some user's question, animal's voice is synthesized in such a manner that the pitch of the word ending of the animal's voice assumes an interval relationship of, for example, five degrees down from the pitch of the word ending of the question, the animal's voice can give the user a comfortable, reassuring good impression; in this respect, this application example is the same as the case where the reply is generated in synthesized human voice. Thus, even where the reply is generated in animal's voice, it can be expected to give the user a kind of healing effect as if the user were actually communicating with a virtual animal uttering the voice.

As an example, a display section may be provided on the voice synthesis apparatus 10 so that a virtual animal can be displayed on the display section as shown in FIG. 13(b). Also, the virtual animal may be displayed on the display section in animated images wagging the tail, inclining the head, etc. Such arrangements can further enhance the healing effect.

If the animal whose voice is to be synthesized is a dog, this application example may be configured to permit selection from among various dog types, such as chihuahua, pomeranian and golden retriever. The voice synthesis apparatus 10 constructed to create a reply with synthesized animal's voice as above may be applied to other than terminal apparatus, such as robot pets, stuffed toys, etc. mocking desired animals.

<Others>

In the above-described embodiments, the linguistic analysis section 108, the linguistic database 202 and the reply database 204, constructed to acquire a reply (response) to a question (remark), are provided in the voice synthesis apparatus 10. However, in view of the inconveniences that a processing load tends to become heavy and storage capacity is limited in terminal apparatus, etc., the above-mentioned linguistic analysis section 108, the linguistic database 202 and the reply database 204 may be provided in the external server. Namely, it is only necessary that the reply creation section 110 (replying voice output section 113) in the voice synthesis apparatus 10 be configured to acquire a reply to a question in some way and output a voice sequence (voice waveform data) of the reply, and it does not matter at all whether the reply is created in the voice synthesis apparatus 10 or in a structure other than the voice synthesis apparatus 10, such as the external server. In an application where a reply (response) to a question (remark) can be created in the voice synthesis apparatus 10 without accessing the external server or the like, the information acquisition section 126 can be dispensed with.

<Third Embodiment>

Figure 14:
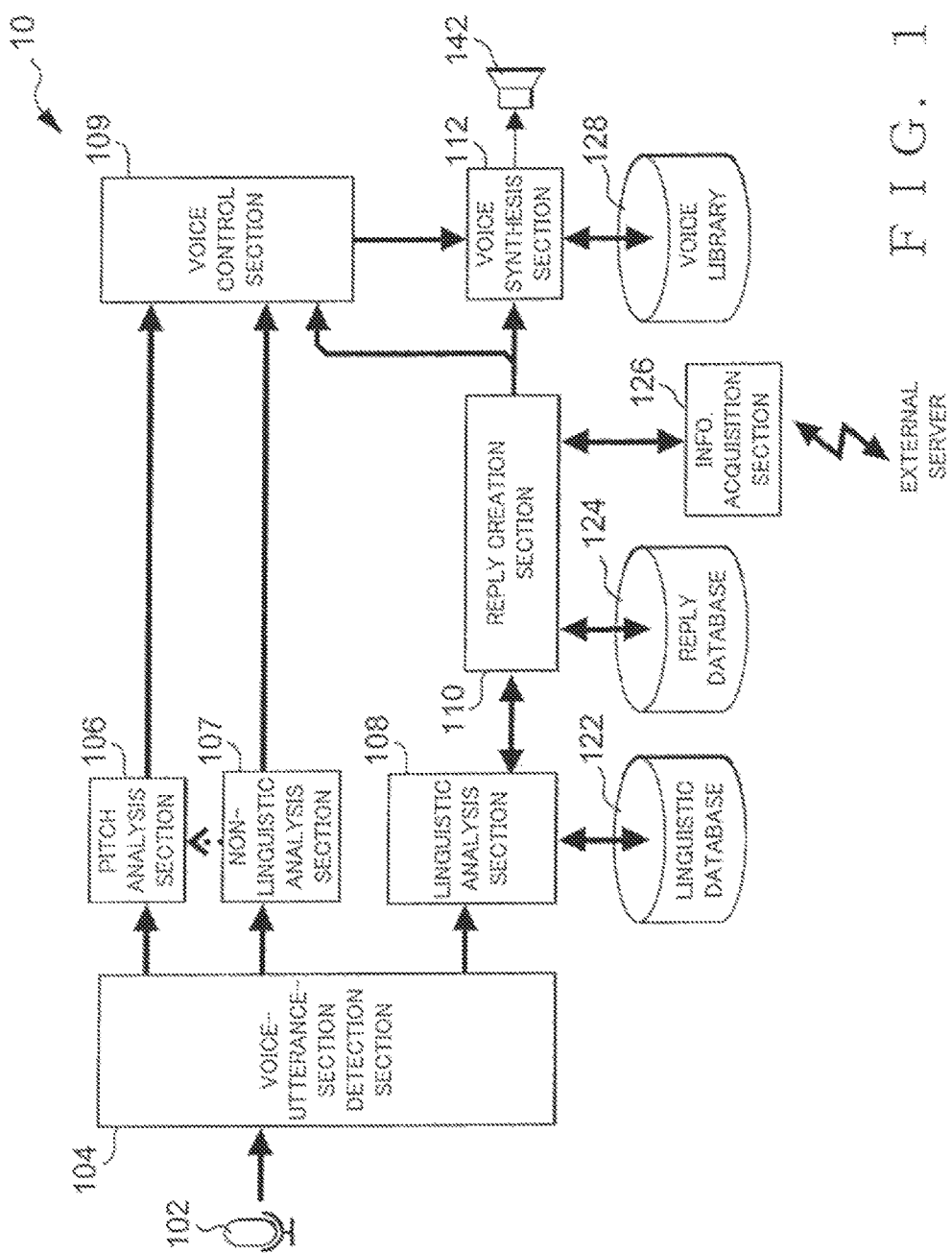
FIG. 14 is a block diagram showing a construction of a third embodiment of the voice synthesis apparatus.

Next, a third embodiment of the present invention will be described with reference to FIG. 14. The third embodiment of the present invention is characterized in that the voice synthesis is controlled in accordance with non-linguistic (non-verbal) information included in an input voice signal of a question (remark). FIG. 14 is a block diagram showing a construction of the third embodiment of the voice synthesis apparatus 10 of the present invention. Blocks in FIG. 14 that implement substantially the same functions as those in FIG. 1 are depicted by the same reference characters as in FIG. 1 and will not be described to avoid unnecessary duplication. The third embodiment of FIG. 14 include a non-linguistic analysis section 107 and a voice control section 109 in addition to the construction shown in FIG. 1.

The non-linguistic analysis section 107 analyzes a voice signal detected as an utterance section by the voice-utterance-section detection section 104 and outputs non-linguistic information other than pitch (other than pitch information). Although speed (speaking speed), quality and volume of the voice, facial expression, gesture and clothes of the user having given the question, etc. are assumable as examples of the non-linguistic information, let it be assumed that the speed and volume of the voice are analyzed as the non-linguistic information in the instant embodiment. Namely, the non-linguistic analysis section 107 in the instant embodiment analyzes the speed and volume of the question (remark) and outputs the analyzed speed and volume as the non-linguistic information other than pitch information. Note that the volume of the input voice signal analyzed by the non-linguistic analysis section 107 is supplied to the pitch analysis section 106, as indicated by broken line, so that the volume can be used as volume information for identifying a pitch of the first segment.

The voice control section 109 controls the voice synthesis section 112 in accordance with the pitch data output from the pitch analysis section 106 and the non-linguistic information (speed and volume) output from the non-linguistic analysis section 107. The following describe, with reference to FIG. 15, how the voice synthesis section 112 is controlled by the voice control section 109.

Figure 15:
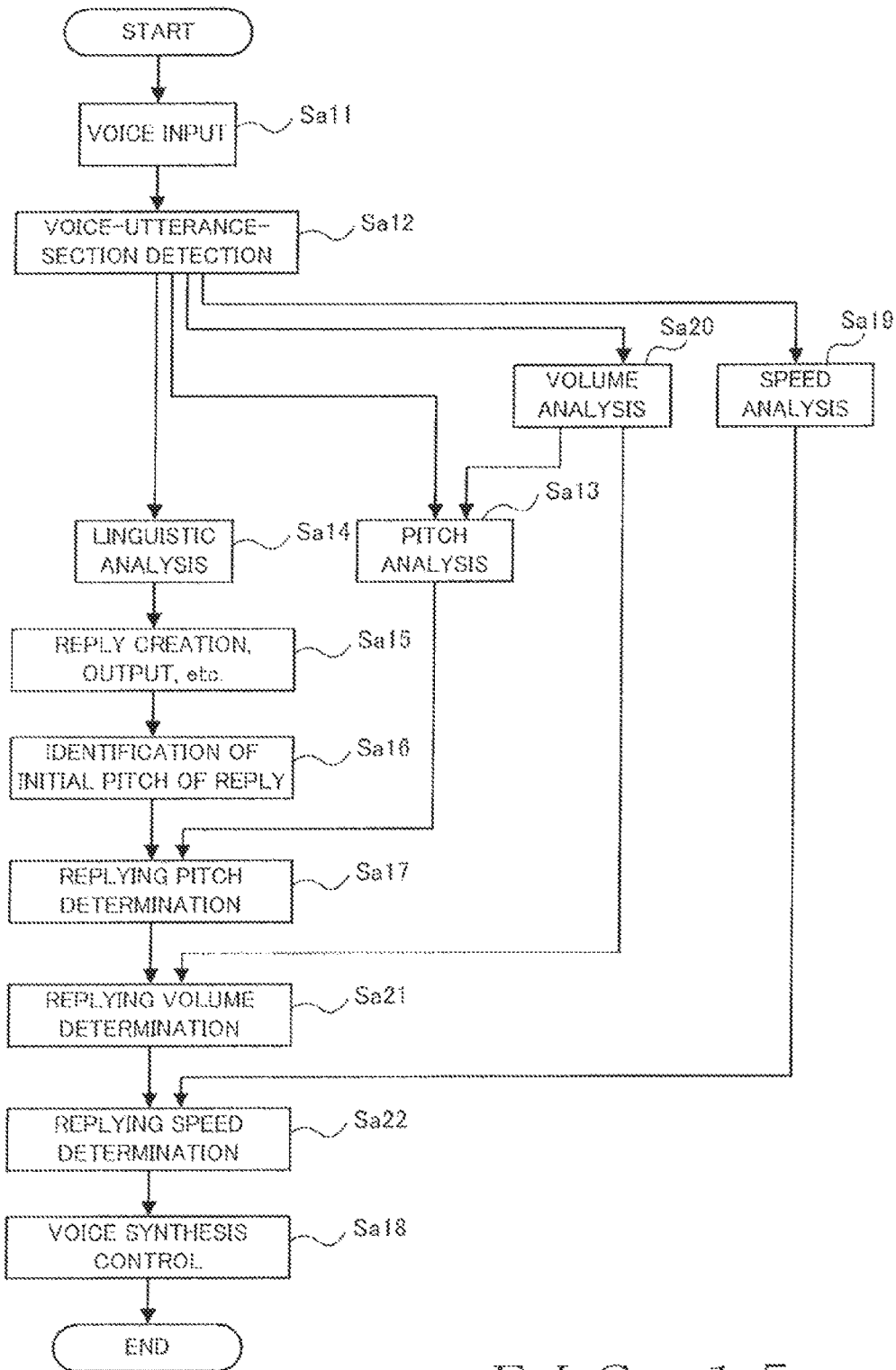
FIG. 15 is a flow chart of a process performed in the third embodiment of the voice synthesis apparatus.

FIG. 15 is a flow chart of a process performed in the third embodiment of the voice synthesis apparatus 10. FIG. 15 is shown as a modification of FIG. 4, where steps performing substantially the same operations as in FIG. 4 are depicted by the same reference characters and will not be described here to avoid unnecessary duplication.

Once an utterance section is detected at step Sa12, the non-linguistic analysis section 107 analyzes the speed (speaking speed) of the question from the voice signal of the detected utterance section and outputs speed data indicative of the speed, at step Sa19. In parallel with the speed analysis at step Sa19, the non-linguistic analysis section 107 performs the following volume analysis at step Sa20. Namely, the non-linguistic analysis section 107 obtains, for example, an average volume of the voice signal of the question (remark) in the detected utterance section to thereby output volume data indicative of the average volume, and apart from such volume data outputting, the non-linguistic analysis section 107 obtains a volume waveform of the voice signal. An example of the volume waveform obtained here is similar to the volume waveform shown in FIG. 5(*a*).

After changing the pitch of the word ending (second segment) of the replying voice at step Sa17, the voice control section 109 proceeds to step Sa21. At step Sa21, the voice control section 109 determines that the voice synthesis section 112 should synthesize voice of the entire reply (response) with a volume corresponding to the volume data indicative of the average volume of the reply (response). Then, at step Sa22, the voice control section 109 determines that the voice synthesis section 112 should synthesize voice of the entire reply (response) at a speed corresponding to the speed data. Further, at next step Sa18, the voice synthesis section 112 synthesizes and outputs the voice of the voice sequence, whose change has been determined by the voice control section 109, with the determined volume and at the determined speed.

<Fourth Embodiment>

Figure 18:
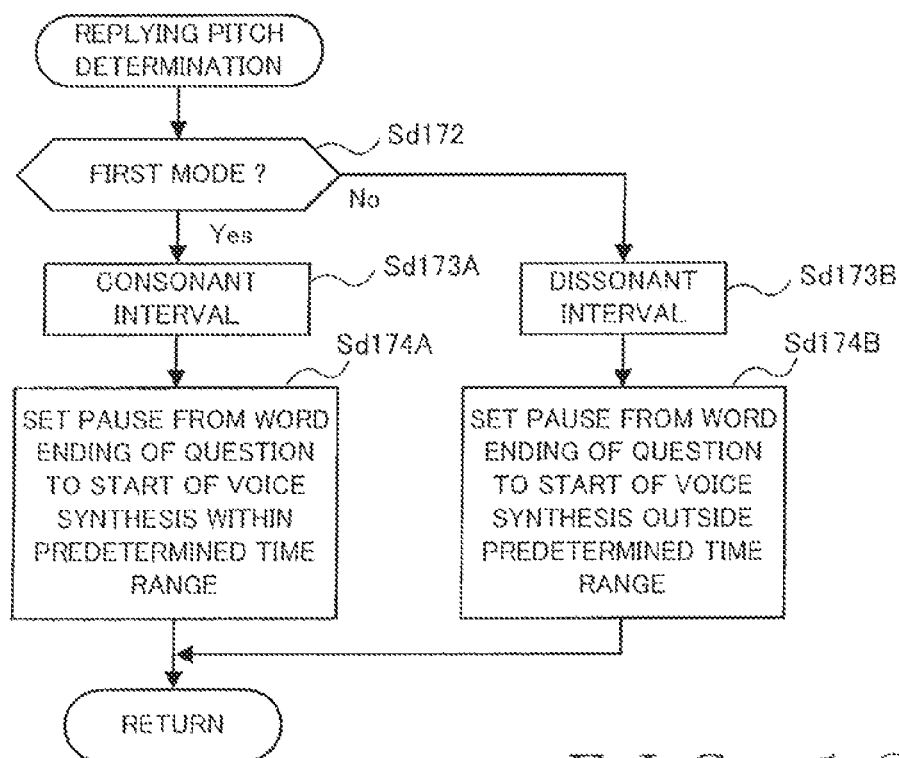
FIG. 18 is a flow chart showing primary portions of a process performed in a sixth embodiment of the voice synthesis apparatus of the present invention.

Next, a fourth embodiment of the present invention will be described as a modification of the replying voice generation method employed in the third embodiment. FIG. 16 is a block diagram showing a construction of the fourth embodiment of the voice synthesis apparatus 10 of the present invention. Similarly to the voice synthesis apparatus 10 shown in FIG. 8, the voice synthesis apparatus 10 shown in FIG. 16 is constructed in such a manner that the replying voice output section 113 acquires a reply (response) to a question (remark) and generates voice waveform data of the entire reply (response), and that the post-processing section 114*a* performs control for changing the pitch of the word ending (second segment) of the replying voice. Blocks in FIG. 18 that implement substantially the same functions as those in FIG. 8 are depicted by the same reference characters as in FIG. 8 and will not be described to avoid unnecessary duplication. The fourth embodiment of FIG. 18 includes the non-linguistic analysis section 107 in addition to the construction shown in FIG. 8, and the post-processing section 114*a* in the fourth embodiment is slightly different from the post-processing section 114 shown in FIG. 8. The non-linguistic analysis section 107 in FIG. 18 is constructed similarly to the non-linguistic analysis section 107 in FIG. 14.

In addition to performing control for changing pitches of entire voice waveform data of replying voice in such a manner that the pitch of the word ending of the reply (responsive output) assumes a predetermined interval relationship (such as a consonant interval relationship) with the pitch of the word ending of the question (uttered input) in a similar manner to the post-processing section 114 of FIG. 8, the post-processing section 114*a* in the fourth embodiment performs control for reproducing the entire replying voice waveform data, output from the replying voice output section 113, with an intensity corresponding to the volume of the analyzed non-linguistic information and/or at a speed corresponding to the speed of the non-linguistic information. Namely, in the fourth embodiment, the post-processing section 114*a* controls the volume and reproduction speed of the entire replying voice in addition to the pitch control of the replying voice.

<Fifth Embodiment>

In a dialogue between persons, a person having quickly uttered a question (remark) generally has an impatient, hasty or other similar character or psychological state, and thus, it is considered that person wants to promptly have a reply (response) to the question (remark). On the other hand, a person having slowly made a question (remark) generally is, for example, in a careful and calm state, and thus, it is considered that person is ready to wait for a reply (response) to the question patiently.

Thus, the fifth embodiment is constructed to control voice synthesis start timing (i.e., time interval or pause from the end of the question to a time when voice synthesis of a reply is started) in accordance with non-linguistic information of the question (remark), i.e. speed of the question (remark) in this case.

The fifth embodiment of the voice synthesis apparatus 10 may be substantially the same as the third embodiment shown in FIG. 14 as long as it is constructed to use a voice sequence. However, the voice control section 109 in the fifth embodiment controls the voice synthesis section 112 to delay the voice synthesis start timing, for example, as the speed of the question indicated by the speed data of the non-linguistic information decreases.

FIG. 17 is a diagram explanatory of the voice synthesis performed in the fifth embodiment. If the user W quickly inputs a question "ashita no tenki wa?" (romanized Japanese meaning "How will the weather be tomorrow?") into the voice synthesis apparatus 10, an example reply "hare desu" (romanized Japanese meaning "It is fine tomorrow.") will be output in voice at relatively early timing, and the overall speed of the reply will be quick, as shown in FIG. 17(*a*). On the other hand, if the user W slowly inputs the same question "ashita no tenki wa?" into the voice synthesis apparatus 10, the reply "hare desu" will be output in voice at relatively late timing, and the overall speed of the reply will be slow, as shown in FIG. 17(*b*).

Note that, in the figure, a time interval or pause from the time when the question was uttered to the time when the voice synthesis of the reply was started is represented by a time period Ta or Tb (Ta<Tb) from the word ending of the question to the word beginning of the reply. Needless to say, the pause may be defined in any other suitable manner than the aforementioned. In the figure, smaller intervals between characters (letters) in the question and in the reply indicate that the question and the reply were uttered quickly.

With the fifth embodiment constructed in the aforementioned manner, a reply can be given to the user, who wants to get a reply to the question, with a natural feel and in accordance with a character and psychological condition of the user as if a dialogue were being conducted between persons.

If voice waveform data is used in place of the voice sequence, the fifth embodiment is constructed in substantially the same manner as the fourth embodiment shown in FIG. 16. In such a construction, the post-processing section 114*a* delays the start timing of voice output as the speed of the non-linguistic information decreases. Further, whereas the fifth embodiment is constructed to control the start timing of voice output in accordance with the speed of the question, the speed in accordance with which the start timing of voice output is controlled may be replaced with volume or pitch, and other information than the speed, volume and pitch may be combined as appropriate.

<Sixth Embodiment>

Application examples and/or modifications similar to the aforementioned various examples and/or modifications of the first and second embodiments may be applied to the third, fourth and fifth embodiments. For example, FIG. 18 is a flow chart showing, as a sixth embodiment of the present invention, an example of a reply pitch determination routine in a case where operation modes similar to the operation modes shown in FIG. 12 are applied. FIG. 18 is similar to FIG. 12 except in that steps Sd174A and Sd174B are added in FIG. 18.

The example shown in FIG. 18 is constructed to perform control taking into account a "pause" of a reply to a question. Normally, in a dialogue between persons, if one of the persons attempts to reply to a question in such a manner as to intentionally give a bad impression, the pause of the reply to the question is extremely shortened or extremely lengthened as compared to than in other cases. In a scene like a quarrel, for example, one person tends to argue back to another person's remark promptly (substantially with no pause) or intentionally with a long pause. In the illustrated example shown in FIG. 18, the control is performed taking such a "pause" into account.

If the first mode is currently set as the operation mode in the example of FIG. 18, the voice control section 109 proceeds to step Sd174A, following step Sd173A, where it determines, as an instruction to be given to the voice synthesis section 112, that the voice synthesis should be started within a predetermined time range following the word ending of the question (remark). Because, the "predetermined time range" is in the range of 0.5 to 2.0 sec, and the aforementioned pause is considered to be an appropriate pause as long as it is within this range.

If, on the other hand, the second mode is currently set as the operation mode (i.e., "No" determination at step Sd172), the voice control section 109 determines, at step Sd173B, that the pitch of the word ending of the reply should assume a dissonant interval relationship with the pitch of the word ending of the question. Then, at step Sd174B, the voice control section 109 determines, as an instruction to be given to the voice synthesis section 112, that the voice synthesis should be started outside the predetermined time range following the word ending of the question.

After step Sd174A or Sd174B, the process reverts to step Sa21 of FIG. 15, so that the voice control section 109 determines an overall volume of the reply at step Sa22. After that, at step Sa18, the voice synthesis section 112 synthe-sizes voice of a voice sequence, whose change has been determined by the voice control section 109, at determining timing and speed and with a determined volume, and then outputs the thus-synthesized voice.

Namely, according to the sixth embodiment shown in FIG. 18, the "pause" is controlled to be within the predetermined time range when the operation mode is the first mode, while the "pause" is controlled to be outside the predetermined time range when the operation mode is the second mode. Thus, the user can appropriately use any desired one of the two modes, so that usability of the apparatus can be enhanced. The application example shown in FIG. 18 is applicable to not only the third embodiment constructed to the replying voice synthesis per syllable based on a voice sequence, but also to the fourth embodiment constructed to generate replying voice waveform data of the entire replying voice.

<Seventh Embodiment>

Whereas each of the third to sixth embodiments has been described as using, as the non-linguistic information, information related to a question (remark) itself uttered by the user, such as pitch, volume and speed, other information, such as facial expression, gesture and closes, may be used as the non-linguistic information. Thus, the following describe a seventh embodiment of the present invention which uses non-voice information as the non-linguistic information.

Figure 19:
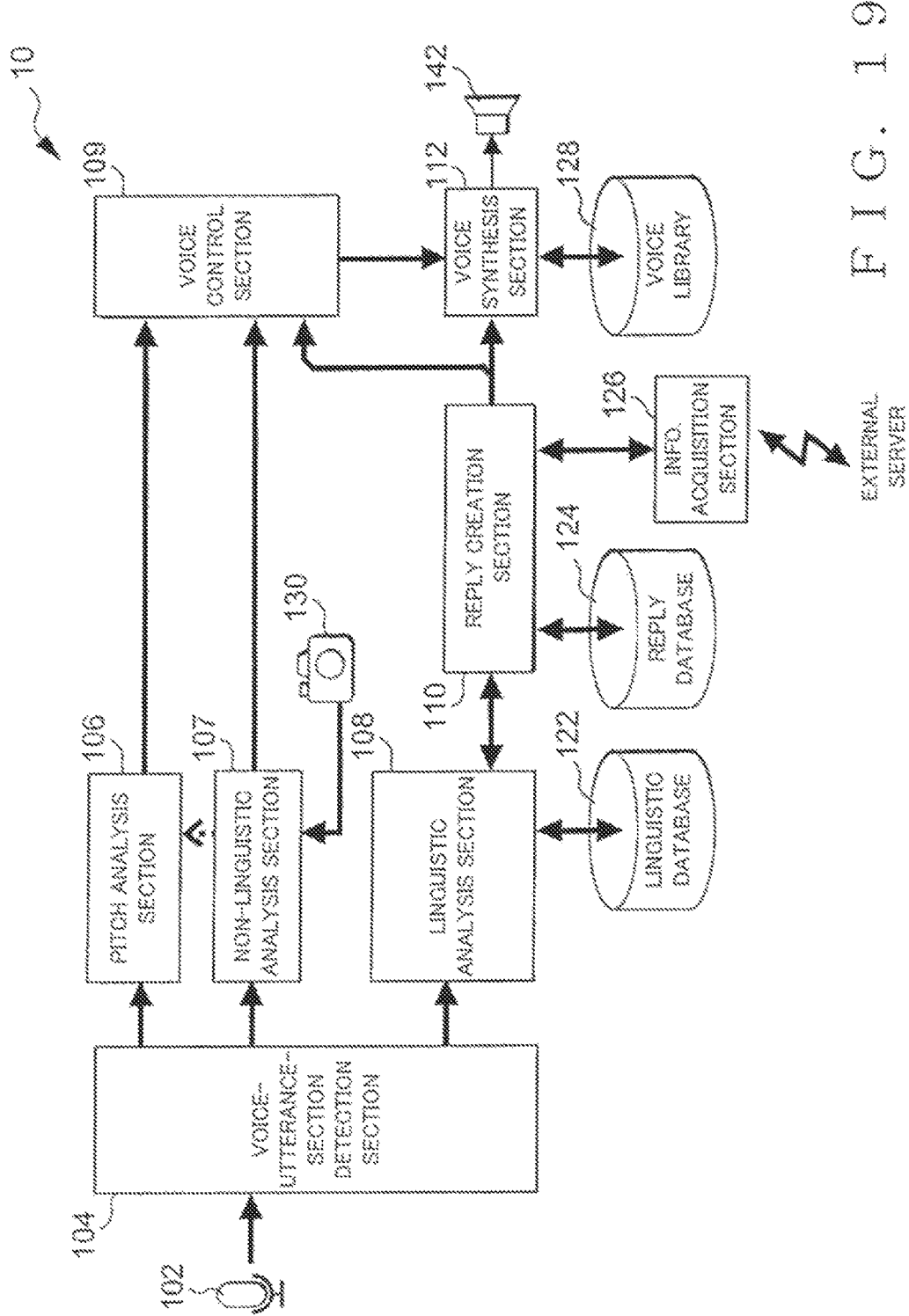
FIG. 19 is a block diagram showing a construction of a seventh embodiment of the voice synthesis apparatus of the present invention.

FIG. 19 is a block diagram showing a construction of the seventh embodiment of the voice synthesis apparatus 10 of the present invention, which is characterized by including an imaging section 130 for imaging areas around the voice synthesis apparatus 10. In the instant embodiment, the non-linguistic analysis section 107 analyzes a facial expression (laugh, embarrassment, anger, or the like) of the user from a still image taken by the imaging section 130 and reflects a result of the analysis in voice synthesis processing as follows.

When the user has uttered a question while laughing, for example, a high pitch tends to be detected in the pitch analysis of the question by the pitch analysis section 106. Thus, the non-linguistic analysis section 107 causes the pitch analysis section 106 to adjust the detected pitch to a lower pitch. When the user has uttered a question angrily, on the other hand, a low pitch tends to be detected in the pitch analysis of the question by the pitch analysis section 106. Thus, the non-linguistic analysis section 107 causes the pitch analysis section 106 to adjust the detected pitch to a lower pitch. By thus adjusting a result of the pitch analysis by the pitch analysis section 106 in accordance with the facial expression of the user, the instant embodiment can achieve an enhanced accuracy of the pitch detection and analysis.

Further, the voice synthesis apparatus 10 is constructed in such a manner that, if the user has an embarrassed facial expression after the voice synthesis apparatus 10 has synthesized and output voice of the reply (response), the pitch of the word ending of the reply is changed to assume an interval relationship of five degrees down from the pitch of the word ending of the question. However, it is conceivable that such an interval relationship is not maintained correctly. Thus, the non-linguistic analysis section 107 causes the voice control section 109 to change the five-degree-down interval relationship of the reply with the question to another interval relationship, such as four degrees down from the pitch of the word ending of the question. Alternatively, the non-linguistic analysis section 107 causes the voice control section 109 to change a pitch analysis algorithm (e.g., which local maximum of a pitch waveform should be set as the word ending, pitch of which portion of the word ending should be determined, etc.) in the pitch analysis section 106, because it is also conceivable that accuracy of the pitch analysis, by the pitch analysis section 106, has been lowered. By controlling the pitch analysis and voice synthesis in accordance with the user's facial expression as above, the instant embodiment can direct the reply, whose voice is to be synthesized, in such a direction as to give no uncomfortable feeling.

Whereas the instant embodiment has been described above in relation to the case where the pitch analysis and voice synthesis are controlled in accordance with the user's facial expression, it may be constructed to analyze user's gesture, clothes, etc. from an image of the user taken by the imaging section 130 so that the pitch analysis and voice synthesis is controlled in accordance with such user's gesture, clothes, etc. Further, there may be provided a humidity sensor and/or the like, in place of or in addition to the imaging section 130, so that information of ambient environment acquired via the humidity sensor and/or the like is used to control the voice synthesis. For example, in hot and humid environment, voice of a reply that is expected to ease frustration may be synthesized.

<Fluctuation of Applied Rule, Etc.>

Each of the third to sixth embodiments is constructed to determine a volume, speed and pause of a reply on the basis of a volume and speed of a question (remark) and in accordance with the above-described rule. However, if the rule is fixed, the reply tends to give the user an impression that the reply is monotonous. Thus, arrangements may be made for giving fluctuation to the rule to thereby modify the rule, for example, within such a range that the created reply does not give an unnatural feel, or a plurality of rules within such a range may be prepared in advance so that any one of the rules can be selected to be applied to the voice synthesis. Such arrangements can effectively avoid giving a monotonous reply to the user.

Each of the third to seventh embodiments of the present invention may be summarized as follows. Namely, each of the third to seventh embodiments includes: the non-linguistic analysis section 107 for analyzing non-linguistic information other than pitch information related to a question (i.e., remark); and the control section (voice control section 109) for controlling generation, by the voice generation section (i.e., the voice synthesis section 112 or the combination of the replying voice output section 113 and the post-processing section 114a), of voice of a reply in accordance with the analyzed non-linguistic information. Note that the various application examples and/or the modifications related to the first and second embodiments are also applicable to the third to seventh embodiments of the present invention.

<Eighth Embodiment>

Figure 20:
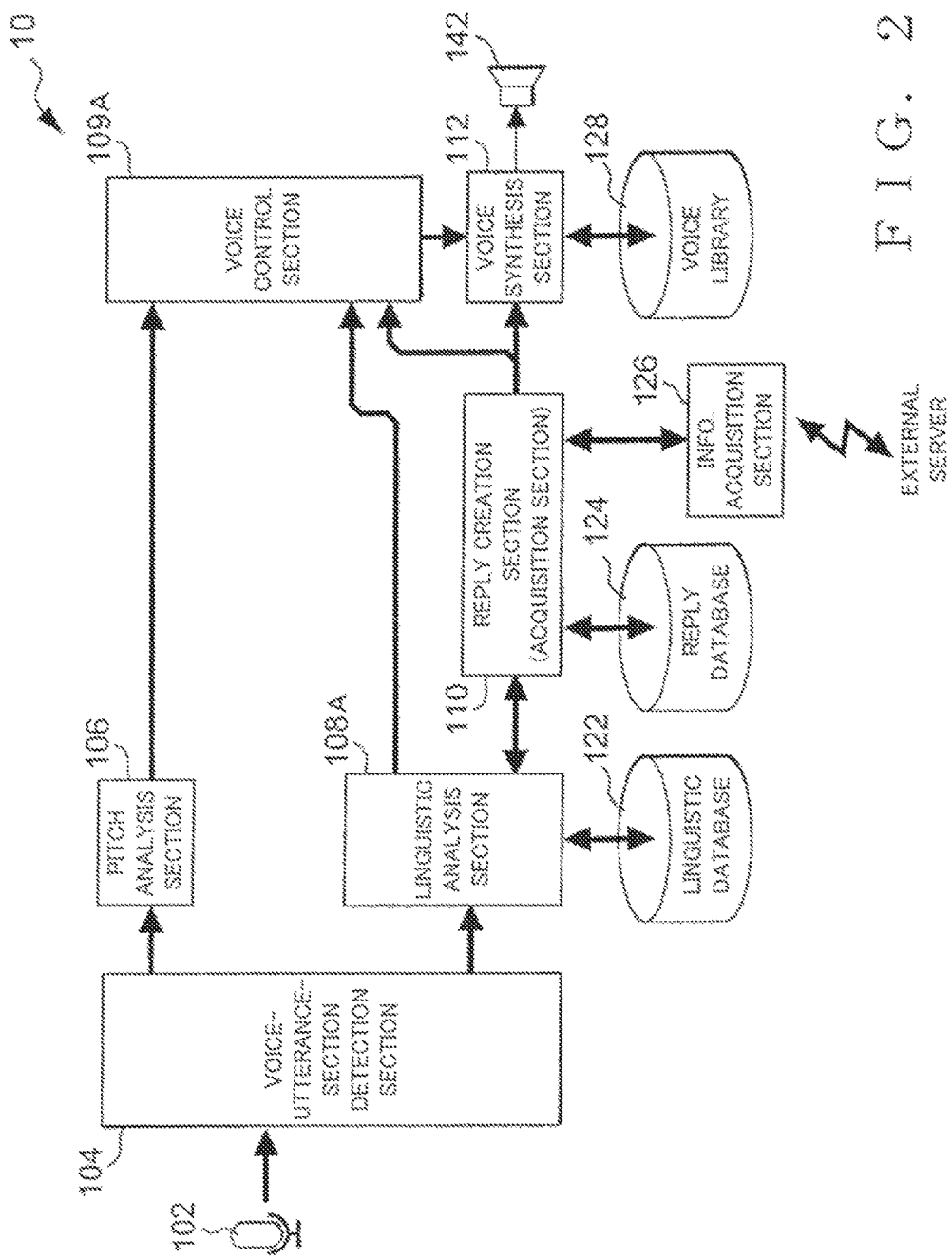
FIG. 20 is a block diagram showing a construction of an eighth embodiment of the voice synthesis apparatus of the present invention.

The following describe, with reference to FIG. 20, an eighth embodiment of the voice synthesis apparatus of the present invention, which is characterized by controlling generation of replying voice in accordance with linguistic information included in a remark (question) and a reply (response). FIG. 20 is a block diagram showing a construction of the eighth embodiment of the voice synthesis apparatus of the present invention. Blocks in FIG. 20 that implement substantially the same functions as those in FIG. 1 are depicted by the same reference characters as in FIG. 1 and will not be described to avoid unnecessary duplication. The eighth embodiment of FIG. 20 includes a voice control section 109A in addition to the construction shown in FIG. 1, and the linguistic analysis section 108A in the eighth embodiment is different in construction from the linguistic analysis section 108 shown in FIG. 1.

The linguistic analysis section 108A in the eighth embodiment not only analyzes a linguistic meaning contained in a voice signal of a remark (question), but also analyzes a meaning of a reply (response) created (acquired) by the reply creation section 110. The linguistic analysis section 108A supplies an analyzed result of the meaning of the remark (question) to the reply creation section 110, and when the reply (response) has been received from the reply creation section 110, the linguistic analysis section 108A analyzes the meaning of the received reply (response) and supplies an analyzed result of the meaning of the reply (response) to the voice control section 109A.

In the eighth embodiment, the reply creation section 110 may create (acquire) the following types of reply:

(1) reply indicative of an affirmative meaning;

(2) reply indicative of a negative meaning;

(3) specific reply to a question; and (4) sympathetic reply (including back-channel feedback) uttered prior to the specific reply. Examples of the type (1) reply above include "Yes" or "hai" (romanized Japanese), and examples of the type (2) reply above include "No" or "iie" (romanized Japanese). Examples of the type (3) reply above include a reply specifically answering a question like "asu no tenki wa?" (romanized Japanese). Further, examples of the type (4) reply above include "to" (mmanized Japanese meaning "Let me see.") and "sou desune" (romanized Japanese meaning "Well, . . . "). The replying voice sequence created by the reply creation section 110 is supplied to the voice control section 109A and the voice synthesis section 112.

The voice control section 109A determines, in accordance with the pitch data supplied from the pitch analysis section 106 and the meaning of the reply supplied from the linguistic analysis section 108A, content of control to be performed on the replying voice sequence. The following describe, with reference to FIG. 21, the content of the control by the voice control section 109A.

Figure 21:
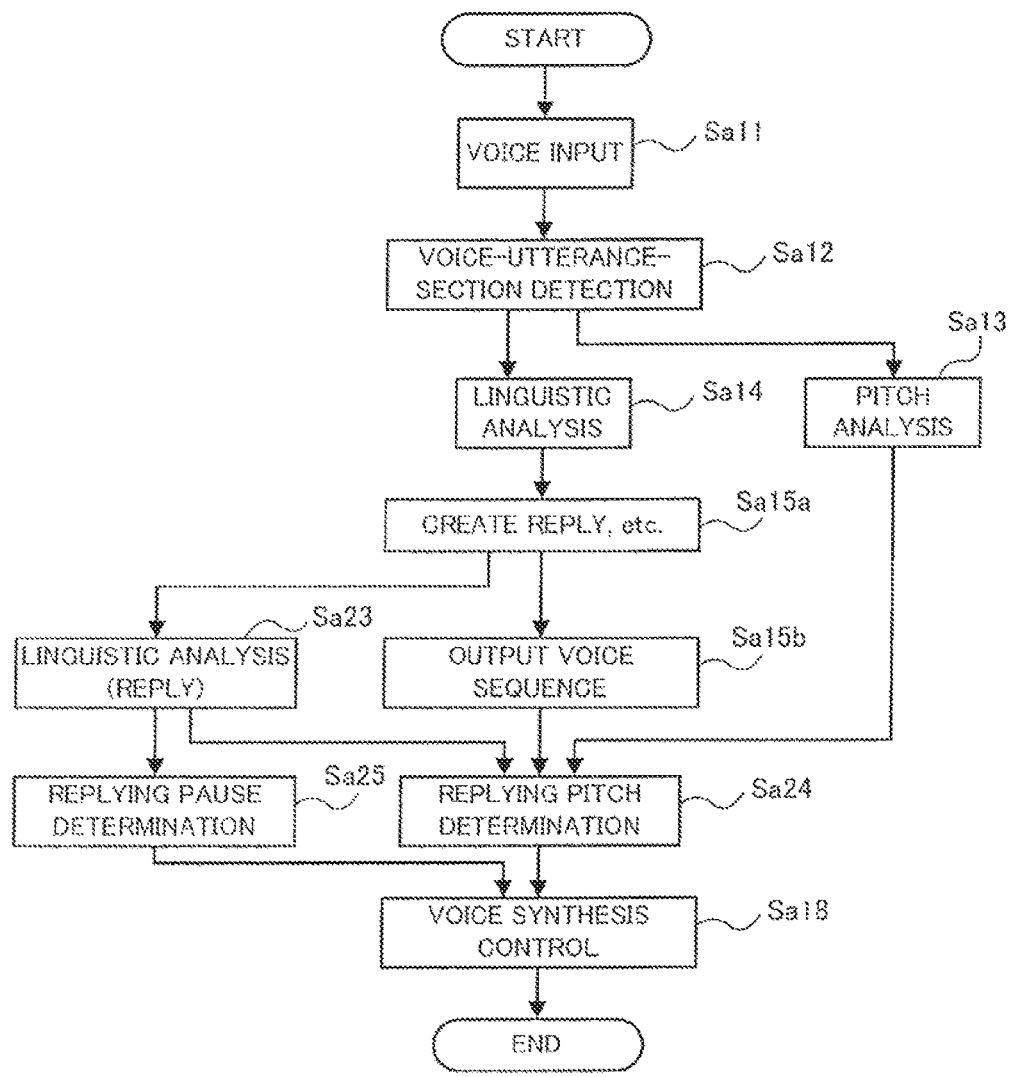
FIG. 21 is a flow chart showing an operational sequence executed by an eighth embodiment of the voice synthesis apparatus.

FIG. 21 is a flow chart of a process performed in the eighth embodiment of the voice synthesis apparatus 10. FIG. 21 is shown as a modification of FIG. 4, and steps that perform substantially the same operations as those in FIG. 4 are depicted by the same reference numerals as in FIG. 4 and will not be described to avoid unnecessary duplication.

At step Sa14 of FIG. 21, the linguistic analysis section 108A analyzes a meaning of words (question or remark) defined by a voice signal and supplies data indicative of the meaning to the reply creation section 110. Then, at step Sa15a, the reply creation section 110 creates a reply corresponding to the analyzed words (question) by use of the reply database 124 and, as necessary, the information acquisition section 126, and supplies the created reply to the linguistic analysis section 108A. Note that the reply created (read out from the reply database 124) is a reply of any one of the types (1), (2) and (4) to the question. Although not shown in the flow chart, a specific reply, i.e. a reply of the type (3), is created after the type (4) reply. At step Sa15b, the reply creation section 110 outputs a voice sequence of the created or acquired reply.

FIG. 22(a) shows an example voice sequence of an affirmative reply "hai" (romanized Japanese meaning "yes") of the type (1). In the illustrated example of FIG. 22(a), a note is allocated to each sound (i.e., each syllable) of the reply "hai" so that a pitch and generation timing of each word (syllable or phoneme) is indicated. Whereas one note is allocated to each sound (i.e., each syllable or phoneme) in the illustrated example for simplicity of explanation, a plurality of notes may be allocated to a sound by use of a note-connecting symbol, such as a slur or glissando, a plurality of sounds of different pitches may be interconnected transiently, etc.

FIG. 23(a) shows an example voice sequence of a negative reply "iie" (romanized Japanese) of the type (2), and FIG. 24(a) shows an example voice sequence of a reply "êto" (romanized Japanese meaning "Let me see") of the type (4).

The linguistic analysis section 108A analyzes the meaning of the reply supplied from the reply creation section 110, at step Sa23. In the instant embodiment, the linguistic analysis section 108A identifies which one of the types (1), (2) and (4) the reply is of and then supplies a result of the type identification to the voice control section 109A.

The voice control section 109A determines, at step Sa24, pitches of the entire replying voice sequence, output from the reply creation section 110, such that the pitch of the second segment of the replying voice sequence output from the reply creation section 110 assumes the following interval relationship with a pitch of the first segment (e, g., word ending) of pitch data supplied form the pitch analysis section 106.

More specifically, for the affirmative reply of the type (1), the voice control section 109A decides to shift the pitches of the entire replying voice sequence so that the pitch of the second segment (word ending) of the reply is changed to five degrees down from the pitch of the first segment (e, g., word ending) of the pitch data of the remark (question).

For the negative reply of the type (2), the voice control section 109A decides to shift the pitches of the entire replying voice sequence so that the pitch of the second segment (word ending) of the reply is changed to six degrees down from the pitch of the first segment (e, g., word ending) of the pitch data of the remark (question). Namely, the pitch of the second segment of the affirmative reply of the type (1) are set to be higher than the pitch of the second segment of the negative reply of the type (2).

For the reply of the type (4), the voice control section 109A decides to shift the pitches of the entire replying voice sequence in such a manner that the pitch of the second segment (word ending) of the reply is changed to, for example, five degrees down from the pitch of the first segment (e, g., word ending) indicated by the pitch data of the remark (question).

More specifically, consider a case where, of a question "asu wa hare?" (romanized Japanese meaning " " will it be fine tomorrow?), the pitch of "re" at the word ending depicted at reference character A in FIG. 22(b) is indicated as "pitch E" by the pitch data. In such a case, for the voice sequence of the affirmative reply "hai" (romanized Japanese) of the type (1), the voice control section 109A decides to shift the pitches defined in the entire replying voice sequence such that the pitch of "i" at the word ending of the reply depicted at reference character B in FIG. 22(b) becomes "pitch A" that is five degrees down from the pitch "E" of the word ending of the question.

Further, for the negative reply "iie" (romanized Japanese) of the type (2), the voice control section 109A decides to shift the pitches defined by the entire replying voice sequence such that the pitch of "e" at the word ending of the reply depicted at reference character C in FIG. 23(b) becomes "pitch G" that is six degrees down from the pitch "E" of the word ending of the question.

Also consider a case where, of a question "asu no tenki wa" (romanized Japanese meaning "How will the weather be tomorrow?"), the pitch of "wa" at the word ending depicted at reference character A in FIG. 24(b) is indicated as "pitch E" by the pitch data. In such a case, for the voice sequence "êto" (romanized Japanese) of the type (4), the voice control section 109A determines the pitches defined in the voice sequence such that the pitch of "to" at the word ending depicted at reference character D in FIG. 24(b) becomes "pitch A" that is five degrees down from the pitch "E" of the word ending of the question.

Referring now back to FIG. 21, the voice control section 109A determines output timing, i.e. "pause", of the replying voice sequence, at step Sa25. More specifically, the voice control section 109A sets a "pause" from the word ending of the question to outputting of the reply in a range of 0.5-2.0 sec for the affirmative reply of the type (1), or in the neighborhood of 3.0 sec, longer than the range for the type (1), for the negative reply of the type (2). Thus, the replying voice sequence for the affirmative reply of the type (1) will be output at earlier timing than the replying voice sequence for the negative reply of the type (2). Note that, for the reply of the type (4), the voice control section 109A sets a "pause" in the same range of 0.5-2.0 sec as for the reply of the type (1).

At step Sa18, the voice control section 109A controls the voice control section 112 to shift the voice sequence, supplied from the reply creation section 110, to the determined pitches and output the pitch-shifted voice sequence at the determined timing. In accordance with such control, the voice control section 112 changes the pitches of the voice sequence and synthesizes and outputs voices of the reply at the changed pitches.

For the replying voice output timing, the voice control section 109A may control the voice control section 112 to start the output of the voice sequence at a time point when a time measured by a realtime clock (not shown) starting at the word ending of the question, e.g. time point of the local maximum P1 (FIG. 5), has elapsed a preset time.

Although not particularly shown, the voice control section 112 is constructed so that, if it has output the replying voice of the type (4), it then outputs specific replying voice of the type (3). In the aforementioned manner, the execution of the application program is terminated, and the process returns to the menu screen.

Figure 25:
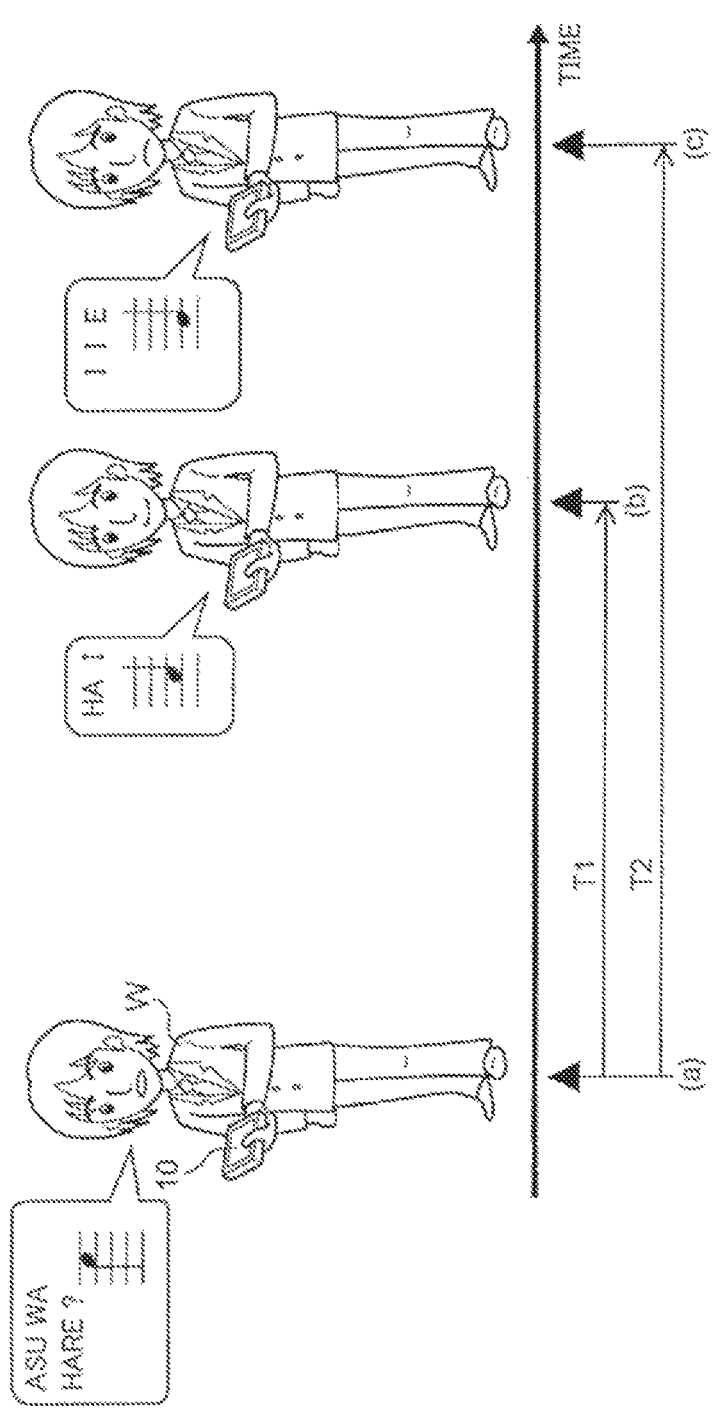
FIG. 25 is a diagram explanatory of output timing of a reply.

FIG. 25 is a diagram explanatory of output of replying voice of the type (1) or (2) in response to a question uttered by the user. More specifically, FIG. 25 shows a case where the voice synthesis apparatus 10 that is a terminal apparatus outputs "hai" or "iie" to a question "asu wa hare" (romanized Japanese meaning "will it be fine tomorrow") uttered by the user W.

In the illustrated example of FIG. 25, voice synthesis is performed in such a manner that the pitch of the word ending of the reply "hai" or "iie" assumes a consonant interval relationship of five or six degrees down from the pitch of the word ending of the question. Thus, the reply can give an impression as if a dialogue with a person were taking place, without giving an unnatural feel to the user.

What kind of relationships the pitch of the word ending of the reply "hai" of the type (1) and the pitch of the word ending of the reply "iie" of the type (2) assume with respect to the pitch of the word ending of the question in the illustrated example of FIG. 25 has already been described above in relation to FIGS. 22 and 23. The pitch of the word ending of the negative reply "iie" tends to be lower than the pitch of the word ending of the reply affirmative "hai". Thus, when replying with the negative meaning in the instant embodiment, the negative reply is output in low voice with such consideration as to not put the other person or other party in a bad mood. In this sense too, the instant embodiment can give an impression as if the user were actually dialoging with a person. Further, when outputting the negative reply of the type (2), the voice control section 109A may make the volume of the reply modest (i.e., lower the volume of the reply) as compared to the volume of the affirmative reply of the type (1).

Further, in the illustrated example of the figure, a time point when the question is uttered, e.g. a time point of "re" at the word ending, is indicated by (a), a time point when the word beginning of the reply "hai" is uttered is indicated by "b", and a time point when the word beginning of the reply "iie" is uttered is indicated by "c". A time period T1 from the utterance of the question to the time point when the reply "hai" is output is shorter than a time period T2 from the utterance of the question to the time point when the reply "iie" is output; that is, T1<T2. In other words, in the instant embodiment of the voice synthesis apparatus 10, the reply "iie" is output slightly later than the reply "hai". Thus, according to the present invention, replies, such as "hai" and "iie", can be output in synthesized voice, with pauses similar to those taken in an actual dialogue with a person.

Figure 26:
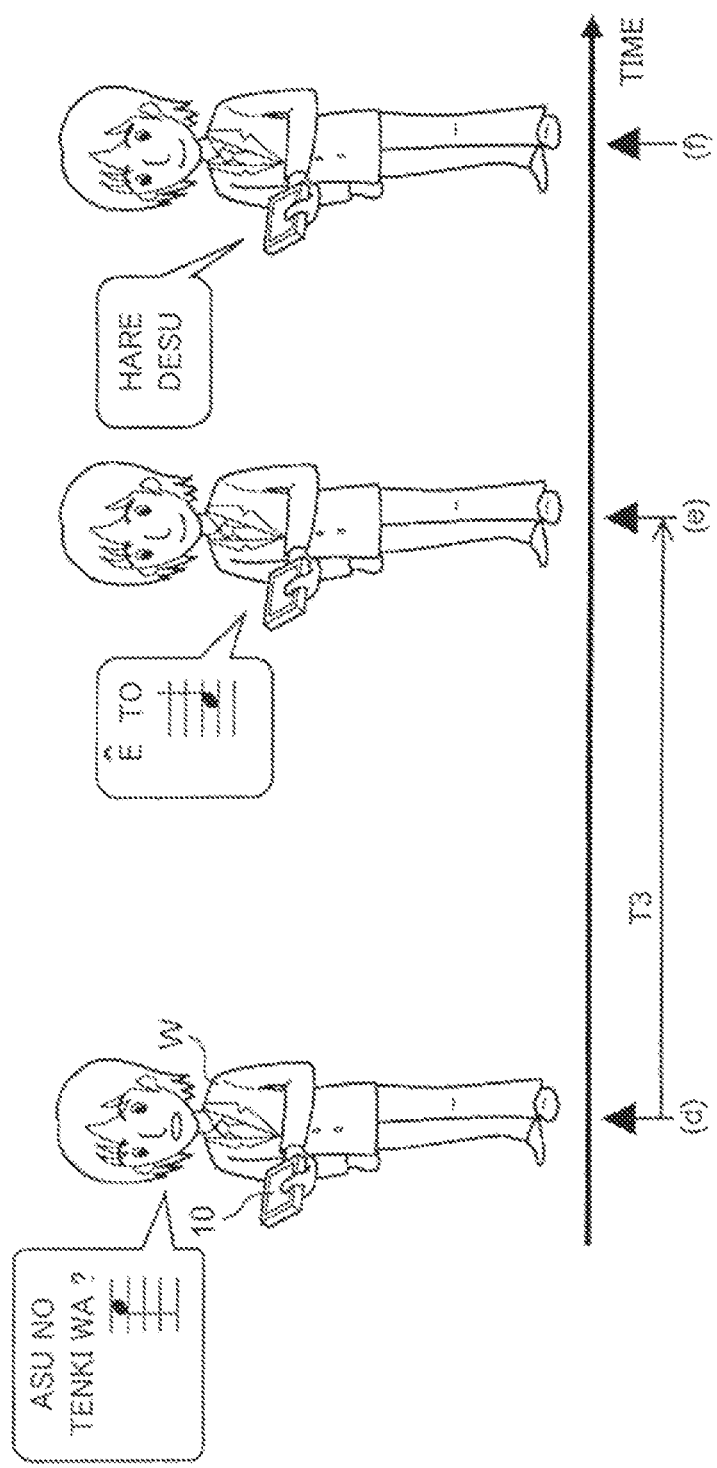
FIG. 26 is a diagram explanatory of output timing of a reply.

FIG. 26 is an diagram explanatory of output of replying voice of the types (3) or (4) to the question uttered by the user. More specifically, FIG. 26 shows a case where the voice synthesis apparatus 10 outputs a specific reply a question "asu no tenki wa" (romanized Japanese meaning "How will the weather be tomorrow?") uttered by the user. In the illustrated example of FIG. 26, a reply "êto" of the type (4) is output in response to the question before a specific reply of the type (3) is output. Because it is necessary to access any of various databases and external servers for creating the specific reply, it may sometimes take a relatively long time to create the reply. If a considerably long silent state continues in the voice synthesis apparatus 10 until the specific reply is created, a feeling of anxiety would be given to the user. However, in the instant embodiment, where the reply of the type (4) is tentatively output, no such feeling of anxiety is given to the user. Further, in actual dialogues between persons, uttering such a type (4) reply before replying with specific content is a commonly-done activity. Because the instant embodiment is constructed to synthesize voice of a reply by imitating such a commonly-done activity, it can give the user an impression as if the user were actually dialoging with a person.

In the illustrated example of the figure, a time point when the question is uttered, e.g. a time point of "wa" at the word ending of the reply, is indicated by (d), a time point when the word beginning of the reply "êto" is uttered is indicated by "e", and a time point when the word beginning of the reply "hare desu" is uttered is indicated by "f". It is preferable that a time period T3 from the utterance of the question till the time point when the reply "êto" be substantially equal to the time period T1 of the reply of the type (1). If it takes a long time to create a specific reply like "hare desu", the same reply "êto" or another reply may be repeated, as the type (4) reply, to provide a pause of an increased time length.

<Modification Using Voice Waveform Data>

Whereas the eighth embodiment of the present invention has been described as constructed to output, as a reply to a question, a voice sequence where a pitch is allocated per sound (per syllable), the eight embodiment may be modified in a similar manner to the above-described second embodiment. Namely, a combination of the reply creation section 110 and the voice synthesis section 112 of FIG. 20 (i.e., the voice generation section using the voice synthesis technique) may be replaced with the combination of the replying voice output section 113 and the post-processing section 114 (i.e., the voice generation section using waveform data), and voice waveform data, for example, in the WAV format may be output from the replying voice output section 113.

In such a case, the post-processing section 114 can be constructed, for example, to output (reproduce) the voice waveform data after performing pitch conversion, such as a filtering process, such that the pitch of the second segment (e.g., word ending) of the reply assumes a predetermined interval relationship with the pitch of the first segment (e.g., word ending) in the pitch data of the remark (question). Further, the pitch conversion may be performed using the so-called key control technique that shifts pitches without changing a speech rate (speaking speed) as well known in the field of karaoke equipment.

Note that the various application examples and/or the modifications related to the first and second embodiments are also applicable to the eighth embodiment of the present invention.

In short, the eighth embodiment of the present invention is characterized by including: a linguistic analysis section (linguistic analysis section 108A) that analyzes linguistic information contained in a question (remark) and a reply; and a control section (voice control section 109A) that controls generation, by the voice generation section (i.e., the voice synthesis section 112 or the combination of the responsive output section 113 and the post-processing section 114), of voice of the reply.

<Ninth Embodiment>

Figure 27:
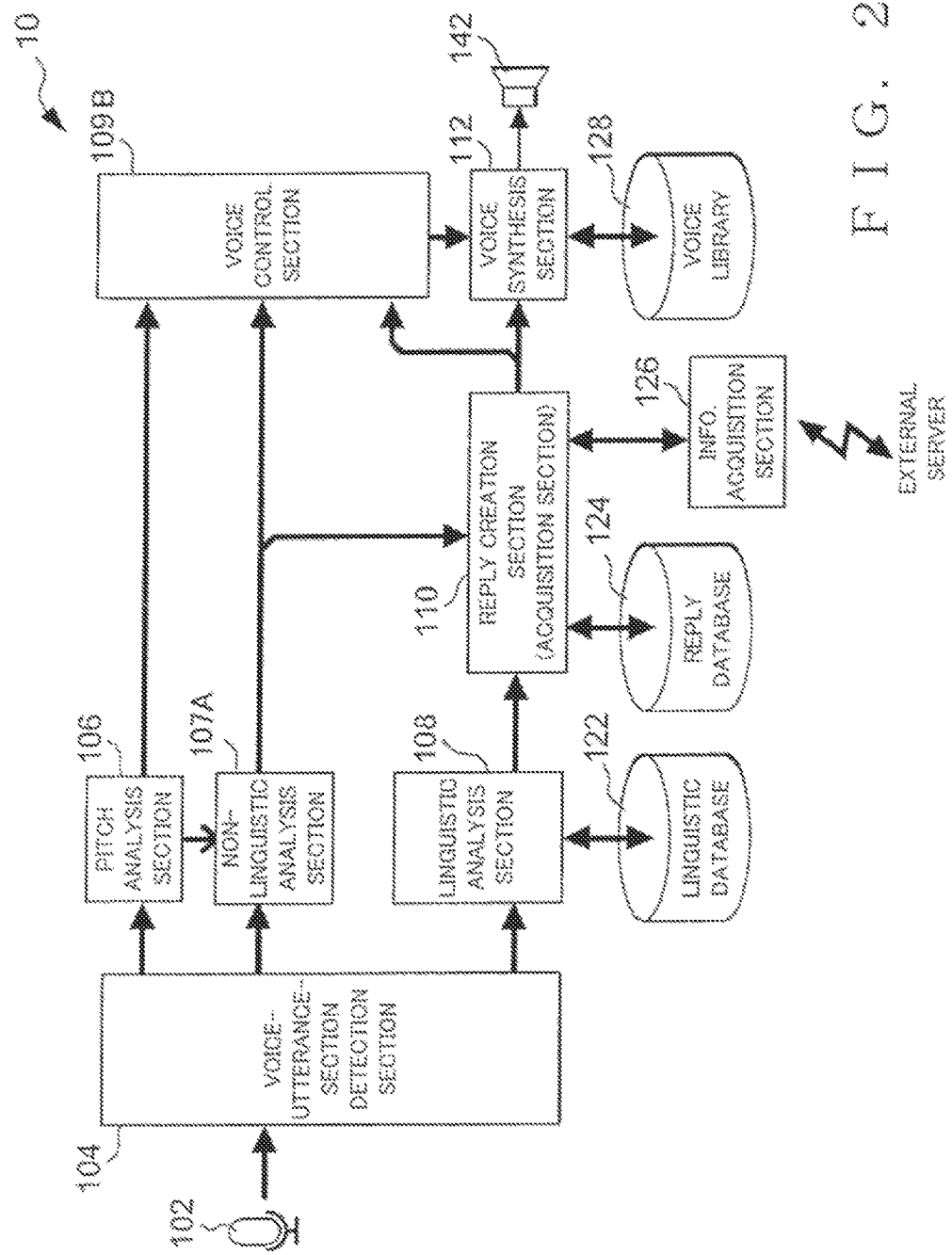
FIG. 27 is a block diagram showing a construction of a ninth embodiment of the voice synthesis apparatus of the present invention.

The following describe, with reference to FIG. 27, a ninth embodiment of the voice synthesis apparatus of the present invention, which is characterized by controlling pitch variation in a reply (response) in accordance with pitch variation over time in a remark (question). FIG. 27 is a functional block diagram of the ninth embodiment of the voice synthesis apparatus 10 of the present invention. Blocks in FIG. 27 that implement substantially the same functions as those in FIG. 1 are depicted by the same reference characters as in FIG. 1 and will not be described to avoid unnecessary duplication. The embodiment of FIG. 27 includes a non-linguistic analysis section 107A and a voice control section 109B in addition to the construction shown in FIG. 1.

The non-linguistic analysis section 107A performs volume analysis and frequency analysis on a voice signal of the remark, detected as a voice utterance section by the section 104, to thereby detect pitch variation over time in the remark, and it outputs, as non-linguistic information in the data indicative of the pitch variation in the remark. The data indicative of the pitch variation is supplied to the voice control section 109B and the reply creation section 110.

The reply creation section 110 creates a reply corresponding to the remark analyzed by the linguistic analysis section 108, by use of the data indicative of the pitch variation analyzed by the non-linguistic analysis section 107A and with reference to the reply database 124 and the information acquisition section 126. As in the eighth embodiment, the reply creation section 110 in the ninth embodiment may create (acquire) the following types of reply:

(1) reply indicative of an affirmative meaning;
(2) reply indicative of a negative meaning;
(3) reply of specific content to a question; and
(4) reply as back-channel feedback to the question (see FIGS. 22 to 24).

A voice sequence created/acquired by the reply creation section 110 is supplied to the voice control section 109B and the voice synthesis section 112, as in the above-described eighth embodiment (see FIG. 20 etc.). The voice control section 109B determines content of control to be performed on the voice sequence, in accordance with pitch data supplied from the pitch analysis section 106 and data indicative of pitch variation in the remark supplied form the non-linguistic analysis section 107A.

Figure 28:
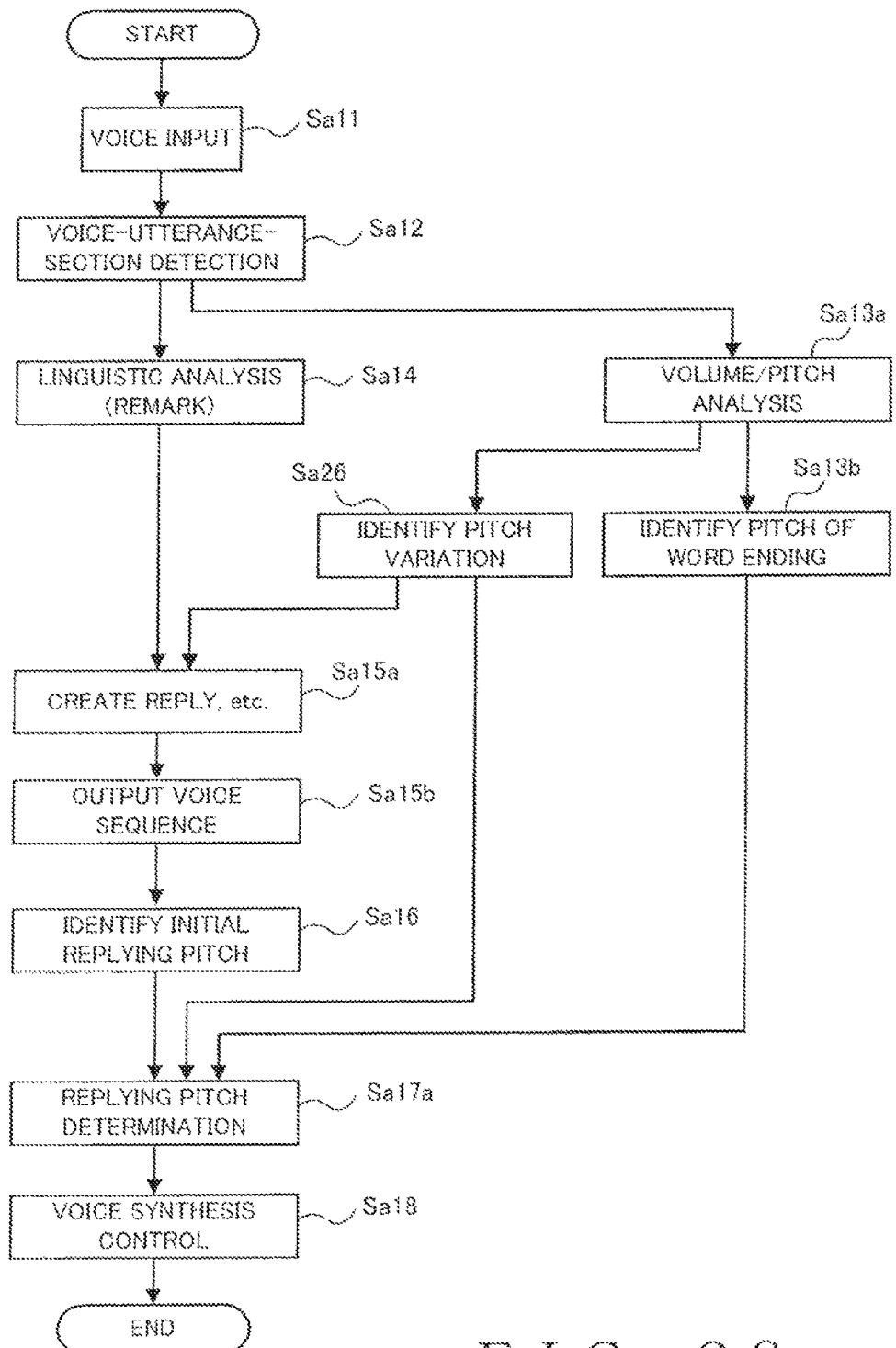
FIG. 28 is a flow chart of voice synthesis processing performed in the ninth embodiment of the voice synthesis apparatus.

FIG. 28 is a flow chart of voice synthesis processing performed in the ninth embodiment of the voice synthesis apparatus 10. FIG. 28 is shown as a modification of FIG. 4, and steps that perform substantially the same operations as those in FIG. 4 are depicted by the same reference numerals as in FIG. 4 and will not be described to avoid unnecessary duplication.

At steps Sa13a and Sa13b of FIG. 28, the pitch analysis section 106 analyzes the voice signal, in the detected utterance section, of the question (or remark), identifies a pitch of the first segment (word ending) in the question (or remark) and then supplies pitch data indicative of the identified pitch to the voice synthesis section 112, in the same manner as at step Sa13 of FIG. 4. Namely, as step Sa13a, the pitch analysis section 106 analyzes the voice signal in the detected utterance section to convert the signal into waveforms separately for the volume and pitch of the question (or remark). Examples of such converted volume waveform and pitch waveform are similar to those shown in FIG. 5 above. However, for convenience of explanation, the converted volume waveform and pitch waveform similar to those shown in FIG. 5 are shown in FIG. 29.

At step Sa26, the non-linguistic analysis section 107A identifies a timewise pitch variation state in the pitch waveform of the input voice (remark or question) analyzed at step Sa13a above by the pitch analysis section 10. An example method for identifying such a timewise pitch variation at step Sa26 will now be described with reference to FIG. 29. First, the non-linguistic analysis section 107A identifies, from the pitch waveform of FIG. 29(b), a pitch N0 at a time point P0 that is a predetermined time Ts (e.g., 0.3 sec) before a time point of a local maximum P1 of the volume waveform of FIG. 29(a). Then, the non-linguistic analysis section 107A evaluates a pitch variation amount from the pitch N0 to a pitch N1 (i.e., N1–N0) and supplies this pitch variation amount to the voice control section 109B and the reply creation section 110 as data indicative of a pitch variation state. The time Ts may be set as a variable value corresponding to a time interval between the word beginning and ending of the remark, rather than being set at a predetermined fixed value. As an example, a time point corresponding to the word beginning of the remark may be set as the time point P0. Further, content of the data indicative of a pitch variation state to be identified by the non-linguistic analysis section 107A is not limited to the pitch variation amount equal to the difference N1–N0. For example, a variation pattern of pitches of individual words (word-specific pitches) in the remark may be identified, and data indicative of the thus-identified variation pattern may be supplied to the voice control section 109B and the reply creation section 110 as the data indicative of a pitch variation state.

Referring back to FIG. 28, operations similar to step Sa15 of FIG. 4 or steps Sa15a and Sa15b of FIG. 21 are performed at steps Sa15a and Sa15b of FIG. 28. However, in the ninth embodiment, the reply creation section 110 is constructed in such a manner that, even for a remark (input voice) comprising a same character train, it can create a reply comprising a different character train in accordance with a pitch variation state of the remark (input voice) as long as the pitch variation state differs. For example, even where a result of linguistic analysis of a remark uttered by the user is "asu wa hare", the remark can become a question (interrogative sentence) "asu wa hare (desuka)?" (romanized Japanese meaning "Will it be fine tomorrow?" if the pitch of the remark rises toward the word ending. Thus, the reply creation section 110 accesses the external server to acquire weather information necessary for a reply and outputs a voice sequence "hai" (romanized Japanese meaning "yes") if the acquired weather information indicates "hare" (romanized Japanese meaning "fine") or outputs a voice sequence "iie" (romanized Japanese meaning "no") if the acquired weather information indicates other than "hare". Further, even where the result of linguistic analysis of the user's remark is "asu wa hare" as above, the remark can become a monologue like "asu wa hare (kâ)" if the pitch variation of the remark is flat or falls toward the word ending. Thus, the reply creation section 110 reads out or outputs from the reply database 124 a voice sequence of back-channel feedback like "sou desune". For example, the reply creation section 110 determines that the pitch of the remark rises toward the word ending if the pitch variation amount exceeds a threshold value, but determines that the pitch of the remark is flat or falls toward the word ending if the pitch variation amount is equal to or smaller than the threshold value.

At step Sa16 of FIG. 28, the voice control section 109B identifies a pitch (initial pitch) of the word ending of the voice sequence supplied from the reply creation section 110, in the same manner as step Sa16 of FIG. 4.

Then, at step Sa17a, the voice control section 109B determines content of a change to be made to the pitch of the voice sequence as follows on the basis of the pitch data and the data indicative of the pitch variation state supplied from the non-linguistic analysis section 107A. More specifically, if the pitch of the user's remark rises toward the word ending, the voice control section 109B determines that the pitches of the entire voice sequence be changed in such a manner that the initial pitch of the word ending defined in the voice sequence assumes a predetermined interval relationship of five degrees down from the pitch indicated by the pitch data. If, on the other hand, the pitch of the user's remark is flat or falls toward the word ending, the voice control section 109B determines that all of the pitches of the entire voice sequence be changed to the pitch five degrees down from the pitch indicated by the pitch data.

The following describe, in relation to a specific example, the pitches of the remark, pitch variation and voice sequence change performed in the ninth embodiment. A left area of FIG. 30(b) shows an example remark given by the user, which more particularly shows an example where a result of linguistic analysis of the user's remark is "asu wa hare" (romanized Japanese meaning " " It will fine tomorrow." and where, per sound (syllable), a pitch is indicated by a note as shown in the part. Note that, although the remark has a pitch waveform as shown in FIG. 29(b), the pitch of the remark are depicted by the notes for convenience of description. Because the pitch of the remark rises toward the word ending in the illustrated example, the reply creation section 110 determines that the user's remark is a question (interrogative sentence). Thus, the reply creation section 110 outputs a voice sequence "hai" if weather information acquired in response to the remark indicates "hare" or outputs a voice sequence "iie" if the acquired weather information indicates other than "hare".

FIG. 30(a) shows an example of fundamental voice of a voice sequence of a reply "hai" (romanized Japanese), where a note is allocated per sound (syllable) to define a pitch and generation timing of each word (syllable or phoneme) of the fundamental voice.

Such a fundamental replying voice sequence is changed as follows by the voice control section 109B. Namely, if, of the remark indicated in the left area of FIG. 30(*b*), the pitch of the segment "re" at the word ending indicated by reference character A is indicated as "G" by the pitch data, the voice control section 109B changes the pitches of the entire voice sequence in such a manner that, of the reply "hai", the pitch of the segment "i" at the word ending indicated by reference character B becomes five degrees down from the pitch "G". Whereas the voice sequence change has been described in relation to the reply "hai", pitches of entire voice sequences of other replying voices are changed in a similar manner to the aforementioned.

Where the result of the linguistic analysis of the user's remark is "asu wa hare" as above and the pitch variation of the remark is flat as shown in a left area of FIG. 31(*b*), the reply creation section 110 determines that the remark is a monograph or the like. Thus, the reply creation section 110 outputs a voice sequence of for example, "sou desune" (romanized Japanese meaning "Well, . . . ") as noted earlier. FIG. 31(*a*) shows an example of fundamental voice of the voice sequence of "sou desune". Such a fundamental voice sequence is changed as follows by the voice control section 109B.

Namely, if, of the remark indicated in the left area of FIG. 31(*b*), the pitch of the segment "re" at the word ending indicated by reference character A is indicated as "G" by the pitch data, the voice control section 109B changes all the pitches of the replying voice "sou desune" (including "ne" at the word ending indicated by reference character B) to "C" that is five degrees down from "G" (see a right half area of FIG. 31(*b*)).

In this case too, because voice of the reply is synthesized so that the pitch of the word ending of the reply as back-channel feedback assumes a relationship of five degrees down from the pitch of the word ending, it is possible to give the user a good impression as if a dialogue were being conducted with a person, without giving the user an unnatural feel. Further, according to the instant embodiment, even for the same result of the linguistic analysis of the remark, different replies are created depending on the pitch variation toward the word ending in the remark. Further, if the pitch of the remark is flat, the pitch of back-channel feedback to the remark too is flattened; namely, the pitch variation state defined in the original voice sequence too is changed. Thus, the instant embodiment can give the user an impression as if the user were dialoging with a person rather than with a machine.

<Modification Using Voice Waveform Data>

Like the above-described eighth embodiment, the ninth embodiment may be modified in a similar manner to the above-described second embodiment. Namely, the combination of the reply creation section 110 and the voice synthesis section 112 of FIG. 27 (i.e., the voice generation section using the voice synthesis technique) may be replaced with the combination of the replying voice output section 113 and the post-processing section 114 as shown in FIG. 8 or 16 or 19 (i.e., the voice generation section using waveform data), and voice waveform data, for example, in the WAV format may be output from the replying voice output section 113.

<Pitch Variation State of Reply, Average Pitch Etc. Of Reply>

The ninth embodiment has been described above as constructed to change the pitch variation state and average pitch of the reply defined in the original voice sequence as a result of shifting the pitches of the entire voice sequence so that the pitch of the word ending or the like of the reply becomes, for example, five degrees down from the pitch of the word ending or the like of the question or as a result of flattening the pitches of the voice sequence. However, the ninth embodiment is not limited to such a construction and may be modified to change the pitch variation state of the fundamental voice sequence. For example, for the pitch variation state where the pitch of the remark rises toward the word ending, the ninth embodiment may change the pitch variation state of the fundamental voice sequence so that the pitch of the reply falls toward the word ending, while, for the pitch variation state where the pitch of the remark falls toward the word ending, the ninth embodiment may change the pitch variation state of the fundamental voice sequence so that the pitch of the reply rises toward the word ending. Further, the ninth embodiment may be constructed to change all or a portion of the pitches of the fundamental voice sequence so that the average pitch of the entire reply changes in accordance with the pitch of the word ending or the like of the remark or pitch variation of the remark.

<Volume and Volume Variation of Remark, and Volume and Volume Variation of Reply>

The ninth embodiment has been described above as constructed to identify the word ending of the remark by use of volume variation of the remark. For such volume of the remark, various applications are conceivable as non-linguistic information other than pitch information. For example, the ninth embodiment may be constructed to control volume of synthesized voice of the reply in accordance with an average volume of the remark. Further, the ninth embodiment may be constructed to control volume variation of the reply in accordance with volume variation (amplitude envelope) of the remark.

<Content of Dialogue>

Figure 32:
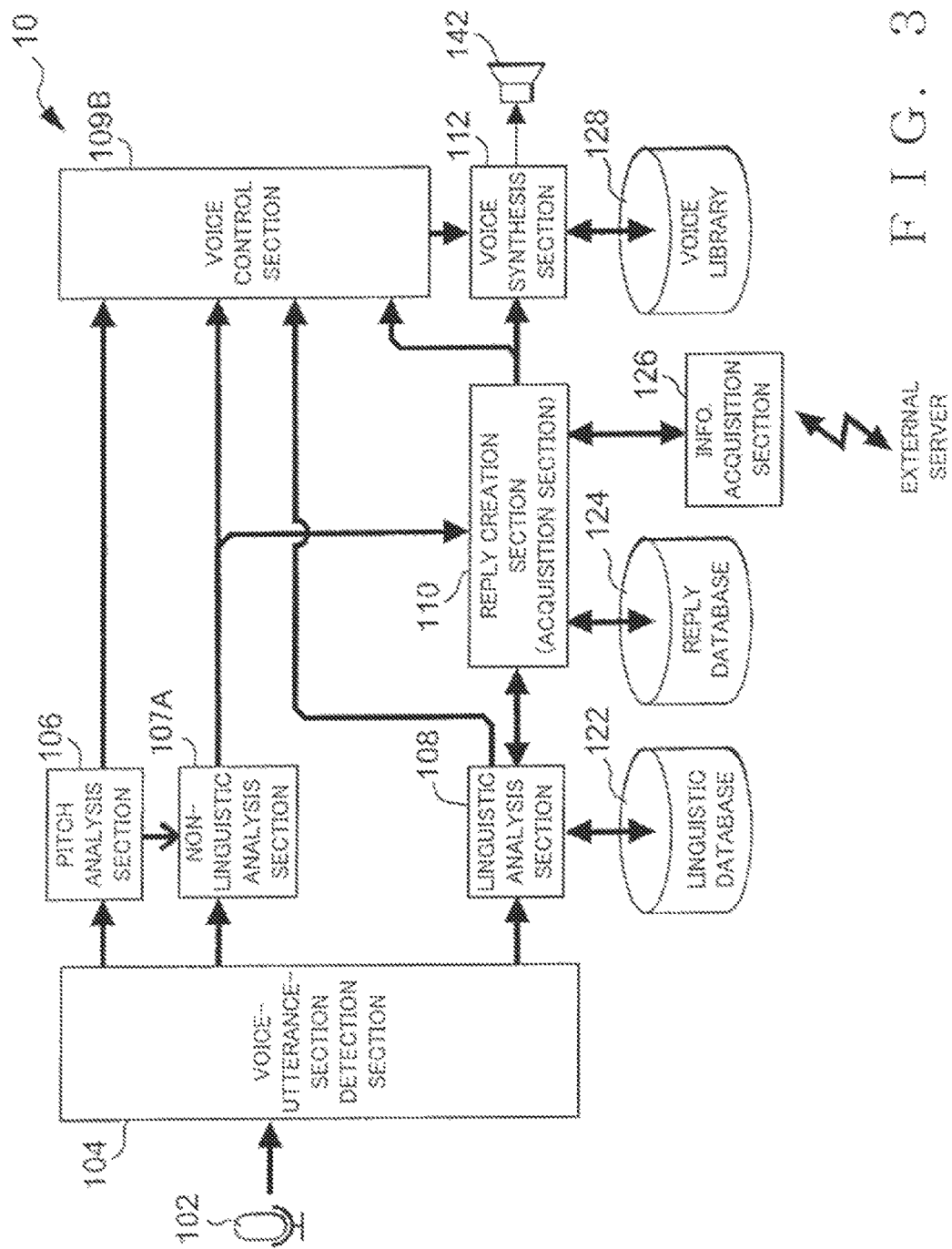
FIG. 32 is a block diagram showing a construction of a modification of the voice synthesis apparatus of the present invention.

The ninth embodiment has been described above as constructed to terminate its processing at a time point when the voice synthesis apparatus 10 outputs a reply to the user's remark in synthesized voice. However, in an actual dialogue between persons, a remark and a reply are often repeated instead of the dialogue merely ending with the remark and the reply to the remark, and the number of such repetitions increases or decreases depending on the meanings of the remark and the reply. Thus, as shown in FIG. 32, the ninth embodiment may be modified in such a manner that the linguistic analysis section 108 performs linguistic analysis on not only the user's remark but also the reply created by the reply creation section 110 and supplies results of the linguistic analysis to the voice control section 109, and that the voice control section 109 controls the pitch of the word ending or the like of the reply, pitch variation state of the reply, average pitch of the reply, etc. in accordance with the results of the linguistic analysis.

Note that the various application examples and/or the modifications related to the first and second embodiments are also applicable to the ninth embodiment of the present invention.

In summary, the above-described ninth embodiment is characterized by including: the non-linguistic analysis section (107A) that analyzes pitch variation in the remark; and the control section (voice control section 109B) that performs, in accordance with the analyzed pitch variation in the remark, control for changing the pitch of the voice of the reply generated by the voice generation section (the voice synthesis section 112, or the combination of the replying voice output section (113) and the post-processing section (114)).

<Tenth Embodiment>

Figure 33:
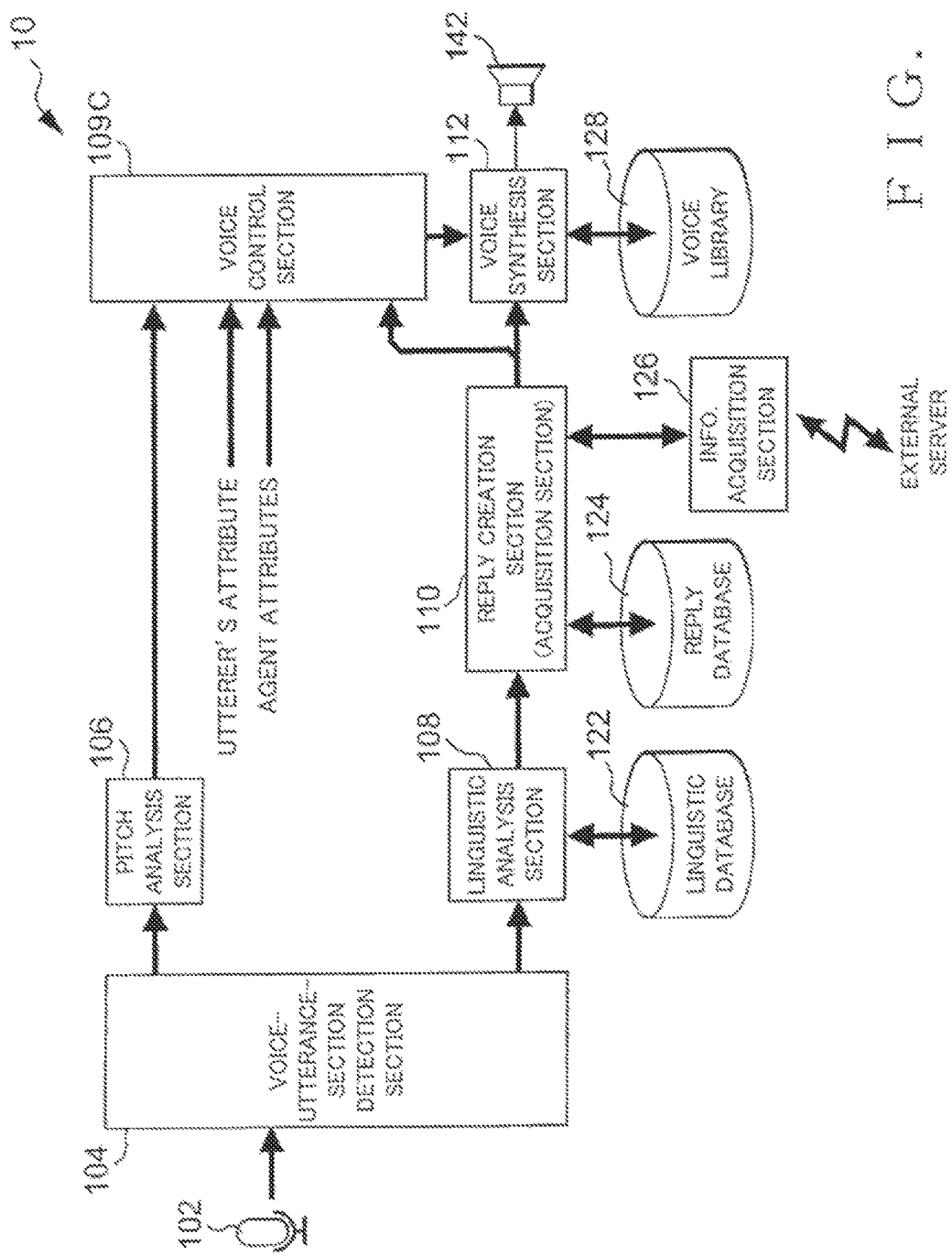
FIG. 33 is a block diagram showing a construction of a tenth embodiment of the voice synthesis apparatus of the present invention.

The following describe, with reference to FIG. 33, a tenth embodiment of the voice synthesis apparatus of the present invention, which is characterized by modifying, in accordance with an attribute of a speaker or utterer of a remark or an attribute of replying voice, a rule for determining a pitch of the second segment in the replying voice. FIG. 33 is a functional block diagram of the tenth embodiment of the voice synthesis apparatus 10 of the present invention. Blocks in FIG. 33 that implement substantially the same functions as those in FIG. 1 are depicted by the same reference characters as in FIG. 1 and will not be described to avoid unnecessary duplication. The embodiment of FIG. 33 includes a voice control section 109C in addition to the construction shown in FIG. 1.

Similarly to the counterpart in each of the above-described embodiments, the voice synthesis section 112 in the tenth embodiment synthesizes voice of the reply by controlling the pitch of the second segment of the reply in accordance with a given rule, i.e. in such a manner that the pitch of the second segment of the reply assumes a predetermined interval relationship with the pitch of the word ending of the question or remark. Further, the voice synthesis section 112 in the tenth embodiment is constructed to generate voice of the reply with a characteristic based on a given agent attribute. The agent attribute is information indicative of a virtual person whose voice is to be synthesized by the voice synthesis apparatus 10. Namely, the agent attribute is data indicative of the person for defining what type of person is assumed to synthesize the voice of the reply. For simplicity of description, let it be assumed here that the agent attribute is data defining a sex. The instant embodiment is constructed in such a manner that a desired agent attribute is selected or set by the user via an operation input section belonging to the voice synthesis apparatus 10, and that information indicative of the selected or set agent attribute is supplied to the voice synthesis section 112 and voice of the reply is synthesized with a characteristic based on the agent attribute.

The aforementioned rule to be applied in the voice synthesis section 112 in order to control the pitches of the replying voice sequence is determined by the voice control section 109C. As an example default of the rule (default rule), it is defined that the voice control section 109C should shift the pitch of the word ending of the reply to assume a predetermined interval relationship with, more specifically five degrees down from, the pitch of the word ending of the remark (question). In an alternative, however, the voice control section 109C may shift the pitch of the word ending of the reply to a pitch that has other than the abovementioned interval relationship of five degrees down from the pitch of the word ending of the remark (question). However, if the default rule is adhered to, the reply created through voice synthesis may undesirably become unnatural. Thus, the voice control section 109C is constructed to modify as necessary the default rule in accordance with the attribute of the remark utterer (remark utterer's attribute) and the agent attribute, so that the rule to be applied in the voice synthesis section 112 is determined. The remark utterer's attribute is an attribute of the utterer of the input remark (question), which is, in the instant embodiment, the sex of the utterer (user). As data defining the remark utterer's attribute can be used, for example, personal information of the user registered in the terminal apparatus functioning as the voice synthesis apparatus 10.

For voice synthesis, the voice synthesis section 112 uses voice fragment data registered in the voice library 128. Voice fragment data defining waveforms of various voice fragments, such as individual phonemes and phoneme-to-phoneme transition portions, that are to be used as materials of voices are compiled in advance as a database for each of a plurality of agent attributes. More specifically, the voice synthesis section 112 generates a voice signal using the voice fragment data defined by the selected or set agent attribute, more specifically by combining the voice fragment data of individual sounds (syllables) of a voice sequence and modifying the combined voice fragment data to be connected continuously.

Figure 34:
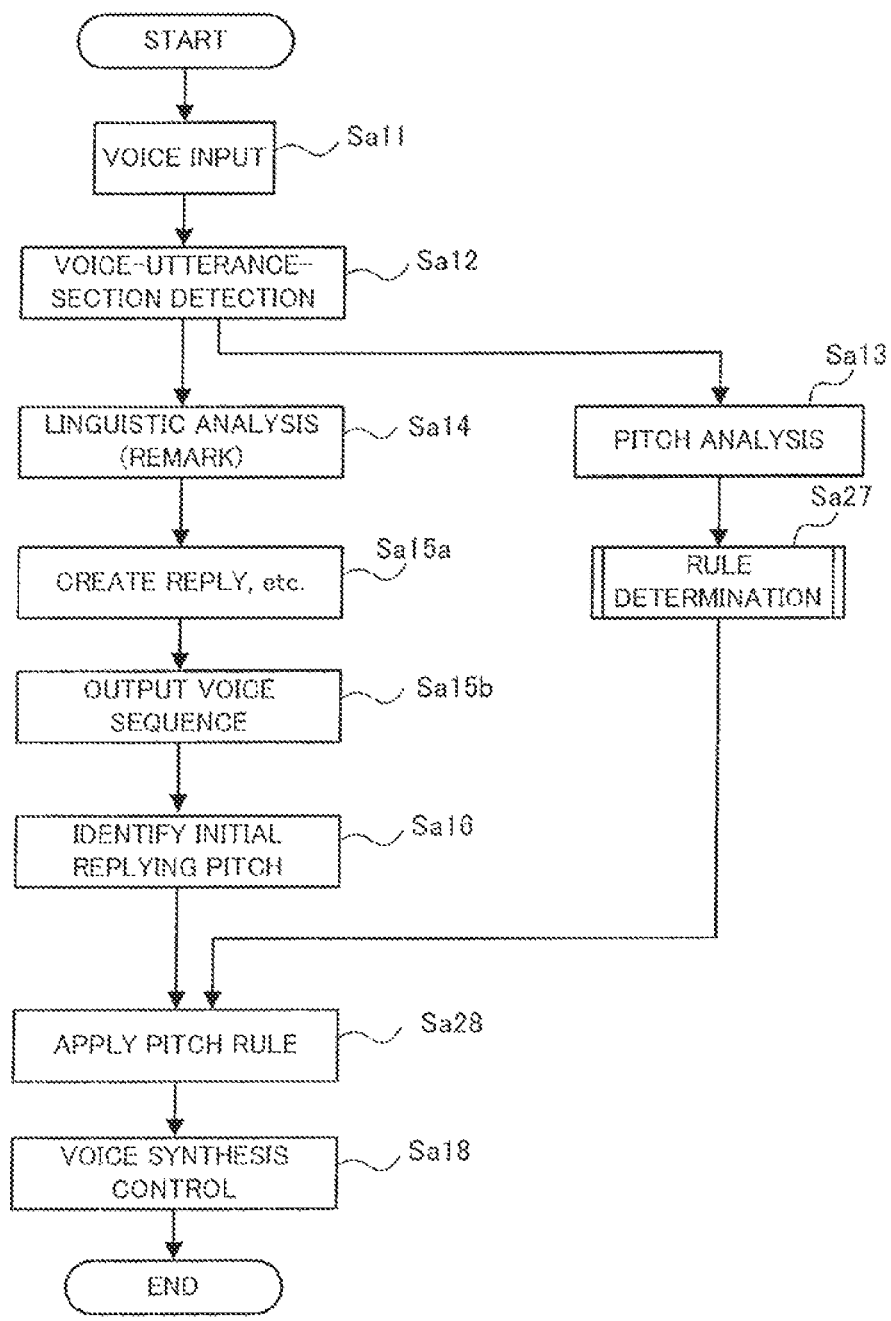
FIG. 34 is a flow chart of voice synthesis processing performed in the tenth embodiment of the voice synthesis apparatus.

FIG. 34 is a flow chart of a process performed in the tenth embodiment of the voice synthesis apparatus 10. FIG. 34 is shown as a modification of FIG. 4, and steps that perform substantially the same operations as those in FIG. 4 are depicted by the same reference numerals as in FIG. 4 and will not be described to avoid unnecessary duplication.

Operations similar to step Sa15 of FIG. 4 and steps Sa15*a* and Sa15*b* of FIG. 21 are performed at steps Sa15*a* and Sa15*b* of FIG. 34. Further, at step Sa16, an operation for identifying a pitch (initial pitch) of the word ending in the replying voice sequence, in the same manner as at step Sa16 of FIG. 14. Further, at step Sa13, analysis is performed on the voice signal of the remark in the detected utterance section to identify a pitch of the first segment (word ending) in the remark, in the same manner as at step Sa13 of FIG. 14. Pitch data indicative of the thus-identified pitch is supplied to the voice control section 19C.

At step Sa27, a rule determination process is performed by the voice control section 109C, on the basis of the agent attribute and the remark utterer's attribute, to determine a rule to be applied. FIG. 35 is a flow chart showing details of the rule determination process.

First, at step Sb11 of FIG. 35, the voice control section 109C acquires data indicative of the agent attribute and data indicative of the agent attribute. Then, at step Sb12, the voice control section 109C determines, on the basis of the acquired data, whether or not the remark utterer's attribute, i.e. the user's attribute, is female. If the remark utterer's attribute is female (Yes determination at step Sb12), the voice control section 109C modifies the default rule such that the pitch of the word ending of the reply is shifted to a pitch six degrees (not default five degrees) down from the pitch indicated by the pitch data, i.e. to a pitch that is in a consonant interval relationship with the pitch indicated by the pitch data and one rank down from the default relationship, with the pitch indicated by the pitch data. In this manner, a pitch lowered from the pitch preset by the default rule is determined as the pitch of the word ending of the reply, at step Sb13. The term "rank" does not have any musical meaning and is used herein merely for convenience of description. Namely, in the instant embodiment, where the pitch five degrees down from the pitch indicated by the pitch data is set as a reference pitch, the pitch lowered by one rank from the reference pitch refers to a pitch that is six degrees (major sixth) down from the pitch indicated by the pitch data, and the pitch lowered by another one rank from the reference pitch refers to a pitch that is eight degrees down from the pitch indicated by the pitch data. Further, the pitch raised by one rank from the reference pitch refers to a pitch that is three degrees (major third) up from (higher than) the pitch indicated by the pitch data, and the pitch raised by another one rank from the reference pitch refers to a pitch that is four degrees up from the pitch indicated by the pitch data.

If, on the other hand, the remark utterer's attribute is not female (No determination at step Sb12), the voice control section 109C further determines, at step Sb14, whether the remark utterer's attribute is male. If the remark utterer's attribute is male (Yes determination at step Sb14), the voice control section 109C modifies the default rule such that the pitch of the word ending of the reply is shifted to a pitch three degrees down from the pitch indicated by the pitch data. In this manner, a pitch raised from the pitch preset by the default rule is determined as the pitch of the word ending of the reply, at step Sb15. If the remark utterer's attribute is neutral or if the remark utterer's attribute has not yet been registered (No determination at step Sb14), the voice control section 109C skips the operation at step Sb13 or Sb15 and uses the default rule in an unmodified form.

Then, at step Sb16, the voice control section 109C determines whether or not the agent attribute is female. If the agent attribute is female (Yes determination at step Sb16), the voice control section 109C modifies the modified default rule (or unmodified default rule) such that the pitch of the word ending of the reply is shifted one rank up, at step Sb17. For example, if the default rule has been modified at step Sb13 above such that the pitch of the word ending of the reply is shifted one rank down, or six degrees down from the pitch indicated by the pitch data, the voice control section 109C returns the modified rule back to the original default rule at step Sb17 such that the pitch of the word ending of the reply is shifted five degrees down from the pitch indicated by the pitch data. Further, if the default rule has been modified at step Sb15 above at step Sb17 such that the pitch of the word ending of the reply is shifted one rank down, or three degrees down from the pitch indicated by the pitch data, the voice control section 109C further modifies the modified default rule at step Sb17 such that the pitch of the word ending of the reply is shifted one further rank up, or four degrees up from the pitch indicated by the pitch data. Note that, if the operation of step Sb13 or Sb15 has been skipped as above, the voice control section 109C modifies the default rule at step Sb17 such that the pitch of the word ending of the reply is shifted one rank up, or three degrees down from the pitch indicated by the pitch data.

If the agent attribute is not female (No determination at step Sb16), the voice control section 109C further determines, at step Sb18, whether the agent attribute is male. If the agent attribute is male (Yes determination at step Sb18), the voice control section 109C further modifies the modified default rule such that the pitch of the word ending of the reply is shifted up to the pitch that is one rank down, at step Sb19. For example, if the default rule has been modified such that the pitch of the word ending of the reply is shifted one rank down or six degrees down from the pitch indicated by the pitch data, the voice control section 109C further modifies the default rule at step Sb19 such that the pitch of the word ending of the reply is shifted to the pitch one further rank down from the reference pitch or eight degrees down from the pitch indicated by the pitch data. Further, if the default rule has been modified such that the pitch of the word ending of the reply is shifted to the pitch one rank up or three degrees down from the pitch indicated by the pitch data, the voice control section 109C returns the modified default rule back to the original default rule such that the pitch of the word ending of the reply is shifted to the pitch that is five degrees down as originally defined. Further, if the operation of step Sb13 or Sb15 has been skipped, the voice control section 109C modifies the default rule at step Sb19 so that the pitch of the word ending of the reply is shifted to the pitch that is one rank down from the reference pitch or six degrees down from the pitch indicated by the pitch data.

If the agent attribute is neutral or if the agent attribute has not yet been registered (No determination at step Sb18), the voice control section 109C skips the operation at step Sb17 or Sb19. After completion of the operation at step Sb17 or Sb19, or after the skipping of step Sb17 or Sb19, the process reverts to step Sa28 of FIG. 34. The rule to be applied is determined by the default rule being modified as appropriate. Note that the modification of the default rule, i.e. the determination of the rule, may be performed on the basis of at least one of the agent attribute and the remark utterer's attribute.

Referring back to FIG. 34, the voice control section 109C determines at step Sa28 that the voice sequence supplied from the reply creation section 110 be changed by applying the rule determined at step Sa27 (or the default rule). More specifically, if the determined rule defines that the pitch of the word ending in the reply should be shifted to a pitch that is, for example, three degrees down from the pitch indicated by the pitch data, the voice control section 109C shifts all the pitches of voice sequence in such a manner that the pitch of the word ending in the reply defined in the voice sequence supplied from the reply creation section 110 assumes an interval relationship of three degrees down from the pitch indicated by the pitch data. At step Sa18, the voice control section 109C controls the voice synthesis by the voice synthesis section 112 in accordance with the determined content. Thus, the voice synthesis section 112 controls the pitches of the voice sequence in accordance with the rule determined by the voice control section 109C and thereby synthesizes and outputs a replying voice signal having the controlled pitches.

The following describe pitches of a remark, fundamental pitches of a voice sequence and pitches of a changed voice sequence in relation to some specific examples. A left area of FIG. 36(b) shows an example of a remark uttered by the user. In the illustrated example of FIG. 36, a result of linguistic analysis of the remark is "asu wa hare desuka?" (romanized Japanese meaning "Will it be fine tomorrow?") and where pitches are allocated to individual sounds of the remark by notes as shown in the left area. Although the remark has in reality a pitch waveform similar to that shown in FIG. 5(b), the pitches of the remark are depicted by notes for convenience of explanation. In this case, the reply creation section 110 outputs a voice sequence "hai" if weather information acquired in response to the remark indicates "hare" or outputs a voice sequence "iie" if the acquired weather information indicates other than "hare", in the same manner as set forth above.

FIG. 36(a) shows an example of fundamental pitches of the voice sequence "hai" (romanized Japanese), and a right area of FIG. 36(b) shows an example of a replying voice sequence controlled in pitch in accordance with the default rule. Namely, if the default rule is to be applied, the voice sequence output by the reply creation section 110 is changed by the voice control section 109C as follows. Namely, if, of the remark indicated in the left area of FIG. 36(b), the pitch of the segment "ka" at the word ending indicated by reference character A is indicated as "E" by the pitch data, the voice control section 109C changes the pitches of the entire voice sequence so that, of the reply "hai", the pitch of the segment "i" at the word ending indicated by reference character B becomes the pitch "A" that is five degrees down from the pitch "E" (see the right area of FIG. 36(b)).

Note that, in the instant embodiment, the default rule is applied in three cases: when a "No" determination has been made at each of steps Sb12, Sb14, Sb16 and Sb18; a "Yes" determination has been made at step Sb12 and a "Yes" determination has been made at step Sb16; and when a "No" determination has been made at step Sb12 and a "Yes" determination has been made at step Sb14, and a "Yes" determination has been made at step Sb18.

Where the remark has been uttered as shown in the left area of FIG. 36(b) and if the modified rule instructing a shift to a pitch that is for example six degrees down from the pitch indicated by the pitch data is to be applied, the voice sequence output by the reply creation section 110 is changed by the voice control section 109C as follows. Namely, the voice control section 109C changes the pitches of the entire voice sequence so that, of the reply "hai", the pitch of the segment "i" at the word ending indicated by reference character B is changed to the pitch "G" six degrees down from the pitch "E" (see a right area of FIG. 37).

Note that, in the instant embodiment, the rule instructing "six degrees down" is applied in two cases: when a "Yes" determination has been made at step Sb12, and a "No" determination has been made at steps Sb16 and Sb18; and when a "No" determination has been made at steps Sb12 and Sb14, a "No" determination has been made at steps Sb16, and a "Yes" determination has been made at step Sb18.

Where the remark has been uttered as shown in the left area of FIG. 36(b) and if the modified rule instructing a shift to a pitch that is for example eight degrees down from the pitch indicated by the pitch data is to be applied, the voice sequence output by the reply creation section 110 is changed by the voice control section 109C as follows. Namely, the voice control section 109C changes the pitches of the entire voice sequence so that, of the reply "hai", the pitch of the segment "i" at the word ending indicated by reference character B is changed to the pitch "E" eight degrees (one octave) down from the pitch "E" (see a right area of FIG. 38). Note that, in the instant embodiment, the rule instructing "eight degrees down" is applied only in one case, i.e. when a "Yes" determination has been made at step Sb12, a "No" determination has been made at step Sb16 and a "Yes" determination has been made at step Sb18.

Where the remark has been uttered as shown in the left area of FIG. 36(b) and if the modified rule instructing a shift to a pitch three degrees down from the pitch indicated by the pitch data is to be applied, the voice sequence output by the reply creation section 110 is changed by the voice control section 109C as follows. Namely, the voice control section 109C changes the pitches of the entire voice sequence so that, of the reply "hai", the pitch of the segment "i" at the word ending indicated by reference character B is changed to the pitch "C" three degrees down from the pitch "E" (see a right area of FIG. 39). Note that, in the instant embodiment, the rule instructing "three degrees down" is applied in two cases: when a "No" determination has been made at step Sb12, a "Yes" determination has been made at step Sb14 and a "No" determination has been made at steps Sb16 and Sb18 Sb; and when a "No" determination has been made at steps Sb12 and Sb14 and a "Yes" determination has been made at step Sb16.

Where the remark has been uttered as shown in the left area of FIG. 36(b) and if the modified rule instructing a shift to a pitch fours degrees up from the pitch indicated by the pitch data is to be applied, the voice sequence output by the reply creation section 110 is changed by the voice control section 109C as follows. Namely, the voice control section 109C changes the pitches of the entire voice sequence so that, of the reply "hai", the pitch of the segment "i" at the word ending indicated by reference character B is changed to the pitch "A" four degrees up from the pitch "E" (see a right area of FIG. 40). Note that, in the instant embodiment, the rule instructing "four degrees up" is applied in only one case. i.e. when a "No" determination has been made at step Sb12, a "Yes" determination has been made at step Sb14 and a "Yes" determination has been made at step Sb16.

The instant embodiment has been described above in relation to the case where the reply comprises a word "hai". However, for other replies comprising other words than "hai" as well, the pitches of the entire reply voice sequence are changed in accordance with the rule determined on the basis of at least one of the agent attribute and the remark utterer's attribute in a similar manner to the aforementioned.

In the case where the default rule defining that the pitch of the word ending of the reply should be five degrees down from the pitch of the word ending of the remark is applied, voices of the reply are synthesized in the instant embodiment in such a manner that the pitch of the word ending of the reply is lowered by one rank if the utterer's attribute is female but raised by one rank if the utterer's attribute is male. Further, in the case where the default rule defining that the pitch of the word ending of the reply should be five degrees down from the pitch of the word ending of the remark is applied, voices of the reply are synthesized in the instant embodiment so that the pitch of the word ending of the reply is raised by one rank if the agent attribute is female but lowered by one rank if the utterer's attribute is male. Because the pitches of the reply are changed in accordance with the utterer's attribute and the agent attribute as above, the instant embodiment can give the user a kind of freshness and joy.

<Modification Using Voice Waveform Data>

Like the above-described eighth embodiment and ninth embodiment, the tenth embodiment may be modified in a similar manner to the above-described second embodiment. Namely, the combination of the reply creation section 110 and the voice synthesis section 112 (i.e., the voice generation section using the voice synthesis technique) may be replaced with the combination of the replying voice output section 113 and the post-processing section 114 as shown in FIG. 8 or 16 or 19 (i.e., the voice generation section using waveform data), and voice waveform data for example in the WAV format may be output from the replying voice output section 113.

<Utterer's Attribute>

The tenth embodiment has been described above as using, as the utterer's attribute, user's personal information registered in the terminal apparatus functioning as the voice synthesis apparatus 10. In an alternative, however, an utterer's attribute may be detected in the voice synthesis apparatus 10. For example, volume analysis, frequency analysis, etc. may be performed on a user's remark, and then such an analyzed user's remark may be compared against patterns corresponding to combinations of prestored various sexes and ages so that an attribute of an one of the patterns that has a high degree of similarity is detected as the utterer's attribute. If no such utterer's attribute could not be detected, a "No" determination is made at steps Sb12 and Sb14 of FIG. 35.

<Agent Attribute>

Whereas the tenth embodiment has been described above in relation to the case where the agent attribute is sex, the agent attribute may comprise a combination of three or more attributes, such as sex, age, etc.

<Repetition of Back-channel Feedback, Output Timing of Back-channel Feedback, Etc.>

When a dialogue between persons is viewed from the perspective of the sex of an utterer, the following particular tendency might be seen depending on the utterer's attribute. Let it be assumed, for convenience of description, that females generally have a tendency of laying weight on atmosphere and harmony and a tendency of livening up the atmosphere are seen in the dialogue. More specifically, let it be assumed that tendencies of frequently using back-channel feedback, repeating back-channel feedback, shortening a time length from a remark to a reply, etc. are seen. Let it be further assumed that females must expect such tendencies also from the voice synthesis apparatus 10 that outputs a reply to the remark in synthesized voice. Thus, if the utterer's attribute is female, the voice control section 109C may inform the reply creation section 110 to that effect so that the reply creation section 110 increases a frequency at which replies are created as back-channel feedback to the remark or repetitively outputs a voice sequence of the same back-channel feedback. Further, the voice control section 109C may control the voice synthesis section 112 to relatively speed up a time from the end of the user's remark to a time point when output of a reply to the remark is started.

On the other hand, males may generally have a tendency of laying weight on content, logicality, individuality, etc. in a dialogue. More specifically, let it be assumed, for convenience of description, that males have tendencies of not giving back-channel feedback more than necessary, daring to give no reply (daring to be silent) depending on the situation, lengthening a time length from a remark to a reply, etc. Thus, if the utterer's attribute is male, the voice control section 109C may inform the reply creation section 110 to that effect so that the reply creation section 110 lowers the frequency at which replies are created as back-channel feedback to the remark and sometimes gives no reply with a predetermined probability. Further, the voice control section 109C may control the voice synthesis section 112 to relatively slow down a time from the end of the user's remark to a time point when output of a reply to the remark is started.

Further, as a condition to be applied when the pitch of the word ending of the reply is to be lowered from the pitch predetermined in accordance with the default rule, a condition that the pitch of the word ending of the remark should be equal to or greater than the first threshold pitch (frequency) may be added at step Sb13 of FIG. 35 (see mark in the block of step Sb13) to the condition that the utterer's attribute is female. This is for the purpose of avoiding the reply, comprising synthesized voice, becoming unnaturally high in a case where the remark made by the female is high in pitch. Similarly, as a condition to be applied when the pitch of the word ending of the reply is to be raised from the pitch predetermined in accordance with the default rule, a condition that the pitch of the word ending of the remark should be equal to or smaller than the second threshold pitch may be added at step Sb15 of FIG. 35 (see mark in the block of step Sb15) to the condition that the utterer's attribute is male. This is for the purpose of avoiding the reply, comprising synthesized voice, becoming unnaturally low in a case where the remark made by the male is low in pitch.

Note that the various application examples and/or the modifications related to the first and second embodiments are also applicable to the tenth embodiment of the present invention.

In short, the above-described tenth embodiment is characterized in that the voice generation section (i.e., the voice synthesis section 112 or the combination of the replying voice output section 113 and the post-processing section 114), is constructed to associate the pitch of the second segment with the analyzed pitch of the first segment in accordance with a given rule and generate voice of the reply with a characteristic based on a given agent attribute. The tenth embodiment further includes the control section (voice control section 109C) that determines the above-mentioned rule on the basis of at least one of the agent attribute and the attribute of the utterer of the remark.

<Eleventh Embodiment>

The following describe, with reference to FIG. 41, an eleventh embodiment of the voice synthesis apparatus of the present invention, which is characterized in that the rule for associating the pitch of the second segment of the replying voice with the analyzed pitch of the first segment is updated, after audible generation or sounding of the replying voice, in response to voice of a further remark being received via the voice input section. Namely, the eleventh embodiment is characterized by changing as appropriate the rule to be applied to generation of next replying voice, in view of a further remark uttered by the user in response to the reply uttered by the machine. FIG. 41 is a functional block diagram of the eleventh embodiment of the voice synthesis apparatus 10 of the present invention. Blocks in FIG. 41 that implement substantially the same functions as those in FIG. 1 are depicted by the same reference characters as in FIG. 1 and will not be described to avoid unnecessary duplication. The embodiment of FIG. 41 includes a voice control section 109D and a managing database 127 in addition to the construction shown in FIG. 1.

Similarly to the counterpart in each of the above-described embodiments, the voice synthesis section 112 in the eleventh embodiment synthesizes voice of the reply by controlling the pitches of the replying voice sequence, created by the reply creation section 110, in accordance with a given rule (i.e., such that the pitch of the second segment of the reply assumes a predetermined interval relationship with the pitch of the first segment of the question or remark). The given rule employed in the eleventh embodiment will hereinafter be referred to as "pitch rule". The voice control section 109D controls the voice synthesis by the voice synthesis section 112 by updating the rule (pitch rule), applied to the voice synthesis section 112, after audible generation or sounding of the replying voice, in response to voice of a further remark being received via the voice input section 102.

What kind of relationship the pitch of the second segment of the reply should assume with respect to the pitch of the first segment of the question or remark in order to make the user feel comfortable and make the dialogue lively differs from one user to another, as noted earlier. Thus, in the eleventh embodiment, an evaluation period is provided as an operation period, and voice of replies to a same remark is synthesized using a plurality of pitch rules. Then, upon end of the evaluation period, one of the pitch rules which has achieved the liveliest dialogue (i.e., with which the dialog has been made liveliest) is set as the pitch rule to be applied, so that the thus-set pitch rule can be reflected in subsequent voice synthesis.

The managing database 127, which is managed by the voice control section 109D, stores, among other things, a table (index table) where the pitch rules and indices indicative of degrees of liveliness of dialogue are associated with each other in a one-to-one relationship. FIG. 42 is a diagram showing an example of stored content in the index table. As shown in FIG. 42, the number of remarks and the number of applications are associated with each other for each of the pitch rules. Here, the pitch rules each define what kind of relationship the pitch of the word ending of the reply should have with respect to the pitch of the word ending of the reply, such as four degrees up, three degrees down, five degrees down, six degrees down and eight degrees down, as shown in the figure.

Further, the "number of remarks" means a count of the number of remarks uttered by the user in a case where the voice synthesis apparatus 10 synthesized voice of a reply to a remark uttered by the user and then the user has uttered a further remark within a predetermined time period. Stated differently, during the evaluation period, even when voice of a reply has been synthesized by the voice synthesis apparatus 10, it is conceivable that no further remark is uttered by the user or a further remark, if any, is uttered after passage of the predetermined time period; such further remark is not counted as the number of remarks. The "number of applications" means the number of times the corresponding pitch rule has been applied during the evaluation period. Thus, by comparing values calculated by dividing the number of remarks by the corresponding number of applications, the user can know which one of the pitch rules has achieved the greatest number of remarks to the replies, i.e. which one of the pitch rules has achieved the liveliest dialogue. Note that, even when voice of a reply has been synthesized through application of any one of the pitch rules, the user may sometimes utter no remark to that reply within the predetermined time period. This is because the number of applications is greater than the number of remarks as in the illustrated example of FIG. 42.

FIG. 43 is a diagram showing an example of the operation period provided by the application program executed by the CPU. In the instant embodiment, as shown in FIG. 43, rule fixed periods and the above-mentioned evaluation periods are repeated alternately in the operation period. Here, the rule fixed period is a time period in which voice of a reply is synthesized in accordance with one pitch rule set upon end of the evaluation period. As an example, such a pitch rule set in one of the rule fixed periods is "five degrees down" as indicated by a white triangle in the figure.

The evaluation period is, on the other hand, is a time period for evaluating any one of the pitch rules which has achieved the liveliest dialogue on the basis of synthesizing voice of replies by applying the pitch rule to a remark uttered by the user. Whereas the instant embodiment is constructed so that the rule fixed periods and the above-mentioned evaluation periods are repeated alternately in the operation period as shown on FIG. 43, it may be constructed so as to shift to the evaluation period, for example, only in response to a user's instruction.

Figure 44:
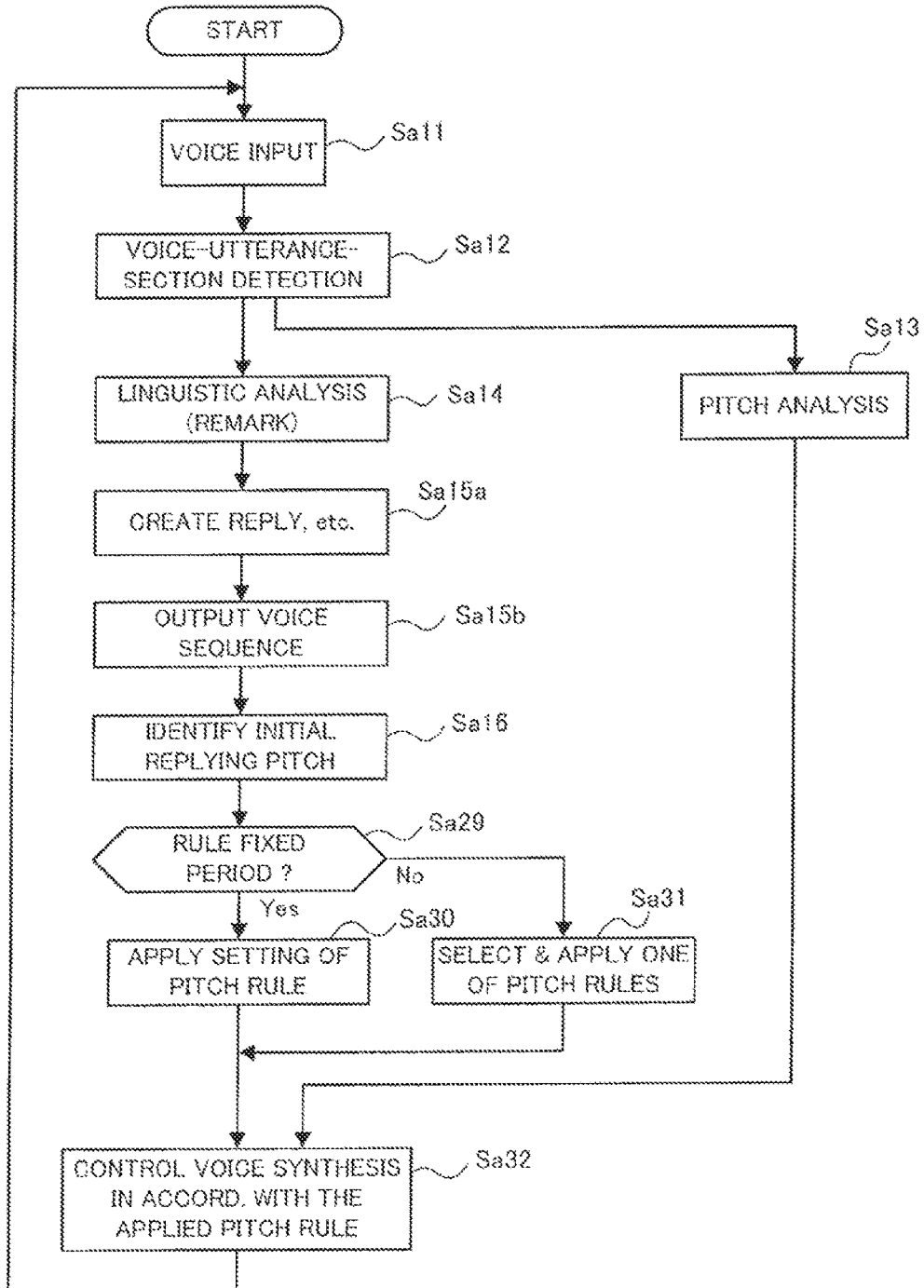
FIG. 44 is a flow chart of voice synthesis processing performed in the eleventh embodiment of the voice synthesis apparatus.

FIG. 44 is a flow chart of the voice synthesis processing performed in the eleventh embodiment of the voice synthesis apparatus 10. This voice synthesis processing is performed irrespective of the rule fixed period and the evaluation period. FIG. 44 is shown as a modification of FIG. 4, and steps that perform substantially the same operations as those in FIG. 4 are depicted by the same reference numerals as in FIG. 4 and will not be described to avoid unnecessary duplication.

Operations similar to step Sa15 of FIG. 4 or steps Sa15a and Sa15b of FIG. 21 are performed at steps Sa15a and Sa15b of FIG. 44. At step Sa16 of FIG. 44, an operation is performed for identifying a pitch (initial pitch) of the second segment (word ending) in the voice sequence supplied from the reply creation section 110, in the same manner as step Sa16 of FIG. 4. Further, at step Sa13a of FIG. 44, the voice signal, in the detected utterance section, of the remark is analyzed to identify a pitch of the first segment (word ending) in the remark, in the same manner as at step Sa13 of FIG. 4. Then, data indicative of the identified pitch is supplied to the voice control section 109D.

At step Sa29, the voice control section 109D determines whether the current time point is in one of the rule-fixed periods. If the current time point is in one of the rule-fixed periods (Yes determination at step Sa29), the voice control section 109D applies the pitch rule set in the evaluation period preceding the rule-fixed period, at step Sa30. If the current time point is not in one of the rule-fixed periods but in one of the evaluation periods (NO determination at step Sa29), the voice control section 109D selects, for example, any one of a total of three pitch rules that are a pitch rule set in the evaluation period preceding the current evaluation period and two pitch rules immediately upper and down from (i.e., sandwiching in an up-down direction) the pitch rule in the index table and then applies the thus-selected pitch rule, at step Sa31. More specifically, if the set pitch rule is "five degrees down" depicted by the white triangular mark in FIG. 42, the voice control section 109D selects, randomly or in a predetermined order, any one of the three pitch rules: the pitch rule of "five degrees down" and the pitch rules of "three degrees down" and "six degrees down" sandwiching "five degrees down" in a vertical or up-down direction in the index table.

At next step Sa32, the voice control section 109D instructs the voice synthesis section 112 to effect a pitch change on the reply such that the pitch of the second segment (word ending) of the reply assumes a predetermined interval relationship, defined by the applied pitch rule, with the pitch of the first segment (word ending) of the remark identified at step Sa13. In accordance with such an instruction, the voice synthesis section 112 changes the pitches of the entire voice sequence in such a manner that the pitch of the word ending of the reply is shifted to the pitch defined by the applied pitch rule. In the instant embodiment, the processing reverts to step Sa11 after one reply has been output through the voice synthesis (i.e., in synthesized voice), in order to allow the user to make a further remark following the reply (i.e., in order to receive a further remark). If the user does not want to continue the dialogue with the machine, the instant voice synthesis processing can be brought to an end in response to a user's explicit operation (e.g., user's operation of a software button).

Figures 45, 46:
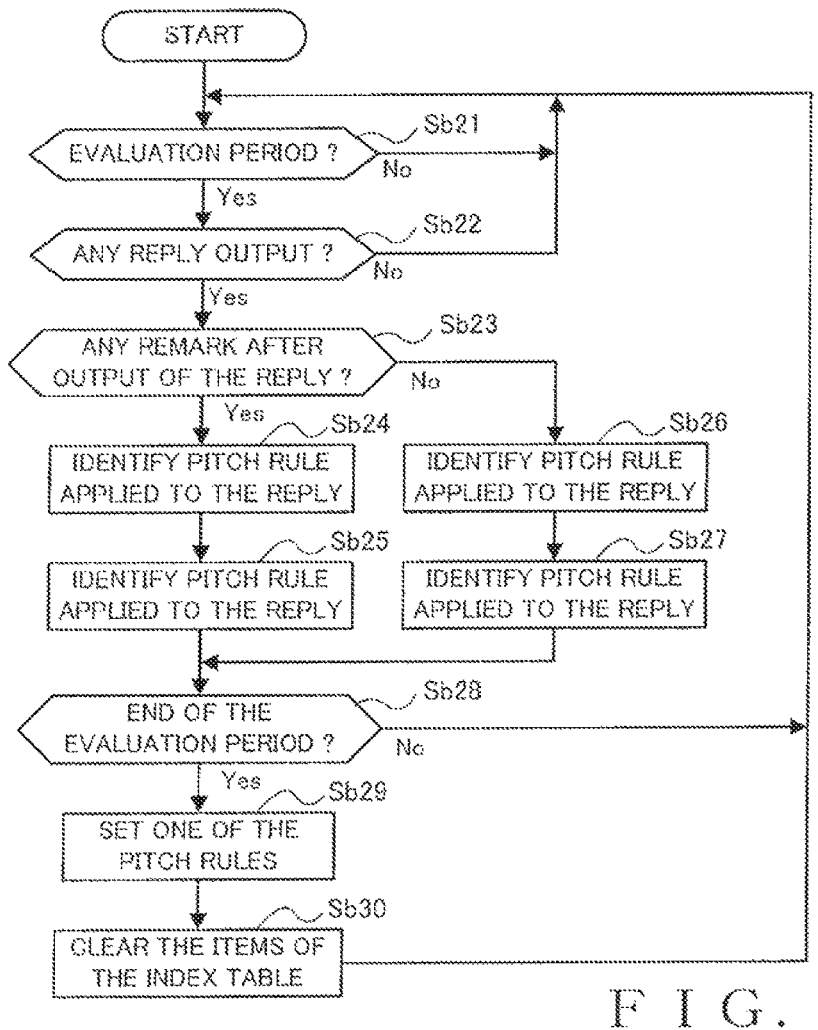
FIG. 45 is a flow chart showing a table update process performed in the eleventh embodiment of the voice synthesis apparatus.
FIG. 46 is a diagram showing an example of an index table in a twelfth embodiment of the voice synthesis apparatus.

FIG. 45 is a flow chart showing a table update process. This table update process, which is performed independently of the voice synthesis processing of FIG. 44, is designed primarily to update the index table (see FIG. 42) in the evaluation period to thereby set a pitch rule to be applied in the rule-fixed period.

At step Sb21, the voice control section 109D determines whether the current time point (current time) is in one of the evaluation periods. If the current time point is not in one of the evaluation periods (No determination at step Sb21), the voice control section 109D revers the table update process to step Sb21. If, on the other hand, the current time point is in one of the evaluation periods (Yes determination at step Sb21), the voice control section 109D further determines, at step Sb22, whether any reply created through voice synthesis by the voice synthesis section 112 has been output or not. If no such reply has been output (No determination at step Sb22), the voice control section 109D revers the table update process to step Sb21. Thus, no subsequent operation in the table update process is performed unless the current time point is in one of the evaluation periods and any reply has been output. If, on the other hand, a reply has been output (Yes determination at step Sb22), the voice control section 109D further determines, at step Sb23, whether or not there has been any remark of the user within a predetermined time period (e.g., 5 sec) after the output of the reply. Whether or not there has been any remark of the user within the predetermined time period can be determined by the voice control section 109D checking whether or not pitch data has been supplied within the predetermined time period after the output of the reply.

If there has been any remark of the user within the predetermined time period after the output of the reply ("Yes" determination at step Sb23), the voice control section 109D at step Sb24 identifies the pitch rule having been applied to the voice synthesis of the reply, with a view to updating the index table. Identification of such a pitch rule is permitted by, upon selection of a pitch rule, storing the selected pitch rule and selected time information into the managing database 127 in association with each other upon selection of the pitch rule at step Sa31 above and then searching for the pitch rule associated with the newest or latest time information. At step Sb25, the voice control section 109D increments by "1" the items (the number of remarks and the number of applications) of the pitch rule, applied to the voice synthesis of the reply, in the index table.

If, on the other hand, there has been no remark of the user within the predetermined time period after the output of the reply or a remark has been made after the passage of the predetermined time period ("No" determination at step Sb23), the voice control section 109D identifies the pitch rule having been applied to the voice synthesis of the reply at step Sb26, in the same manner as at step Sb24. In this case, however, the voice control section 109D at step Sb27 increments by "1" only the number of applications of the pitch rule, applied to the voice synthesis of the reply, in the index table, because it is regarded that there has been no user's remark.

Next, at step Sb28, the voice control section 109D determines whether the current time point is end timing of the evaluation period. If the current time point is not end timing of the evaluation period ("No" determination at step Sb28), the voice control section 109D reverts the process to step Sb21 above in order to prepare for a next time when the user will make a remark after the output of the reply. If, on the other hand, the current time point is end timing of the evaluation period ("Yes" determination at step Sb28), the voice control section 109D compares, in the evaluation period in question, the values calculated for the three pitch rules by dividing the number of remarks by the corresponding number of applications, so that the voice control section 109D sets, as the pitch rule to be applied in the rule-fixed period following the evaluation period, one of the pitch rules which has achieved the liveliest dialogue (step Sb29). For example, if, in the operation of step Sb28, the three pitch rules in the evaluation period are three degrees down, five degrees down, six degrees down, respectively, and the number of remarks and the number of applications are of values as shown in FIG. 42, the pitch rule to be applied in the rule-fixed period is changed from the previously-set "five degrees down" pitch rule to the "three degrees down" pitch rule depicted by a black triangular mark. After that, the voice control section 109D clears the number of remarks and the number of applications of each of the three pitch rules evaluated in the evaluation period (step Sb30) and then reverts the process to step Sb21 in order to perform similar operations in the next evaluation period.

As set forth above, the instant embodiment is constructed to: create a reply by applying any one of the different pitch rules in the evaluation period, update the number of remarks and the number of applications of the applied pitch rule if there has been any user's remark to the reply within the predetermined time period, and update only the number of applications of the applied pitch rule if the user's remark to the reply is not within the predetermined time period. Then, at the end timing of the evaluation period, the pitch rule which has achieved the liveliest dialogue is set and applied in the next rule-fixed period.

Specific examples of the pitch of the remark, fundamental pitches of the voice sequence and changed pitches of the voice sequence in the eleventh embodiment may be similar to those shown in FIGS. 36 to 40. Namely, if "five degrees down" is applied as the rule for determining pitches of the reply "hai" to the remark "asu wa hare desuka?" as shown in the left area of FIG. 36(b), then a pitch pattern as shown in the right area of FIG. 36(b) is provided. If "six degrees down" is applied as the rule, then a pitch pattern as shown in the right area of FIG. 37 is provided. Further, if "eight degrees down" is applied as the rule, then a pitch pattern as shown in the right area of FIG. 38 is provided. Further, if "three degrees down" is applied as the rule, then a pitch pattern as shown in the right area of FIG. 39 is provided. Furthermore, if "four degrees up" is applied as the rule, then a pitch pattern as shown in the right area of FIG. 40 is provided.

In the eleventh embodiment, the pitch rule to be applied in the rule-fixed period is the pitch rule which has achieved the liveliest dialogue in the evaluation period preceding the rule-fixed period. Thus, in the rule-fixed period too, a dialogue can easily become lively; simply put, it becomes easy for the user to make a remark. Further, because such a pitch rule is set in each of the evaluation periods, there can be achieved conditions that are comfortable to the user, can relax the user and can make a dialogue lively (i.e., can direct the dialogue in a livened-up direction).

<Twelfth Embodiment>

The eleventh embodiment has been described as constructed to apply a plurality of pitch rules in the evaluation period, set any one of the pitch rules which has achieved the liveliest dialogue and use the thus-set pitch rule in the rule-fixed period. However, examples of factors that can make a dialogue lively include, in addition to the pitch, a "pause", i.e. a time interval, from a remark to a reply. Therefore, the following describe a twelfth embodiment of the present invention not only performs replying voice pitch control on the basis of setting of a pitch rule as in the eleventh embodiment, but also outputs replies with different pauses in the evaluation period, sets one of the pauses that has achieved the liveliest dialogue and applies the thus-set pause to control a pause for a reply.

Functional blocks built in the twelfth embodiment through the execution of the above-mentioned application program are substantially similar to those in the eleventh embodiment of FIG. 41. However, the twelfth embodiment uses, as index tables, a table for evaluating reply output rules as shown in FIG. 46, in addition to a table for evaluating pitch rules as shown in FIG. 42.

In the index table for evaluating the reply output rules, as shown in FIG. 46, the number of remarks and the number of applications are associated with each other for each of the output rules. Here, the output rules each define a pause or time interval, for example, from the end (word ending) of a remark to the start (word beginning) of a reply, and 0.5 sec, 1.0 sec, 1.5 sec. 2.0 sec and 2.5 sec are designated in a stepwise manner by these output rules. Note that the numbers of remarks and the numbers of applications associated with the individual output rules in the instant are similar to those in the eleventh embodiment.

Processing in the twelfth embodiment may be similar to the processing shown in FIGS. 44 and 45, except that "pitch rule" in FIGS. 44 and 45 should be read as "pitch rule and output rule" and the like. More specifically, if the current time point is in the rule-fixed period at step Sa30 in FIG. 44, the voice control section 109D decides to synthesize voice by applying a pitch rule and an output rule having been set in the evaluation period preceding the rule-fixed period. If, on the other hand, the current time point is in the evaluation period at step Sa31, the voice control section 109D selects any one of three pitch rules, selects any one of a total of three output rules that are: the output rule having been set in the evaluation period preceding the rule-fixed period; and two output rules immediately upper and lower than (i.e., sandwiching in the vertical or up-down direction) the set output pitch in the index table (see FIG. 46), and applies the thus-selected pitch rule and output rule. At step Sa32, the voice control section 109D having been supplied with pitch data instructs the voice synthesis section 112 to synthesize voice of a reply to a remark such that the pitch of the word ending of the reply assumes a relationship with the pitch indicated by the supplied pitch data as determined by the applied pitch rule, and such that a time interval from the word ending of the remark to a time point when output of the reply is started coincides with the time interval determined by the applied output rule.

Further, in order to update the two index tables, the voice control section 109D identifies, at steps Sb24 and Sb26 of FIG. 45, the pitch rule and the output rule applied to the voice synthesis of the reply and increments, at step Sb25, each of the two items of the applied pitch rule and the two items of the applied output rule by "1". At step Sb27, the voice control section 109D increments only the number of applications of the applied pitch rule by "1" and increments only the number of applications of the applied output rule by "1". If the current time point is the end timing of the evaluation period, the voice control section 109D sets, at step Sb29, one of the pitch rules and one of the output rules which have achieved the liveliest dialogue in the evaluation period. After that, at step Sb30, the voice control section 109D clears the items of pitch rules and the output rules evaluated in the evaluation period.

With the twelfth embodiment, one of the pitch rules and one of the output rules which have achieved the liveliest dialogue in the evaluation period are applied in the rule-fixed period following the evaluation period, a reply of a good impression comfortable to the user can be returned with such a pause that facilitates the user to make a remark. For example, in a case where the voice synthesis apparatus 10 outputs a reply "hare desu" (romanized Japanese meaning "It'll be fine.") in response to a user's remark "asu no tenki wa?" (romanized Japanese meaning "How will the weather be tomorrow?" as shown in FIG. 17(*a*), a time interval Ta from the word ending "wa" (romanized Japanese) of the user's remark to the word beginning "ha" (romanized Japanese) is set at such a time interval that facilitates the user W to liven up the dialogue. In this case, the pitch of the word ending "su" (romanized Japanese) of the reply is set in the relationship designated by the pitch rule, which can facilitate livening-up of the dialogue, with respect to the word ending "wa" (romanized Japanese) of the user's remark, although not particularly shown.

In the twelfth embodiment, as set forth above, voice of the reply is synthesized in such a manner that the pitch of the word ending of the reply assumes a consonant interval relationship with the pitch of the word ending of the remark as in the eleventh embodiment. Also, the twelfth embodiment synthesizes the voice of the reply with a pause that allows the user to make a remark more easily than the eleventh embodiment, and thus, the twelfth embodiment can make the dialogue with the user livelier than the eleventh embodiment.

Whereas the twelfth embodiment has been described above as constructed to control a "pause" from a remark to a reply in addition to performing the pitch control of the reply in the same manner as in the eleventh embodiment, it may be constructed to control the pause alone without performing the pitch control of the reply. Content of such a modification where the pause control is performed without the pitch control being performed is generally similar to the process of FIG. 45, except that "pitch rule" in FIG. 45 should be read as "output rule", and the content of this modification may be sufficiently understood by persons skilled in the art from the above description of the twelfth embodiment.

<Thirteenth Embodiment>

The following describe a thirteenth embodiment of the present invention. First, a premise of the thirteenth embodiment will be briefed. A pitch relationship in which the pitch of the word ending of a reply to a remark is felt comfortable and the like with respect to the pitch of the word ending of the remark differs from one person to another. Particularly, because the female and the male greatly differ from each other in pitch of their remarks (i.e., the pitch of the female is generally lower than the pitch of the male), remarks of the female and the male may give greatly different impressions. Further, in recent years, a reply can sometimes be output in voice of a virtual character of a predetermined sex and age through voice synthesis. It is considered that, if voice of a character replying to a remark is changed and particularly if the sex of the character is changed, the user will have an impression different from the impression that was being received before the change. Therefore, the third embodiment of the present invention assumes, as various scenes, combinations of the sexes (female and male) of the users and the sexes of voice to be synthesized and provides index tables for the individual scenes so that any one of the index tables corresponding to a user's remark can be used.

FIG. 47 shows examples of the index tables which are provided in the thirteenth embodiment in corresponding relation to the combinations of the sexes of the users and the sexes of voice to be synthesized. More specifically, a total of four index tables are prepared in the managing database 127 in corresponding relation to the two, i.e. female and male, sexes of the users and the two, i.e. female and male, sexes of the replying voice synthesized by the apparatus. The voice control section 109D selects any one of the four index tables in the following manner.

Namely, the voice control section 109D identifies the sex of the user, for example, from personal information of the user having logged in to the terminal apparatus functioning as the voice synthesis apparatus 10. Alternatively, the voice control section 109D may perform volume analysis and frequency analysis on the user's remark, compare the analyzed volume and frequency of the user's remark against prestored patterns of the female and male and identify, as the sex of the user, the sex of one of the prestored patterns that has a high similarity to the volume and frequency of the user's remark. Further, the voice control section 109D identifies the sex of the reply from set information (sex information of a dialogue agent). Once the voice control section 109D identifies the sex of the user and the sex of the voice of the reply in the aforementioned manner, it selects one of the index tables that corresponds to the combination of the identified sexes. After the selection of the index table, rule-fixed periods and evaluation periods are repeated alternately in the instant embodiment in the same manner as in the eleventh embodiment.

According to the thirteenth embodiment, one of the index tables corresponding a scene of the user's remark is used, but also the pitch of the word ending of the reply is controlled, in the rule-fixed period, to assume a predetermined relationship, designated by a pitch rule set in the one index table, with respect to the pitch of the pitch of the word ending of the remark. Further, one of the pitch rules of the index table which has achieved the liveliest dialogue is set in the evaluation period. Thus, the thirteenth embodiment can easily make dialogues lively and comfortable to the users in various scenes.

The eleventh embodiment, where the rule-fixed periods and the evaluation periods are repeated, can also converge to conditions that can readily make dialogues comfortable to users and lively irrespective of changes in scene. However, it is expected that a time required to achieve such convergence (i.e., the number of repetition of the rule-fixed periods and the evaluation periods required to achieve such convergence) would undesirably increase. By contrast, the thirteenth embodiment can significantly reduce the time required to converge to conditions that can readily make dialogues comfortable, if appropriate pitch rules are preset as an initial state per scene.

Whereas the third embodiment has been described above in relation to the case where the pitch rules as used in the eleventh embodiment are used as the index tables, the output rules of the twelfth embodiment too may be used in the thirteenth embodiment in combination with the pitch rules in such a manner that switching is made between the output rules in response to a change in scene. Further, the scenes may comprise combinations of the sexes and ages rather than the sexes alone. Furthermore, speeds of remarks, speeds of replies and applications of the voice synthesis apparatus 10, such as applications to voice guidance in various facilities like museums, art museums and zoos and applications to voice dialogues, may be assumed and prepared as the scenes, without the scenes being limited to the sexes and ages of the users and virtual characters replying to the users.

<Modification Using Voice Waveform Data>

Like the above-described other embodiments, the eleventh to thirteenth embodiments may be modified in a similar manner to the above-described second embodiment Namely, the combination of the reply creation section 110 of FIG. 41 and the voice synthesis section 112 (i.e., the voice generation section using the voice synthesis technique) may be replaced with the combination of the replying voice output section 113 and the post-processing section 114 as shown in FIG. 8 or 16 or 19 (i.e., the voice generation section using waveform data), and voice waveform data for example in the WAV format may be output from the replying voice output section 113.

Note that the various application examples and/or the modifications related to the first and second embodiments are also applicable to the eleventh to thirteenth embodiments of the present invention.

In short, the above-described eleventh to thirteenth embodiments are characterized in that the voice generation section (i.e., the voice synthesis section 112 or the combination of the replying voice output section 113 and the post-processing section 114) is constructed to associate the pitch of the second segment with the analyzed pitch of the first segment in accordance with a given rule, and in that the embodiments further includes the control section (voice control section 109D) that updates the rule on the basis of reception, via the voice input section (102), of voice of a further remark after sounding or audible generation of the reply.

<Fourteenth Embodiments>

Figure 48:
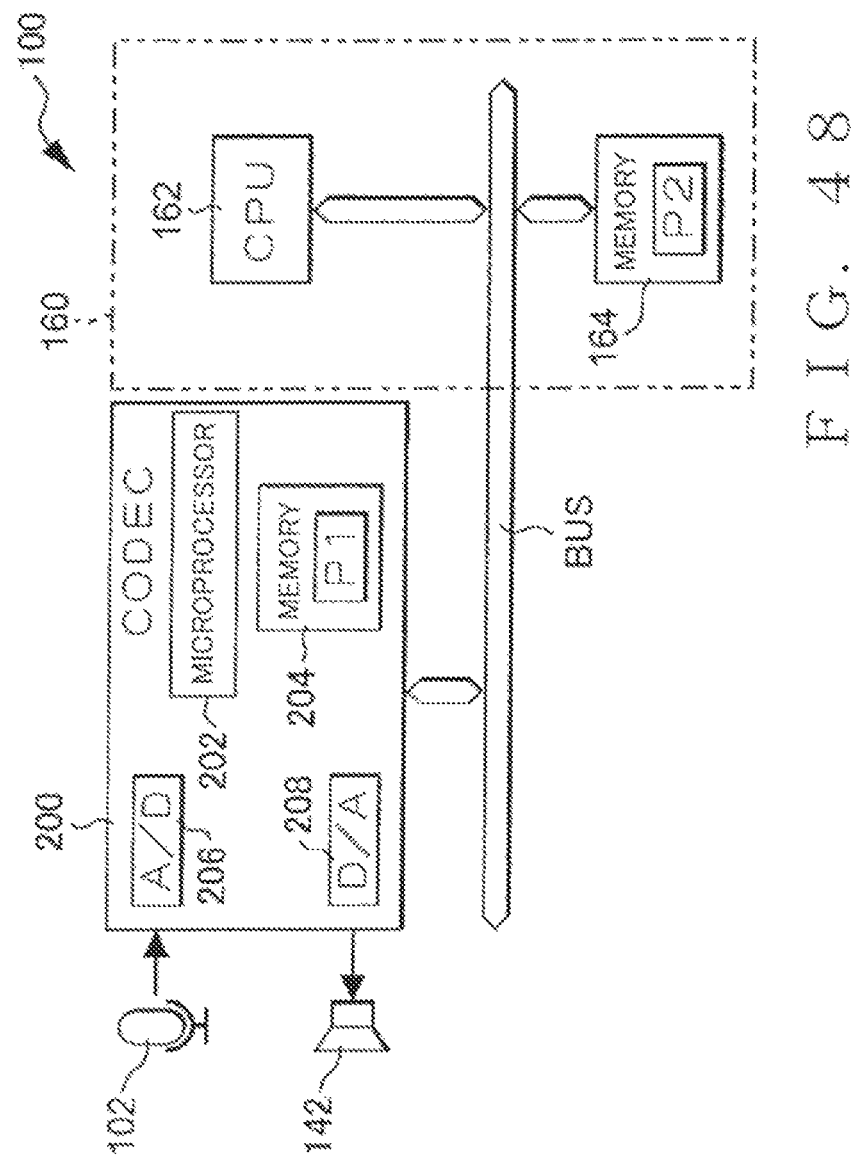
FIG. 48 is a diagram showing a hardware setup of a voice synthesis apparatus constructed in accordance with a fourteenth embodiment of the present invention.
Figure 49:
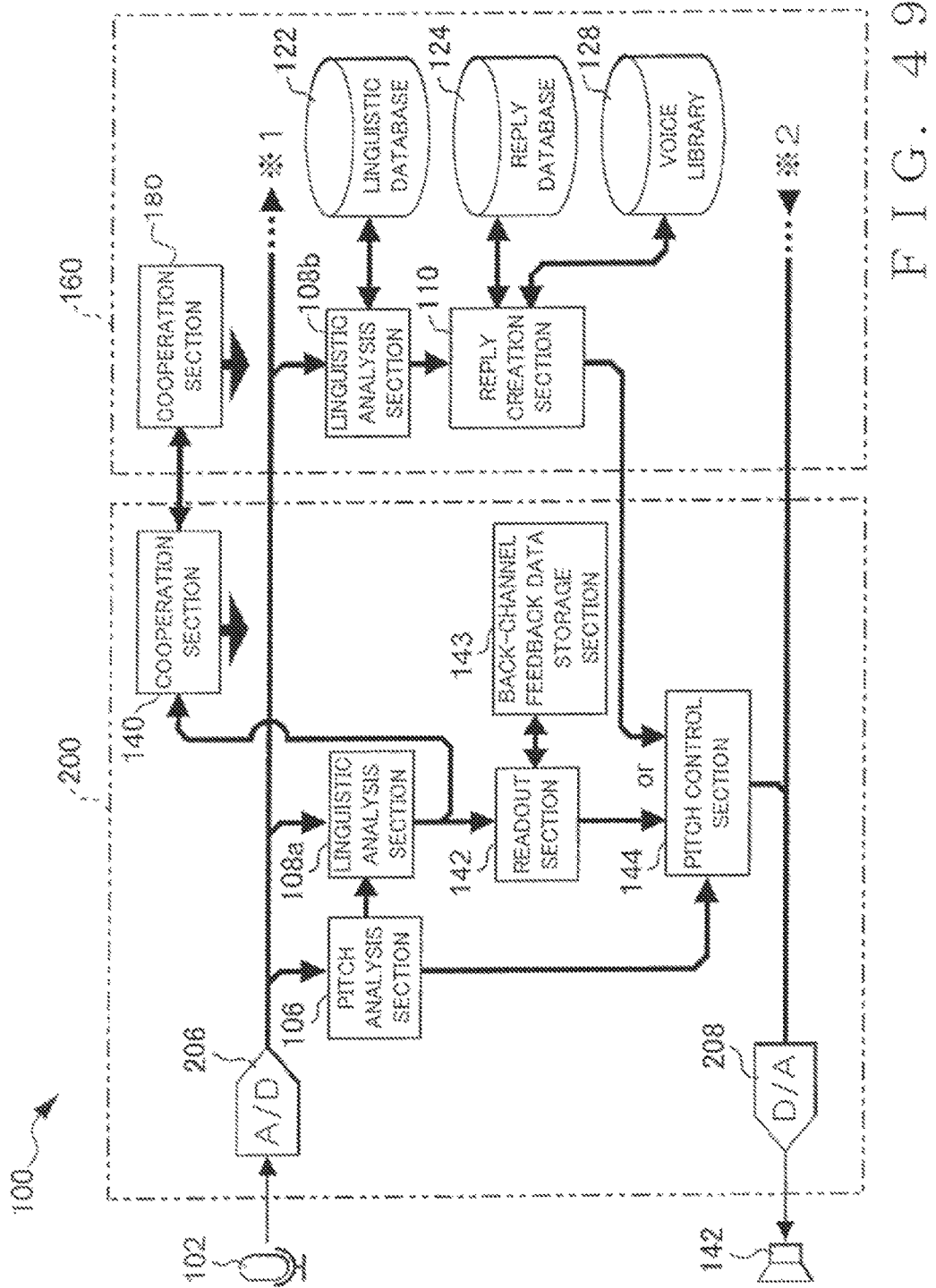
FIG. 49 is a functional block diagram showing functional arrangements of the voice synthesis apparatus in accordance with the fourteenth embodiment.

The following describe, with reference to FIGS. 48 and 49, a coding/decoding device and a voice synthesis system constructed in accordance with a fourteenth embodiment of the present invention. The fourteenth embodiment is characterized in that voice of back-channel feedback (simple reply) responsive to an input remark is generated efficiently through prompt processing by the coding/decoding device 200 while voice of a reply having a relatively complicated linguistic meaning responsive to an input remark is generated efficiently through large-capacity centralized processing by a computer 160. In this way, the fourteenth embodiment provides the voice synthesis system (voice synthesis apparatus 100) capable of realizing a flexible human-machine dialogue function.

FIG. 48 is a diagram showing a hardware setup of the voice synthesis apparatus 100 (voice synthesis system) including the coding/decoding device constructed in accordance with the fourteenth embodiment of the present invention. This voice synthesis apparatus 100 (voice synthesis system), which is for example in the form of a terminal apparatus like a portable phone, includes: the voice input section 102; the speaker 142; the coding/decoding device (hereinafter referred to as "CODEC" (coder decoder)) 200; and the host computer 160 that is a higher-rank computer as viewed from the CODEC 200.

The CODEC 200, which is in the form of a one-chip or multi-chip module, includes a microprocessor 202, a memory 204, an A/D converter 206, and a D/A converter 208. Further, the CODEC 200 is constructed to process a voice signal by the microprocessor 202 executing a program P1 (firmware) stored in the memory 204.

The host computer 160 includes a CPU (Central Processing Unit) 162 and a memory 164. The CPU 162 is connected to the CODEC 200 and the memory 164 via a bus BUS. A program P2 for voice processing in the instant embodiment as well as an operating system is stored in the memory 164. The voice processing in the instant embodiment includes a dialogue process for, when the user has made a remark, outputting a reply or back-channel feedback to the remark by means of synthesized voice, a voice recognition process for converting a user's remark into a character train, and a reproduction (playback) process for reproducing and outputting music, voice, etc. processed by the host 160.

Although not particularly shown, the voice synthesis apparatus 100 also includes a display section, an operation input section, etc., so that the user can check states of the voice synthesis apparatus 100 and input various operations to the apparatus 100. Further, the voice synthesis apparatus 100 may be in the form of a notebook or tablet personal computer rather than a terminal apparatus like a portable phone.

FIG. 49 is a functional block diagram showing functional arrangements of the voice synthesis apparatus 100 of the present invention. The functional blocks are built by the microprocessor 202 executing the program P1 in the CODEC 200 and by the CPU 162 executing the program P2 in the host 160. As shown in the figure, the CODEC 200 has built therein a pitch analysis section 106, a linguistic analysis section 108a, a cooperation section 140, a readout section 142, a back-channel feedback data storage section 143 and a pitch control section 144, and the host 160 has built therein a linguistic analysis section 108b, a cooperation section 180, a reply creation section 110, a linguistic database 122, a reply database 124 and a voice library 128. Blocks in FIG. 49 that implement substantially the same functions as those in FIG. 1 are depicted by the same reference characters as in FIG. 1 and will not be described to avoid unnecessary duplication.

The pitch analysis section 106 and the linguistic analysis section 108a in the CODEC 200 function in substantially the same way as the pitch analysis section 106 and the linguistic analysis section 108 shown in FIG. 1. Note, however, the linguistic analysis section 108a determines whether a remark received via the voice input section 102 is of content to which back-channel feedback should be returned or of content to which another reply than back-channel feedback should be returned. Among possible examples of a specific way for the linguistic analysis section 108a to make such a determination is one where volume and pitch variation patterns toward the word endings of, for example, typical questions (i.e., remarks to which replies other than back-channel feedback are to be returned) are prestored. In this case, if pitch variation and volume variation represented respectively by a volume waveform and a pitch variation output from the pitch analysis section 106 match (or have a high similarity to) any of the prestored volume and pitch variation patterns, the remark is determined to be a question. If, on the other hand, the pitch variation and volume variation represented respectively by the volume waveform and the pitch variation output from the pitch analysis section 106 do not match (or have a low similarity to) any of the prestored volume and pitch variation patterns, the remark is determined to be one to which back-channel should be returned. Note that, if the linguistic analysis section 108a is unable to determine whether back-channel feedback should be returned or another reply back-channel feedback should be returned, or if the result of the determination by the linguistic analysis section 108a has a low reliability, a particular rule may be employed which causes the determination to be daringly entrusted to the host 160 (linguistic analysis section 108b) provided at the succeeding stage. Further, because back-channel feedback is intended to merely smooth a conversation (or improve the rhythm of the conversation) and the meaning of the back-channel feedback may be made light of, it practically doesn't matter so much even when back-channel feedback has been returned although the remark is a question.

If it has been determined that the remark received via the voice input section 102 is of content to which back-channel feedback should be returned, the cooperation section 140 controls the pitch control section 144 to select back-channel data as an object of processing but also informs the host 160 that the host 160 need not perform processing on the remark. In the case where it has been determined that the remark received via the voice input section 102 is of content to which another reply than back-channel feedback should be returned (under application of the particular rule, including a case where the content of the remark is unrecognizable and a case where the result of the determination has a low reliability), the cooperation section 140 instructs the pitch control section 144 to select, as an object of pitch control processing, reply data (i.e., response data other than back-channel feedback data) created by the reply creation section 110 of the host 160, but also informs the host 160 that the host 160 should create (or acquire) a reply (response) to the remark.

The back-channel feedback data storage section 143 stores therein a plurality of sets of back-channel feedback data. Here, the plurality of sets of back-channel feedback data are a plurality of sets of voice waveform data containing brief replies like "êto" ("Let me see."), "naru hodo" ("I see."), "sou desune" ("Well, . . . ")", "a hai" ("Oh, yes."), "nn" ("Let's see."). The sets of voice waveform data are, for example, in the WAV format.

If it has been determined by the voice input section 102 that the remark received via the voice input section 102 is of content to which back-channel feedback should be returned, the readout section 142 reads out any one of the sets of back-channel feedback data in accordance with a predetermined order or randomly and supplies the read-out back-channel feedback data to the pitch control section 144. With such a construction where the back-channel feedback data is output independently of the specific content of the remark, back-channel feedback irrelevant to the remark may sometimes be output, which, however, does not matter so much because the meaning of the back-channel feedback can be made light of as noted above.

Because the back-channel feedback read out by the read-out section 142 and the reply data (response data other than back-channel feedback) supplied by the reply creation section 182 are each voice waveform data, the back-channel feedback and the reply (response other than back-channel feedback) can be output in voice by the back-channel feedback and the response data being reproduced as-is. However, the fourteenth embodiment is constructed to control the pitch of the back-channel feedback or reply (response) in consideration of the pitch of the remark (question) to which the back-channel feedback or reply is to be returned as in the above-described first embodiment etc., and such a pitch control function is performed by the pitch control section 144. Namely, like in the above-described first embodiment etc., the pitch control section 144 controls the pitches of voice, based on the back-channel feedback data read out from the back-channel feedback data storage section 143 or the reply data supplied from the reply creation section 110, in accordance with the pitch of the first segment (e.g., word ending) of the remark analyzed by the pitch analysis section 106. More specifically, the pitch control section 144 controls the replying voice synthesis by controlling the pitches of the entire replying voice of the back-channel feedback or reply so that the pitch of a particular segment (second segment) of the back-channel feedback data or a particular segment (third segment) of the reply data assumes a predetermined interval relationship with the pitch of the first segment of the remark. A replying voice signal synthesized by the pitch control section 144 is converted into an analogue signal by the D/A converter 208 and then audibly output via the speaker 142.

In the host 160, on the other hand, the cooperation section 180 supplies information, such as various parameters and various states, to the cooperation section 140 of the CODEC 200. Further, when a request for creating a reply (response) has been received from the cooperation section 140, the cooperation section 180 controls the linguistic analysis section 108b and the reply creation section 110. Like the linguistic analysis section 108 of FIG. 1, the linguistic analysis section 108b analyzes the meaning of the remark represented by the voice signal converted into a digital signal by the A/D converter 206. In the host 160 shown in FIG. 49, the linguistic analysis section 108b and the reply creation section 110 function substantially similarly to the linguistic analysis section 108 and the reply creation section 110 shown in FIG. 1. Note that the reply creation section 110 in the host 160 of FIG. 49 is constructed, in principle, to create a reply (response) other than back-channel feedback. However, if the linguistic analysis section 108a in the CODEC 200 is unable to recognize the content of the remark, or if the result of the recognition by the linguistic analysis section 108a has a low reliability, then the reply creation section 110 in the host 160 sometimes create back-channel feedback as a reply to the remark. Reply data created or acquired by the reply creation section 110 is supplied to the pitch control section 144.

Figure 50:
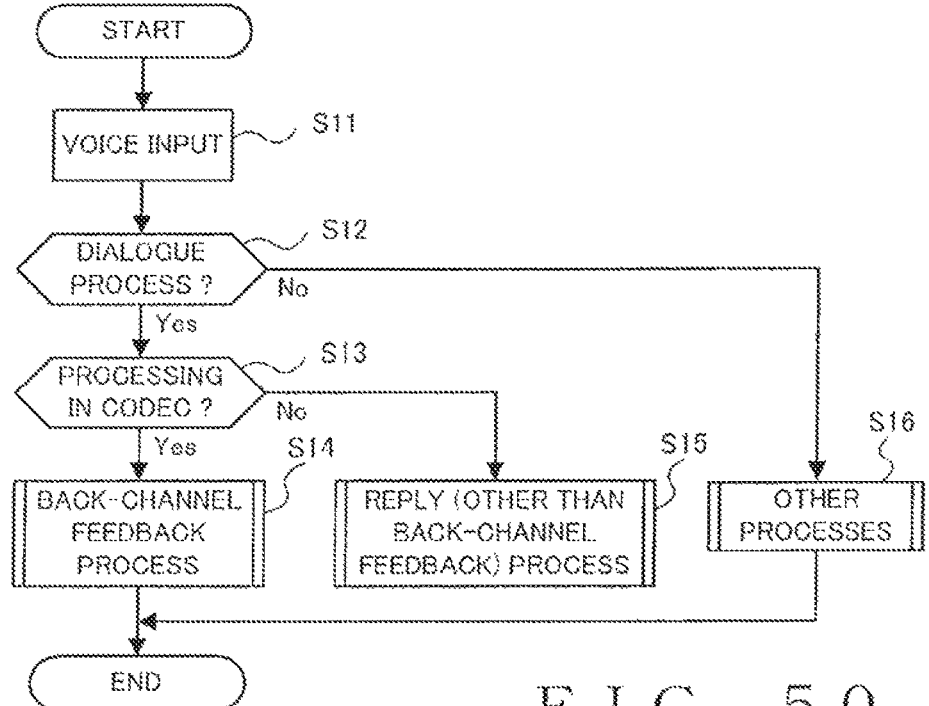
FIG. 50 is a flow chart of voice processing performed in the voice synthesis apparatus of FIG. 49.

The following describe behavior of the voice synthesis apparatus 100. FIG. 50 is a flow chart of voice processing performed in the voice synthesis apparatus 100. First, in response to the user performing a predetermined operation, e.g. selecting on a main menu (not shown) an icon corresponding to the voice processing, the CPU 162 starts up the program P2, so that the functional blocks shown in FIG. 49 are built in the CODEC 200 and the host 160.

Once the user inputs voice of a remark to the voice input section 102, the voice is converted into a voice signal by the voice input section 102 and then converted into a digital signal by means of the A/D converter 206, at step S11. Then, at step S12, the cooperation section 180 in the host 160 determines whether execution of a dialogue process is designated in the started voice processing. If the execution of the dialogue process is not designated in the started voice processing (No determination at step S12), other processes are performed at step S16. Examples of the other processes include: a voice recognition process for supplying the voice signal, converted into the digital signal, to another functional block (not shown) in the host 160, as indicated by 1 in FIG. 49, so that the other functional block converts the user's remark into a character train; and a reproduction process for converting the data processed by the other block into an analog signal by means of the D/A converter 208 and audibly reproducing the analog signal through the speaker 142.

If, on the other hand, the execution of the dialogue process is designated in the started voice processing (Yes determination at step S12), the cooperation section 180 informs the cooperation section 140 of the CODEC 200 to that effect, so that the cooperation section 140 instructs the linguistic analysis section 108a to determine at step S13 whether the input remark is of content to which back-channel feedback should be returned. If the input remark is of content to which back-channel feedback should be returned (Yes determination at step S13), a back-channel feedback process is performed as follows at step S14. If, on the other hand, the input remark is not of content to which back-channel feedback should be returned (No determination at step S13), a reply process is performed as follows at step S15. Note that the instant voice processing is brought to an end after steps S14, S15 and S16.

Figure 51:
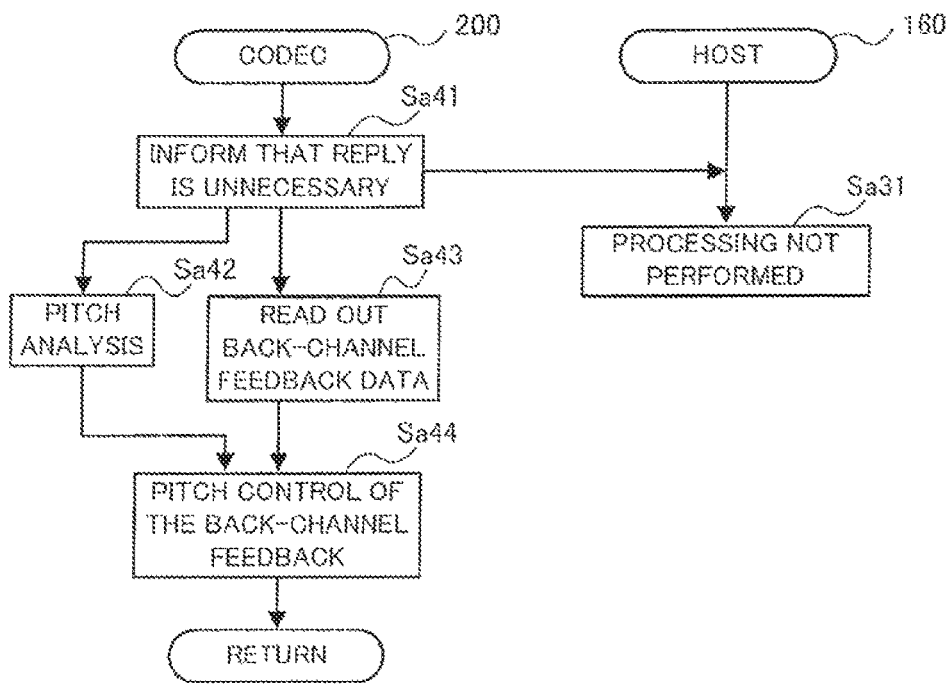
FIG. 51 is a flow chart showing details of a back-channel feedback process in the voice processing of FIG. 50.

FIG. 51 is a flow chart showing details of the back-channel feedback process performed at step S14. First, the linguistic analysis section 108a having determined that the input remark is of content to which back-channel feedback should be returned informs the cooperation section 140 to that effect, and the cooperation section 140 informs the cooperation section 180 of the host 160 that creation of a reply to the remark is unnecessary (step Sa41). Upon receipt of such information from the cooperation section 140, the cooperation section 180 instructs the linguistic analysis section 108b to ignore the digital signal corresponding to the remark. Thus, the voice signal on the remark is not performed in the host 160 (step Sb31).

Meanwhile, the pitch analysis section 106 analyzes the voice signal of the input remark for example in the following manner to thereby identify the pitch of the first segment (e.g., the word ending) of the remark and then supplies pitch data indicative of the identified pitch to the pitch control section 144, at step Sa42. In parallel with the pitch analysis, the readout section 142 selectively reads out any one of the sets of back-channel feedback data stored in the back-channel feedback data storage section 143 and supplies the read-out back-channel feedback data to the pitch control section 144, at step Sa43. Like in the above-described embodiments, the pitch control section 144 analyzes the pitch of a portion of the simply-reproduced back-channel feedback data corresponding to the second segment (e.g., word ending), then shifts the pitches of the entire back-channel feedback data in such a manner that the analyzed pitch assumes a predetermined interval (e.g., five degrees down) relationship with the pitch (pitch of the first segment such as the word ending) indicated by the pitch data supplied from the pitch analysis section 106, and then outputs the pitch-shifted back-channel feedback data (step Sa44). The pitch control section 144 reproduces the pitch-shifted back-channel feedback data and supplies the reproduced pitch-shifted back-channel feedback data to the D/A converter 208. In this manner, the back-channel feedback pitch shifted in correspondence with the remark is output. After the output of the pitch-shifted back-channel feedback data, the voice processing (FIG. 50) is brought to an end together with the back-channel feedback process.

Figure 52:
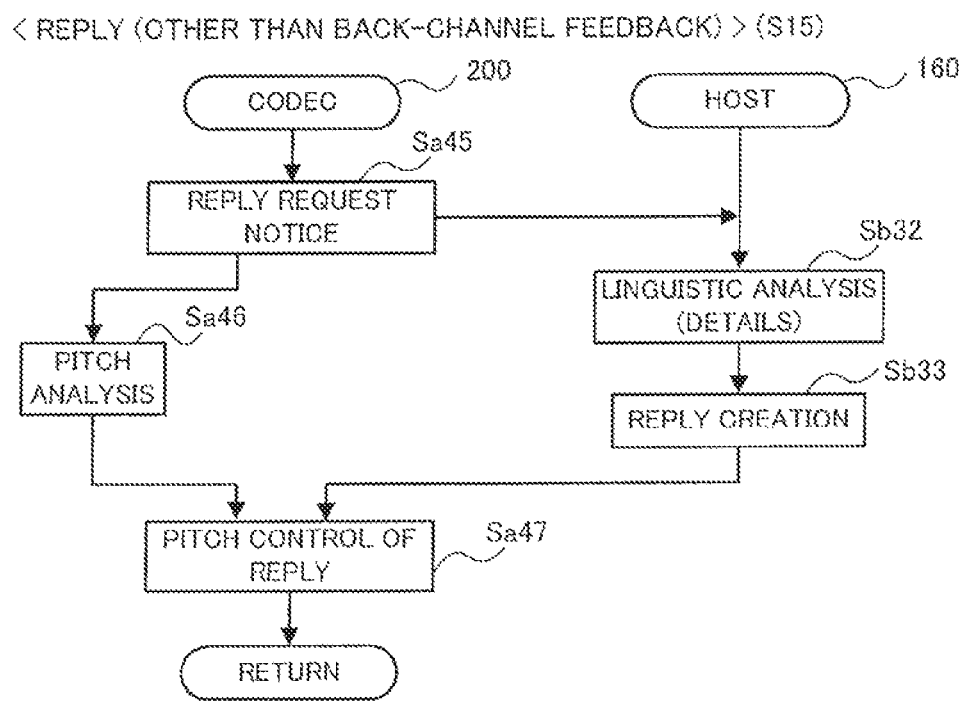
FIG. 52 is a flow chart showing details of a reply process in the voice processing of FIG. 50.

The following describe the reply process performed at step S15 of the voice processing. FIG. 52 is a flow chart showing details of the reply process. The linguistic analysis section 108a, having determined that the input remark is of content to which back-channel feedback should not be returned, informs the cooperation section 140 to that effect, so that the cooperation section 140 notifies the cooperation section 180 of the host 160 that a reply to the remark should be created (reply request) (step Sa45). Upon receipt of such a notification, the cooperation section 180 instructs the linguistic analysis section 108b to analyze the meaning of the remark. Then, the linguistic analysis section 108b analyze the meaning of the remark as instructed at step Sb32. Then, the reply creation section 110 creates (acquires) reply data corresponding to the meaning of the remark and supplies the reply data to the pitch control section 144 at step Sb33.

Meanwhile, in the reply process, the pitch analysis section 106 identifies a pitch of the first segment (e.g., word ending) of the input remark and then supplies pitch data indicative of the identified pitch to the pitch control section 144 at step Sa46, in the same manner as at step Sa42 above. Then, the pitch control section 144 analyzes a pitch of a third segment (e.g., word ending) of the reply data when the reply data is reproduced simply but also shifts pitches of the entire reply data so that the analyzed pitch assumes a five-degree-down relationship with the pitch indicated by the pitch data supplied from the pitch analysis section 106, and then the pitch control section 144 outputs the pitch-shifted reply data (step Sa47).

With such an embodiment of the voice synthesis apparatus 100, it is possible to give the user a natural feel as if a dialog were being conducted between persons, irrespective of whether back-channel feedback is output with back-channel feedback data or another reply than back-channel feedback is output with reply data. Further, according to the instant embodiment, when back-channel feedback is to be returned to the remark, the back-channel feedback data is processed in the CODEC 200 alone without being processed in the host 160, and thus, it is possible to output the back-channel feedback promptly with a good response. Further, when another reply than back-channel feedback is to be output in response to the remark, such a reply is created or acquired in the host 160, so that an increased accuracy of the reply can be achieved. Therefore, the instant embodiment not only allows the back-channel feedback to be output promptly with a good response but also allows the other reply than back-channel feedback to be output with an increased accuracy.

<Remark and Bach-Channel Feedback>

The fourteenth embodiment has been described as constructed in such a manner that any one of the sets of back-channel feedback data stored in the back-channel feedback data storage section 143 is read out when it has been determined that the remark is of content to which back-channel feedback data should be returned. With such a construction, however, back-channel feedback irrelevant to the remark may sometimes be output although it does not matter so much, as noted above. Thus, sets of back-channel feedback data may be associated in advance with typical volume and pitch variation patterns of possible remarks corresponding to the back-channel feedback, so that, when the linguistic analysis section 108a has determined that volume and pitch variation of a remark supplied from the pitch analysis section 106 matches the volume and pitch variation patterns of any one of the remarks, it instructs the readout section 142 to read out the set of back-channel feedback data associated with that remark. More specifically, with such a construction, if a set of back-channel feedback data of "sou desune" ("Right.") is prestored in the back-channel feedback data storage section 143 in association with volume and pitch variation of a remark "samui ni" (It is cold, isn't it?), and if volume and pitch variation of a user's actual remark "samui ni" (It is cold, isn't it?) matches the stored volume and pitch variation of the remark "samui nâ", then appropriate back-channel feedback "Right." can be output. Thus, in this case, inappropriate or irrelevant back-channel feedback like "êto" ("Let me see."), "naru hodo" ("I see.") or "sorede" ("So what?") can be avoided from being output.

<Linguistic Analysis Section>

Whereas the fourteenth embodiment has been described above in relation to the case where the CODEC 200 includes the linguistic analysis section 108a and the host 160 includes the linguistic analysis section 108b, any one of the linguistic analysis sections, such as the linguistic analysis section 108a, may be dispensed with. If the linguistic analysis section 108a is dispensed with, the linguistic analysis section 108b performs the function of the linguistic analysis section 108a. Namely, if the linguistic analysis section 108b determines whether the remark represented by the digital voice signal is of content to which back-channel feedback should be returned. If the remark is of content to which back-channel feedback should be returned, the linguistic analysis section 108b may supply information to that effect to the readout section 142 of the CODEC 200 directly or indirectly via the cooperation sections 180 and 140 and instruct the readout section 142 to read out back-channel feedback data.

To summarize the primary constructional features of the CODEC (coding/decoding device) 200, the CODEC 200 includes: the A/D converter (206) that converts an input voice signal of a remark into a digital signal; the pitch analysis section (106) that analyzes the pitch of the first segment of the remark on the basis of the digital signal; a back-channel feedback acquisition section (combination of the linguistic analysis section 108a, the readout section 142 and the back-channel data storage section 143) that, when back-channel feedback is to be returned to the remark, acquires back-channel feedback data corresponding to the meaning of the remark; the pitch control section (144) that controls the pitch of the acquired back-channel feedback data in such a manner that the second segment of the back-channel feedback data has a pitch associated with the analyzed pitch of the first segment; and the D/A converter (208) constructed to convert the pitch-controlled back-channel feedback data into an analogue signal.

Note that the various application examples and/or the modifications related to the first and second embodiments are also applicable to the fourteenth embodiment of the present invention.

Further, the primary functional features of the host computer 160 may be summarized as follows. When replying voice other than the back-channel feedback should be returned to the remark, the host computer 160 is constructed to acquire replying voice data responsive to the remark in accordance with the digital signal converted by the A/D converter (206) and then return the acquired replying voice data to the coding/decoding device (CODEC 200). The pitch control section (144) of the coding/decoding device (CODEC 200) is further constructed to control the pitch of the replying voice data, returned from the host computer (160), so that the third segment of the replying voice data has a pitch associated with the analyzed pitch of the first segment, and the D/A converter (208) is further constructed to convert the pitch-controlled replying voice data into an analogue signal.

What is claimed is:

1. A voice synthesis apparatus comprising:
    a voice input section configured to receive a voice signal of a remark;
    a pitch analysis section configured to analyze a pitch of a first segment of the remark, wherein the first segment is a word ending of the remark;
    an acquisition section configured to acquire a reply to the remark; and
    a voice generation section configured to generate voice of the reply acquired by said acquisition section, said voice generation section shifting pitches of the entire voice waveform data of the reply by a same amount so that a second segment of the reply has a pitch associated with the pitch of the first segment analyzed by said pitch analysis section, wherein the second segment is a word beginning or word ending of the reply.

2. The voice synthesis apparatus as claimed in claim 1, wherein the remark is a question, and the reply corresponds to the question.

3. The voice synthesis apparatus as claimed in claim 1, wherein said voice generation section is configured to provisionally set the pitch of the second segment of the reply at the pitch associated with the pitch of the first segment, and
    wherein said voice generation section is further configured to perform at least one of:
        an operation of, if the provisionally-set pitch of the second segment is lower than a predetermined first threshold value, shifting the provisionally-set pitch of the second segment to a pitch one octave up; and
        an operation of, if the provisionally-set pitch of the second segment is higher than a predetermined second threshold value, shifting the provisionally-set pitch of the second segment to a pitch one octave down.

4. The voice synthesis apparatus as claimed in claim 1,
wherein said voice generation section is configured to provisionally set the pitch of the second segment of the reply at the pitch associated with the pitch of the first segment, and
wherein said voice generation section is further configured to shift the provisionally-set pitch to a pitch one octave up or down in accordance with a designated attribute.

5. The voice synthesis apparatus as claimed in claim 1,
wherein any one of a first mode and a second mode is settable as an operation mode of said voice generation section,
wherein, in said first mode, said voice generation section is configured to shift the pitches of the entire voice waveform data of the reply in such a manner that the interval of the pitch of said second segment relative to the pitch of said first segment becomes a consonant interval, and
wherein, in said second mode, said voice generation section is configured to shift the pitches of the entire voice waveform data of the reply in such a manner that the interval of the pitch of said second segment relative to the pitch of said first segment becomes a dissonant interval.

6. The voice synthesis apparatus as claimed in claim 1, further comprising:
a non-linguistic analysis section configured to analyze non-linguistic information, other than pitch, related to the remark; and
a control section configured to control voice generation, in said voice generation section, of the reply in accordance with the analyzed non-linguistic information.

7. The voice synthesis apparatus as claimed in claim 1, further comprising:
a linguistic analysis section configured to analyze linguistic information included in the remark and the reply; and
a control section configured to control voice generation, in said voice generation section, of the reply in accordance with the analyzed linguistic information.

8. The voice synthesis apparatus as claimed in claim 1, further comprising:
a non-linguistic analysis section configured to analyze pitch variation in the remark; and
a control section configured to control the pitches of the entire voice waveform data of the reply, generated in said voice generation section, to vary in accordance with the pitch variation in the remark.

9. The voice synthesis apparatus as claimed in claim 1, wherein said voice generation section is configured to associate the pitch of said second segment with the pitch of said first segment in accordance with a given rule and generate voice with a characteristic based on a given agent attribute, the voice synthesis apparatus further comprising:
a control section configured to determine the rule based on at least one of an agent attribute and an attribute of a speaker of the remark.

10. The voice synthesis apparatus as claimed in claim 1, wherein said voice generation section is configured to associate the pitch of said second segment with the pitch of said first segment in accordance with a given rule, the voice synthesis apparatus further comprising:

a control section configured to update the rule based on receiving voice of a further remark via said voice input section after sounding of the voice of the reply.

11. The voice synthesis apparatus as claimed in claim 1, wherein said voice generation section is configured to shift the pitches of the entire voice waveform data of the reply in such a manner that an interval of the pitch of said second segment relative to the pitch of said first segment becomes a consonant interval.

12. The voice synthesis apparatus as claimed in claim 11, wherein said voice generation section is configured to shift the pitches of the entire voice waveform data of the reply in such a manner that the interval of the pitch of said second segment relative to the pitch of said first segment becomes a consonant interval of five degrees lower than the pitch of said first segment.

13. A computer-implemented method comprising:
receiving a voice signal of a remark;
analyzing a pitch of a first segment of the remark, wherein the first segment is a word ending of the remark;
acquiring a reply to the remark;
synthesizing voice of the acquired reply; and
shifting pitches of the entire voice waveform data of the reply by a same amount so that a pitch of a second segment of the voice of the reply has a pitch associated with the analyzed pitch of the first segment, wherein the second segment is a word beginning or word ending of the reply.

14. A coding/decoding device comprising:
an A/D converter configured to convert an input voice signal of a remark into a digital signal;
a pitch analysis section configured to analyze a pitch of a first segment of the remark based on the digital signal, wherein the first segment is a word ending of the remark;
a back-channel feedback acquisition section configured to, when back-channel feedback is to be returned to the remark, acquire back-channel feedback data corresponding to a meaning of the remark;
a pitch control section configured to shift pitches of the entire back-channel feedback data by a same amount so that a second segment of the back-channel feedback data has a pitch associated with the analyzed pitch of the first segment, wherein the second segment is a word beginning or word ending of the back-channel feedback data; and
a D/A converter configured to convert the pitch-shifted back-channel feedback data into an analog signal.

15. The coding/decoding device as claimed in claim 14, wherein the digital signal converted by the A/D converter is supplied to a host computer,
wherein the pitch control section is further configured to receive replying voice data, responsive to the remark, returned from the host computer and shift pitches of the replying voice data by a same amount so that a third segment of the received replying voice data has a pitch associated with the analyzed pitch of the first segment, and
wherein the D/A converter is further configured to convert the pitch-shifted replying voice data, into an analog signal.

16. A voice synthesis system comprising a coding/decoding device and a host computer, said coding/decoding device comprising:
an A/D converter configured to convert an input voice signal of a remark into a digital signal;

a pitch analysis section configured to analyze a pitch of a first segment of the remark based on the digital signal, wherein the first segment is a word ending of the remark;

a back-channel feedback acquisition section configured to, when back-channel feedback is to be returned to the remark, acquire back-channel feedback data corresponding to a meaning of the remark;

a pitch control section configured to shift pitches of the entire back-channel feedback data by a same amount so that a second segment of the back-channel feedback data has a pitch associated with the analyzed pitch of the first segment, wherein the second segment is a word beginning or word ending of the back-channel feedback data; and a D/A converter configured to convert the pitch-shifted back-channel feedback data into an analog signal, wherein said host computer is configured to, when replying voice other than the back-channel feedback is to be returned to the remark, acquire replying voice data, responsive to the remark, in accordance with the digital signal converted by said A/D converter and return the acquired replying voice data to said coding/decoding device, wherein said pitch control section is further configured to shift pitches of the replying voice data by a same amount so that a third segment of the replying voice data returned from the host computer has a pitch associated with the analyzed pitch of the first segment, and wherein said D/A converter is further configured to convert the pitch-shifted replying voice data, into an analog signal.

17. A method comprising:

converting, by means of an A/D converter, an input voice signal of a remark into a digital signal;

analyzing, by means of a processor, a pitch of a first segment of the remark based on the digital signal, wherein the first segment is a word ending of the remark;

acquiring, by means of the processor, back-channel feedback data corresponding to a meaning of the remark, when back-channel feedback is to be returned to the remark;

shifting, by means of the processor, pitches of the entire back-channel feedback data by a same amount so that a second segment of the back-channel feedback data has a pitch associated with the analyzed pitch of the first segment, wherein the second segment is a word beginning or word ending of the back-channel feedback data; and converting, by means of a D/A converter, the pitch-shifted back-channel feedback data into an analog signal.

* * * * *